(12) United States Patent
Govindaraju et al.

(10) Patent No.: US 11,853,748 B2
(45) Date of Patent: *Dec. 26, 2023

(54) METHODS AND SYSTEMS THAT SHARE RESOURCES AMONG MULTIPLE, INTERDEPENDENT RELEASE PIPELINES

(71) Applicant: VMware, Inc., Palo Alto, CA (US)

(72) Inventors: Agila Govindaraju, Bangalore (IN); Ravi Kasha, Bangalore (IN); Mohammed Muneebuddin, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/510,191

(22) Filed: Oct. 25, 2021

(65) Prior Publication Data

US 2022/0043651 A1 Feb. 10, 2022

Related U.S. Application Data

(63) Continuation of application No. 16/418,439, filed on May 21, 2019, now Pat. No. 11,182,152, which is a continuation of application No. 15/348,995, filed on Nov. 11, 2016, now Pat. No. 10,296,327.

(30) Foreign Application Priority Data

Oct. 15, 2016 (IN) .............................. 201641035334

(51) Int. Cl.
*G06F 9/46* (2006.01)
*G06F 8/71* (2018.01)
*G06F 8/60* (2018.01)
*G06F 9/52* (2006.01)

(52) U.S. Cl.
CPC .................. *G06F 8/71* (2013.01); *G06F 8/60* (2013.01); *G06F 9/52* (2013.01)

(58) Field of Classification Search
CPC ................. G06F 8/71; G06F 8/60; G06F 9/52
See application file for complete search history.

(56) References Cited

U.S. PATENT DOCUMENTS 9,106,527 B1 8/2015 Cook et al.
9,910,654 B1 3/2018 Brigham, II et al.

*Primary Examiner* — Gregory A Kessler
(74) *Attorney, Agent, or Firm* — Barta, Jones & Foley, PLLC

(57) ABSTRACT

The current document is directed to automated application-release-management facilities that, in a described implementation, coordinate continuous development and release of cloud-computing applications. The application-release-management process is specified, in the described implementation, by application-release-management pipelines, each pipeline comprising one or more stages, with each stage comprising one or more tasks. The currently described methods and systems allow resources to be shared among multiple, interdependent release pipelines and allow access to shared resources to be controlled.

20 Claims, 80 Drawing Sheets

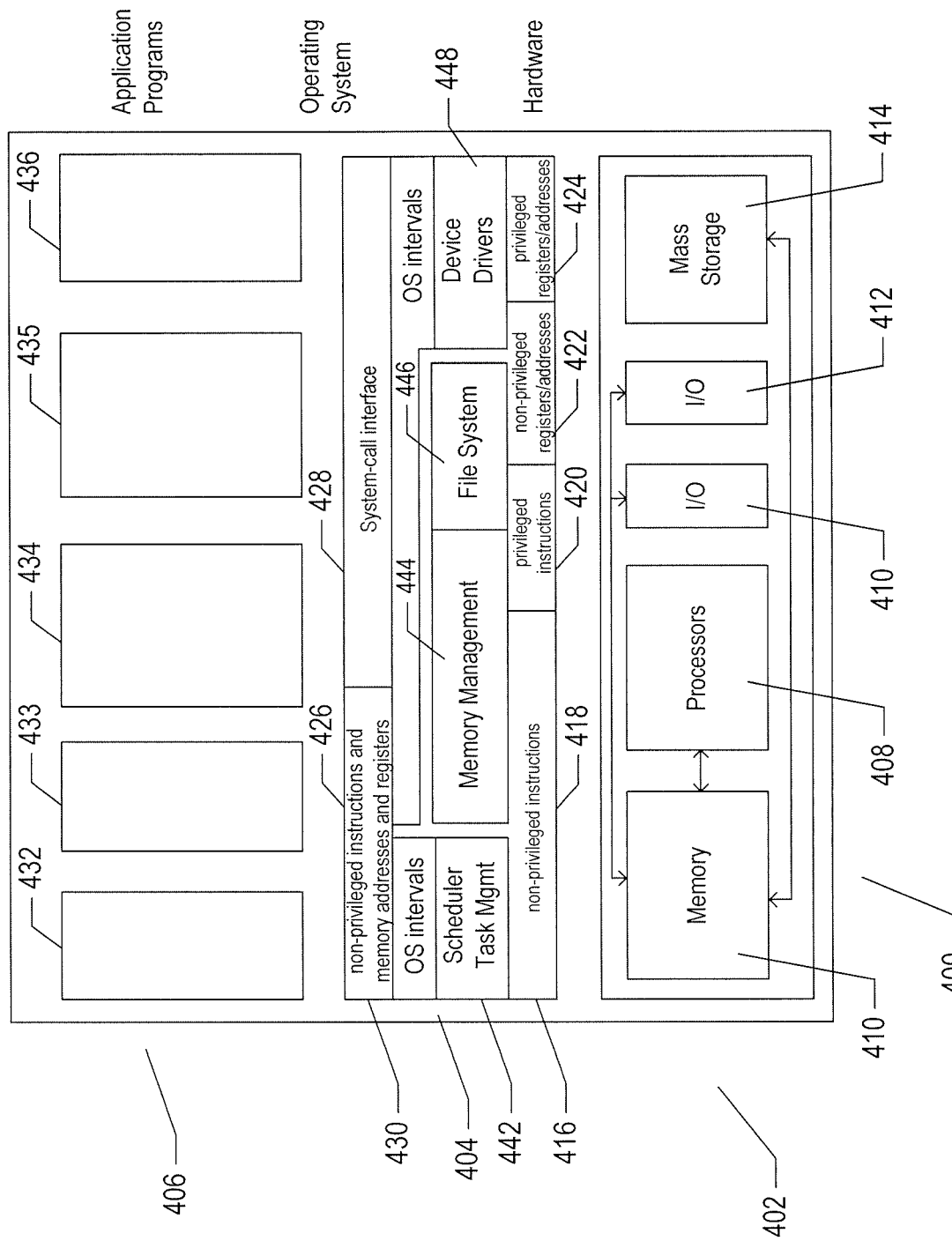

| | | | |
|---|---|---|---|
| 1402 | Start Workflow | The starting point of the workflow. All workflows contain this element. A workflow can have only one start element. Start elements have one output and no input, and cannot be removed from the workflow schema. | |
| 1408 | Scriptable task | General purpose tasks you define. You write JavaScript functions in this element. | |
| 1406 | Decision | A boolean function. Decision elements take one input parameters and return either true or false. The type of decision that the element mtakes depends on the type of the input parameter. Decision elements let the workflow branch into different directions, depending on the input parameter the decision element receives. If the received input parameter corresponds to an expected value, the workflow continues along a certain route. If the input is not the expected value, the workflow continues on an alaternative path. | |
| 1407 | Custom decision | A boolean function. Custom decisions can take several input parameters and process them according to custom scripts. Returns either true or false. | |
| | Decision activity | A boolean function. A decision activity runs a workflow and binds its output parameters to a true or a false path. | |
| 1410 | User interaction | Lets users pass new input parameters to the workflow. You can design how the user interaction element presents the request for input parameters and place constraints on the parameters that users can provide. You can set permissions to determine which users can provide the input parameters. When a running workflow arrives at a user interaction element, it enters a passive state and prompts the user for input. You can set a timeout period within which the users must provide input. The workflow resumes according to the data the user passes to it, or returns an exception if the timeout period expires. While it is waiting for the user to respond, the workflow token is in the waiting. | |
| 1412 | Waiting timer | Used by long-running workflows. When a running workflow arrives at a Waiting Timer element, it enters a passive state. You set an abosoulte date at which the workflow resumes running. While it is waiting for the date, the workflow token is in the waiting-signal state. | |
| 1413 | Waiting event | Used in long-running workflows. When a running workflow arrives at a Waiting Event element, it enters a passive state. You define a trigger event that the workflow awaits before it resumes running. While it is waiting for the event, the workflow token is in the waiting-signal state. | |
| 1404 | End workflow | The end point of a workflow. You can have multiple end elements in a schema, to represent the various possible outcomes of the workflow. End elements have one input with no output. When a workflow reaches an End Workflow element, the workflow token enters the completed state. | |

FIG. 14A

| | | | |
|---|---|---|---|
| 1414 | Thrown exception | Creates an exception and stops the workflow. Multiple occurrences of this element can be present in the workflow schema. Exception elements have one input parameters, which can only be of the String type, and have no output parameter. When a workflow reaches an Exception element, the workflow token enters the failed state. | |
| 1426 | Workflow note | Lets you annotate sections of the workflow. You can stretch notes to delineate sections of the workflow. You can change the background color to the notes to differentiate workflow zones. Workflow notes provide only visual information, to help you understand the schema. | |
| 1424 | Action element | Calls on an action from the Orchestrator libraries of action. When a workflow reaches an action element, it calls and runs that action. | |
| 1422 | Workflow element | Starts another workflow synchronously. When a workflow reaches a Workflow element in its schema, it runs that workflow as part of its onwn process. The original workflow continues only after the called workflow completes its run. | |
| 1420 | Foreach element | Runs a workflow on every element from an array. For example, you can run the Rename Virtual Machine workflow on all virtual machines from a folder. | |
| 1423 | Asynchronous workflow | Starts a workflow asynchronously. When a workflow reaches an asynchronous workflow element, it starts that workflow and continues its own run. The original workflow does not wait for the called workflow to complete. | |
| 1428 | Schedule workflow | Create a task to run the workflow at a set time, and then the workflow continues its run. | |
| 1429 | Nested workflows | Starts several workflows simultaneously. You can choose to nest local workflows and remote workflows that are in a different Orchestrator server. You can also run workflows with different credentials. The workflow waits for all the nested workflows to complete before continuing its run. | |
| 1415 | Handle error | Handles an error for a specific workflow element. The workflow can handle the error by creating an exception, calling another workflow, or running a custom script. | |
| 1416 | Default error handler | Handles workflow errors that are not caught by standard error handlers. You can use any available scheme elements to handle errors. | |
| 1418 | Switch | Switches to alternative workflow paths, based on workflow attribute or parameter. | |

FIG. 14B

| Server Role | Inbound Ports | Service/System Outbound Ports |
|---|---|---|
| vCloud Automation Center | | |
| vCenter Single Sign-On | 7444 | LDAP: 389<br>LDAPS: 636<br>vCenter Single Sign-On: 11711, 11712, 12721 |
| vCloud Automation Center virtual Appliance (VA) | 443, 5432+, 5672+ | vCenter Single Sign-On Load Balancer: 7444<br><br>vCloud Automation Center virtual appliances (VA): 5432, 5672+<br><br>vCloud Automation Center Infrastructure Web Load Balancer: 443<br><br>vCloud Orchestrator Load Balancer: 8281<br><br>*This is a communication requirement between clustered vCAC virtual appliances. |
| Infrastructure Web Server | 135, 443, 1024-65535* | vCenter Single Sign-On Load Balancer: 7444<br>vCloud Automation Center virtual appliance Load Balancer: 443<br>MSSQL: 135, 1433, 1024-65535* |
| Infrastructure Manager Server | 135, 443, 1024-65535* | vCloud Automation Center Infrastructure Web Load Balancer: 443<br>MSSQL: 135, 1433, 1024-65535* |
| Infrastructure DEM Server | NA | vCenter Single Sign-On Load Balancer: 7444<br><br>vCloud Automation Center virtual appliance Load Balancer: 443<br><br>vCloud Automation Center Infrastructure Web Load Balancer: 443<br><br>vCloud Automation Center Infrastructure Manager Load Balancer: 443 |
| Infrastructure Agent Server | NA | vCloud Automation Center Infrastructure Web Load Balancer: 443<br><br>vCloud Automation Center Infrastructure Manager Load Balancer: 443 |
| MSSQL Database Server | 135, 1433, 1024-65535* | Infrastructure Web Server: 135, 1024-65535*<br><br>Infrastructure Management Server: 135, 1024-65535* |
| | Do not change or block these ports: | |
| vCloud Application Services Server | 8443 HTTPS User Interface connection<br><br>8080 HTTP (legacy port; do not use) | vCenter Single Sign-On: 1433<br><br>vCloud Automation Center virtual appliance Load Balancer: 443<br><br>vCloud Automation Center Infrastructure Web Load Balancer: 443 |
| vFabric RabbitMQ | 5671 AMQP over SSL | |
| External SSH connection | 22 | |
| Content Server | 80 HTTP (used to host OOB content, agent binary, and CLI binary) | |
| IT Business Management Suite Standard Edition Server | | vCenter Single Sign-On: 1433<br><br>vCloud Automation Center virtual appliance Load Balancer: 443<br><br>vCloud Automation Center Infrastructure Web Load Balancer: 443 |
| IT Business Management Suite Standard Edition UI connection | 443 HTTPS | |
| External SSH connection | 22 | |
| Web console access (VAMI) | 5480 | |

FIG. 16B

| Load Balancer | Ports Balanced |
|---|---|
| vCenter Single Sign-On Load Balancer | 7444 |
| vCloud Automation Center virtual appliance Load Balancer | 443 |
| vCloud Automation Center Infrastructure Web Load Balancer | 443 |
| vCloud Automation Center Infrastructure Manager Service Load Balancer | 443 |
| vCloud Orchestrator Load Balancer | 8281 |

FIG. 16C

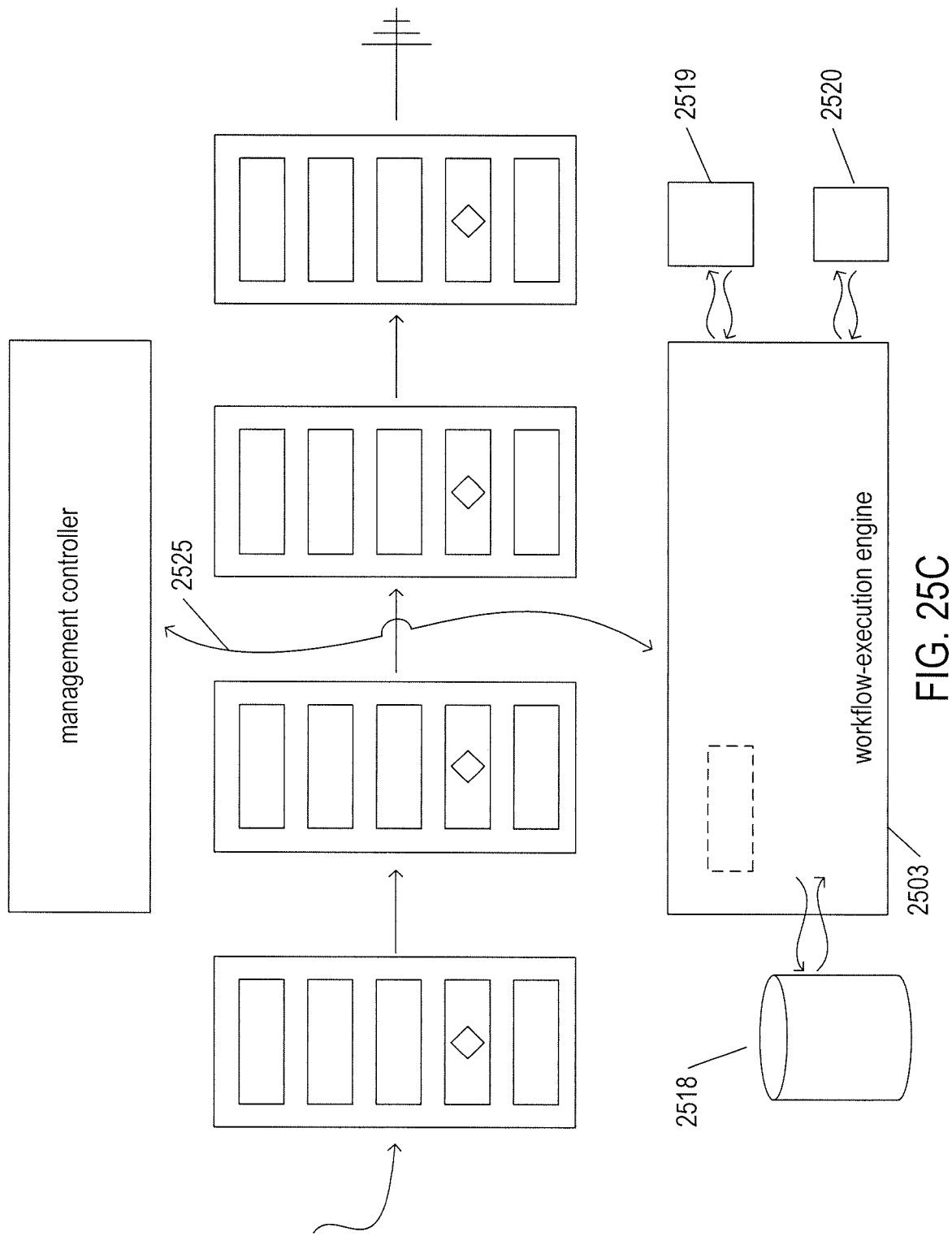

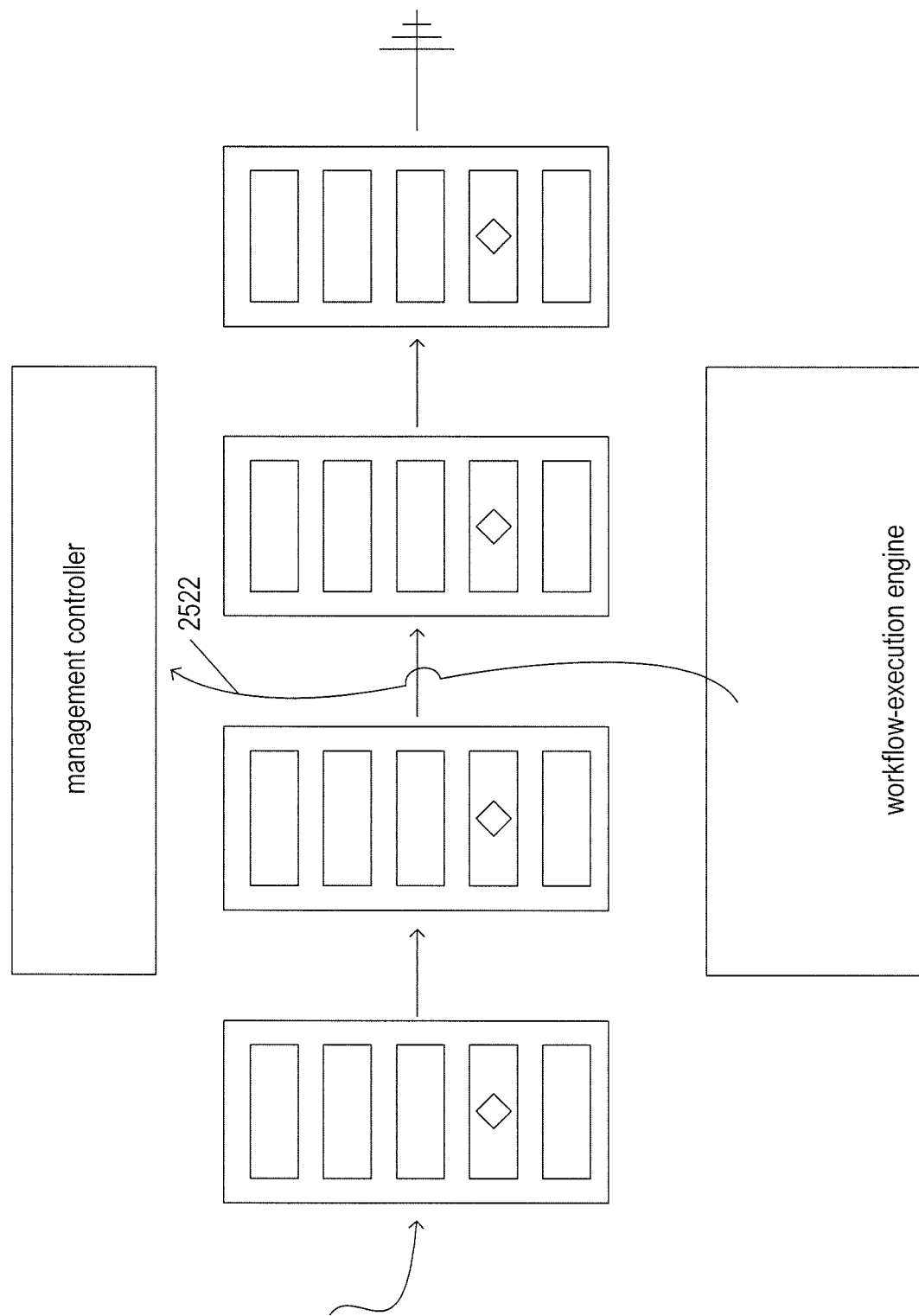

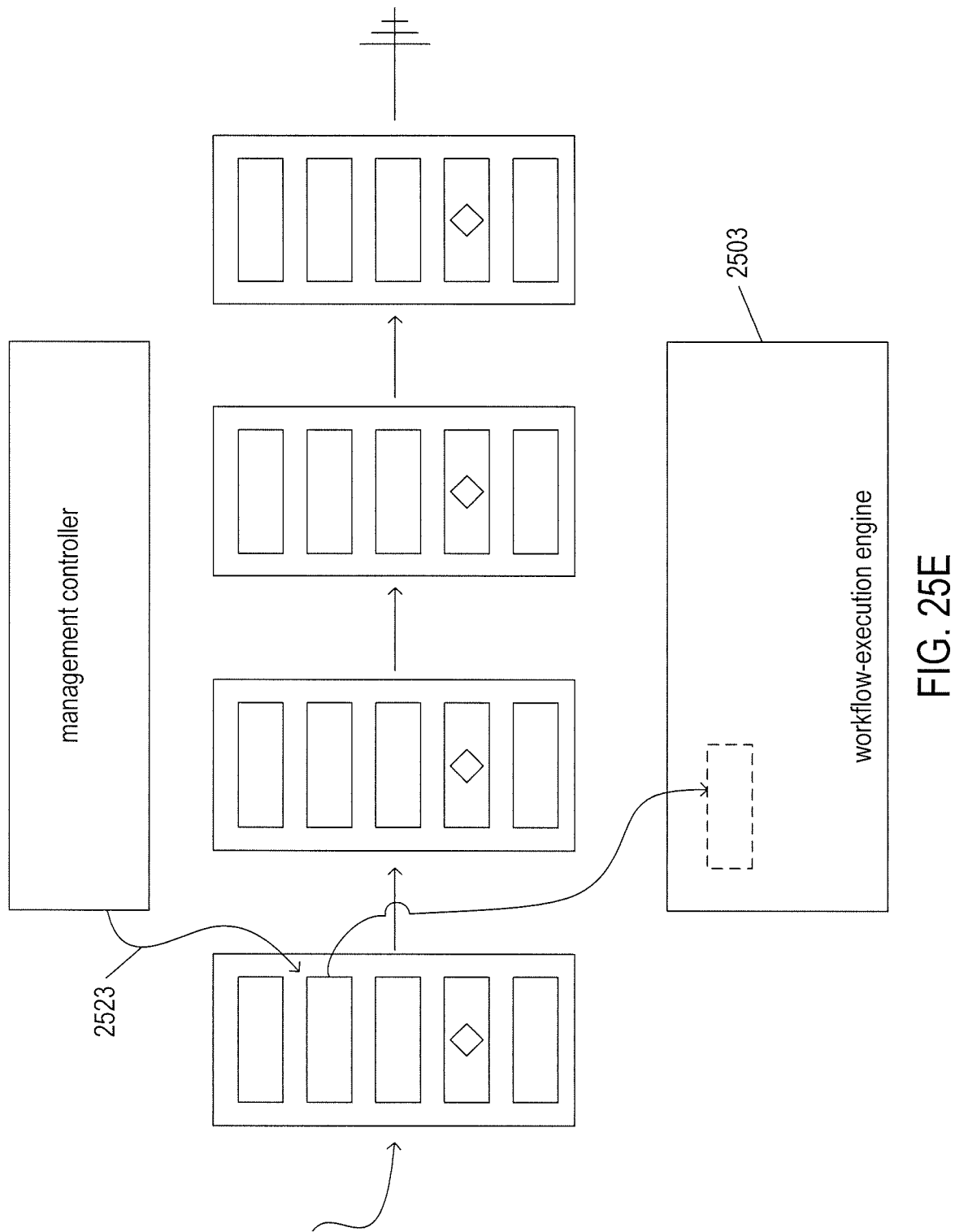

```
[
    {
        "name": "vcac-prov01",
        "value": {                                          ⟋ 2702
            "memory": 1024,
            "machineId": "f9ee3f71-c5d0-4138-9520-24e15e376d13",
            "hostIp": ["10.72.12.56"],
            "cpu": 1,
            "endLease": 1410478627000,
            "storageSize": 4,
            "startLease": 1410392227000,
            "blueprintId":" f9ee3f71-c5d0-4138-3476-24e15e376f36",
            "provider":"iaas-service"
        },
        "type": "MACHINE"
    }
]
```

FIG. 27A ${stage.task.parameter}  ⟋ 2704
${pipeline.parameter}  ⟍ 2705

FIG. 27B

Task Configuration

* Category: PROVISION
* Provider: vRA Provisioning
* Endpoint: vRA-PA-Prov-160
* Name: [ProvisionTask]

Machine Properties

- *Blueprint: [RH 61 32-bit/Default ▼]
- * No. of Machines: [1]
- Lease (Days): [1]
- CPUs: [1]
- Memory (MB): [512]
- Storage (GB): [3]
- Description: [           ]
- *Owner: ● Logged in User    ◎ Enter Owner or Bind
- Reason: [           ]

Output Properties

| Name | Share with other tasks |
|---|---|
| Machine Output | ☑ |
| Status | ☑ |

— 2706

[Save] [Cancel]

Task Configuration

* Category: CUSTOM
* Provider: Custom Script
* Name: [Script Task]

[General] [Advanced]

- *Execute One Host: ◎ User Defined Hosts  ● Read from Pipeline or Task Property
  [${DEV.ProvisionTask.machineOutput}] [All hosts ▼]
  \ 2708
- *Host Username: [fritz]
- *Host Password: [********]
- *Confirm host Password: [********]
- *Execute Script File: [${pipeline.inp.Script1}]
- *Script Type: [Bash ▼]

[Save] [Cancel]

FIG. 27D

```
$DEV.ProvisionTask.machineOutput[ ]=
[
  {
    "name": "vcac-prov01",
    "value": {
      "memory": 1024,
      "machineId": "f9ee3f71-c5d0-4138-9520-24e15e376d13",
      "hostIP": ["10.72.12.56"],
      "cpu": 1,
      "endLease": 1410478627000,
      "storageSize": 4,
      "startLease": 1410392227000,
      "blueprintId": "f9ee3f71-c5d0-4138-3476-24e15e376f36",
      "provider": "iaas-service"
    },
    "type": "MACHINE"
  },
  ... ... ...
]
```

$DEV.ProvisionTask.machineOutput[0].name = "vcac-prov01"

$DEV.ProvisionTask.machineOutput[0]

$DEV.ProvisionTask.machineOutput[0].value.hostIP = ["10.72.12.56"]

FIG. 27E

```
list : entity           ⎫
list : entity, entity   ⎬ 3820
list : entity, entity, ..., entity ⎭ entity : user ID  — 3822
entity : group ID ⟵ 3824 group : user            ⎫
group : user, user      ⎬ 3826
group : user, user, ..., user ⎭ tag : name, list  — 3828
tag : name, description, list ⟵ 3830
```

FIG. 38B

```
CREATE TABLE keys (key_ID        INTEGER,
 resource)ID   INTEGER,
 name          VARCHAR (100),         ⎫
 pipeline_ID   INTEGER,               ⎬ 3950
 stage         INTEGER,
 task          VARCHAR (100),
        ⋮
 creation      DATE_TIME);
```

```
CREATE PROCEDURE         bool Authorized (@user INTEGER, @name  VARCHAR(100),
                                          @pipeline VARCHAR(100), @stage INTEGER,
                                          @task VARCHAR(100)
AS
BEGIN
return   (
                (SELECT COUNT(*) FROM
                     (SELECT DISTINCT user_id
                       FROM keys, pipelines, key_tag, group_users, tag_groups, tag_users WHERE
                          keys.name = @name AND
                          pipelines.name = @pipeline AND
                          pipelines.pipeline_ID = keys.pipeline_ID AND
                          keys.stage = @stage AND
                          keys.task = @task AND
                          key.key_ID = key_tag.key_ID AND
                          (
                            (tag_groups.tag_ID = key_tag.tag_ID AND
                             group_users.group_ID = tag_groups.group_ID AND
                             group_users.user_ID = @user) OR
                            (tag_users.tag_ID = key_tag.tag_ID AND
                             tag_users.user_ID = @user)
                          )
                     )
                ) = 1)
END
```
3952

FIG. 39C

Task Configuration

* Provider: Jenkins
*Name: ddd
Execute Task: ◉ Always  ◉ On Condition(s)
☐ Continue Pipeline execution even if this task fails Jenkins Properties

*Endpoint: Jenkin1
* Job: Add two numbers

Parameters:

| Name | Value |
|---|---|
| Num1 |  |
| Num2 |  |

Output Properties

| Name | Publish? | Tag |
|---|---|---|
| jobName | ☐ |  |
| jobUrl | ☐ |  |
| buildId | ☐ |  |
| estimatedDuration | ☐ |  |
| testResult | ☐ |  |

Save   Cancel

FIG. 40C

METHODS AND SYSTEMS THAT SHARE RESOURCES AMONG MULTIPLE, INTERDEPENDENT RELEASE PIPELINES

CROSS-REFERENCE TO RELATED APPLICATION

This application is a continuation of application Ser. No. 16/418,439, filed May 21, 2019, which is a continuation of application Ser. No. 15/348,995, filed Nov. 11, 2016, issued May 21, 2019, as U.S. Pat. No. 10,296,327, entitled "Methods and Systems that Share Resources Among Multiple, Interdependent Release Pipelines" which claims the benefit and priority of IN 201641035334, filed Oct. 15, 2016, all of which are incorporated by reference herein in their entirety.

TECHNICAL FIELD

The current document is directed to workflow-based cloud-management systems and, in particular, to an automated-application-release-management subsystem.

BACKGROUND

Early computer systems were generally large, single-processor systems that sequentially executed jobs encoded on huge decks of Hollerith cards. Over time, the parallel evolution of computer hardware and software produced main-frame computers and minicomputers with multi-tasking operation systems, increasingly capable personal computers, workstations, and servers, and, in the current environment, multi-processor mobile computing devices, personal computers, and servers interconnected through global networking and communications systems with one another and with massive virtual data centers and virtualized cloud-computing facilities. This rapid evolution of computer systems has been accompanied with greatly expanded needs for computer-system management and administration. Currently, these needs have begun to be addressed by highly capable automated management and administration tools and facilities. As with many other types of computational systems and facilities, from operating systems to applications, many different types of automated administration and management facilities have emerged, providing many different products with overlapping functionalities, but each also providing unique functionalities and capabilities. Owners, managers, and users of large-scale computer systems continue to seek methods and technologies to provide efficient and cost-effective management and administration of, and development of applications within, cloud-computing facilities and other large-scale computer systems.

SUMMARY

The current document is directed to automated application-release-management facilities that, in a described implementation, coordinate continuous development and release of cloud-computing applications. The application-release-management process is specified, in the described implementation, by application-release-management pipelines, each pipeline comprising one or more stages, with each stage comprising one or more tasks. The currently described methods and systems allow resources to be shared among multiple, interdependent release pipelines and allow access to shared resources to be controlled.

BRIEF DESCRIPTION OF THE DRAWINGS

FIG. 4 illustrates generalized hardware and software components of a general-purpose computer system, such as a general-purpose computer system having an architecture similar to that shown in FIG. 1.

FIGS. 14A-B include a table of different types of elements that may be included in a workflow.

FIGS. 16A-C illustrate an example implementation and configuration of virtual appliances within a cloud-computing facility that implement the workflow-based management and administration facilities of the above-described WFMAD.

FIGS. 25A-E illustrate task execution controlled by an automated-application-release-management-subsystem management controller, subsequently referred to as a "management controller" in this document.

FIGS. 27A-E illustrate an example parameter, parameter-specifying subexpressions, and example specification of inter-task parameter-value exchange via the graphical user interface provided by the automated-application-release-management subsystem.

FIGS. 38A-B illustrate additional logical entities used by the currently disclosed methods and subsystems.

FIGS. 39A-C illustrate an example relational-database implementation for the global-context database that includes stored data that represents keys, tags, users, user groups, resources, and pipelines.

FIGS. 40A-C illustrate certain of the enhancement made to the user interface (3504 in FIG. 35) for the automated application-release-management subsystem to provide for resource sharing and control of access to shared resources.

DETAILED DESCRIPTION

Figure 1:
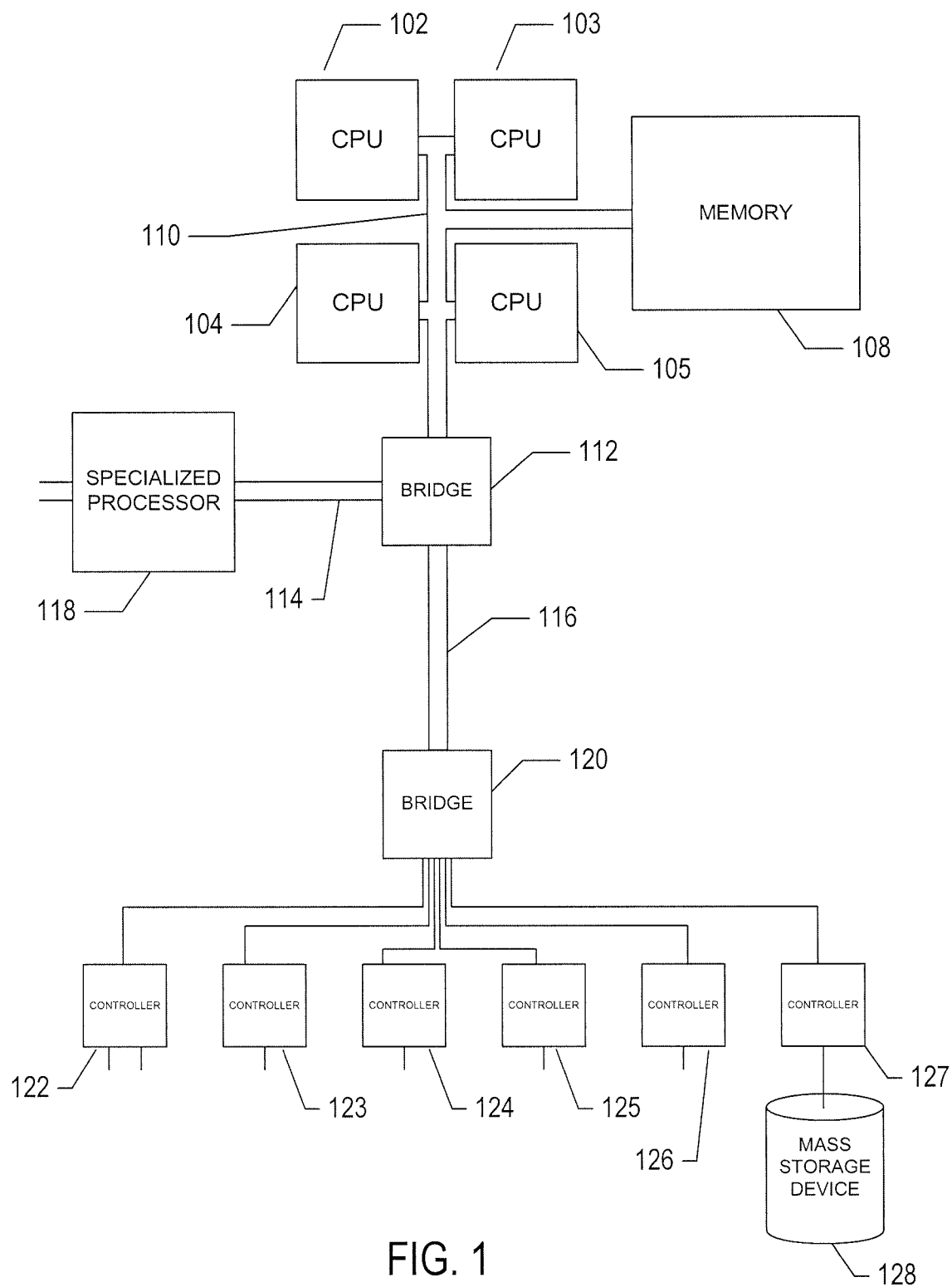
FIG. 1 provides a general architectural diagram for various types of computers.

The current document is directed to an automated-application-release-management subsystem. In a first subsection, below, a detailed description of computer hardware, complex computational systems, and virtualization is provided with reference to FIGS. 1-10. In a second subsection, discussion of a workflow-based cloud-management facility that includes the currently disclosed automated-application-release-management subsystem is provided with reference to FIGS. 11-20B. In a third subsection, branching pipelines facilitated by gating rules are discussed. In a fourth subsection, parameter exchange between stages within release pipelines is discussed. In a fifth subsection, the REST Protocol and RESTful Entrypoints are Discussed. In a sixth subsection, expansion of the availability of entrypoint resources for use by release-pipeline tasks is discussed. Finally, in a seventh subsection, methods and systems for sharing of, and control of access to, resources among multiple, interdependent release pipelines is discussed.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
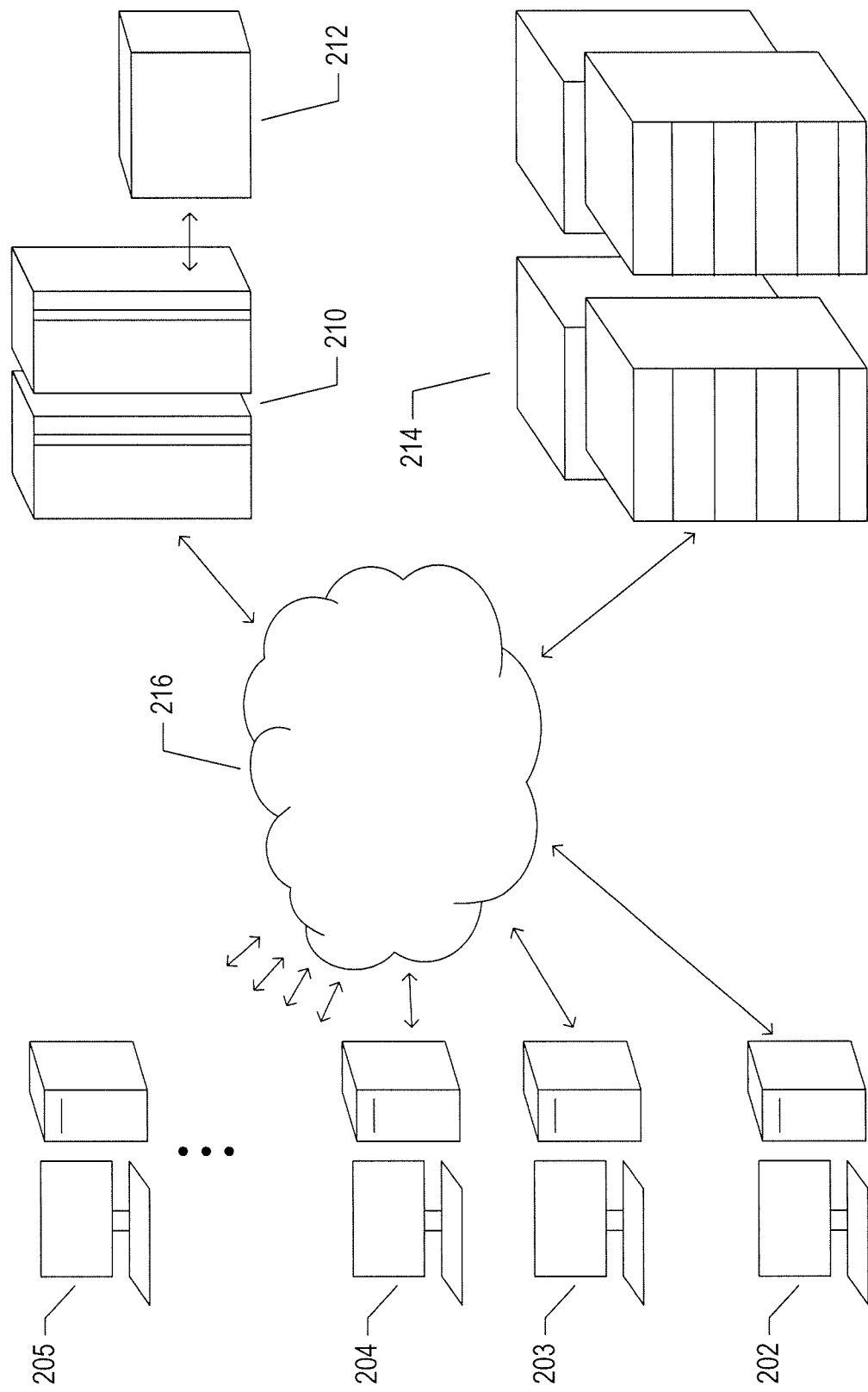
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
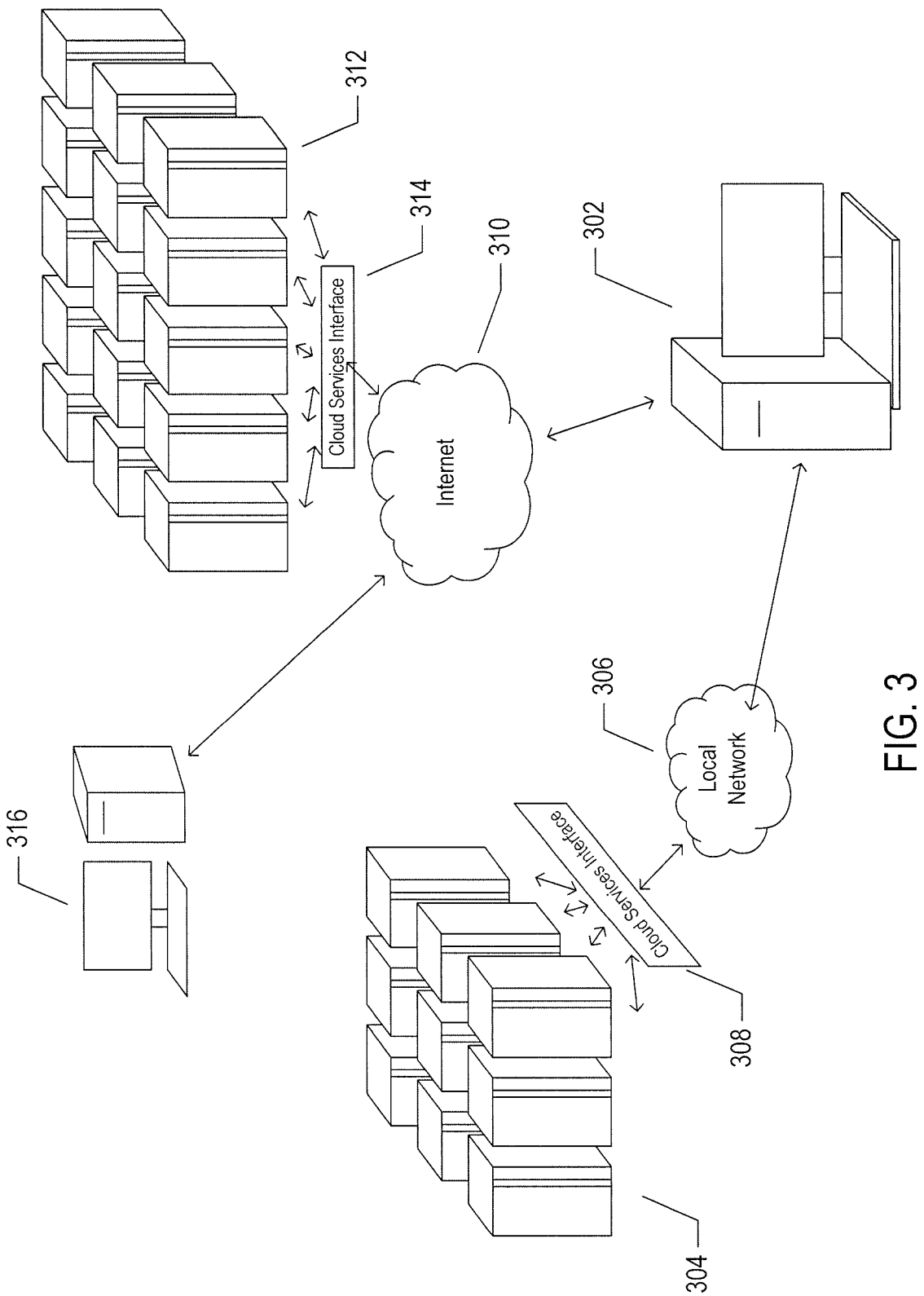
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
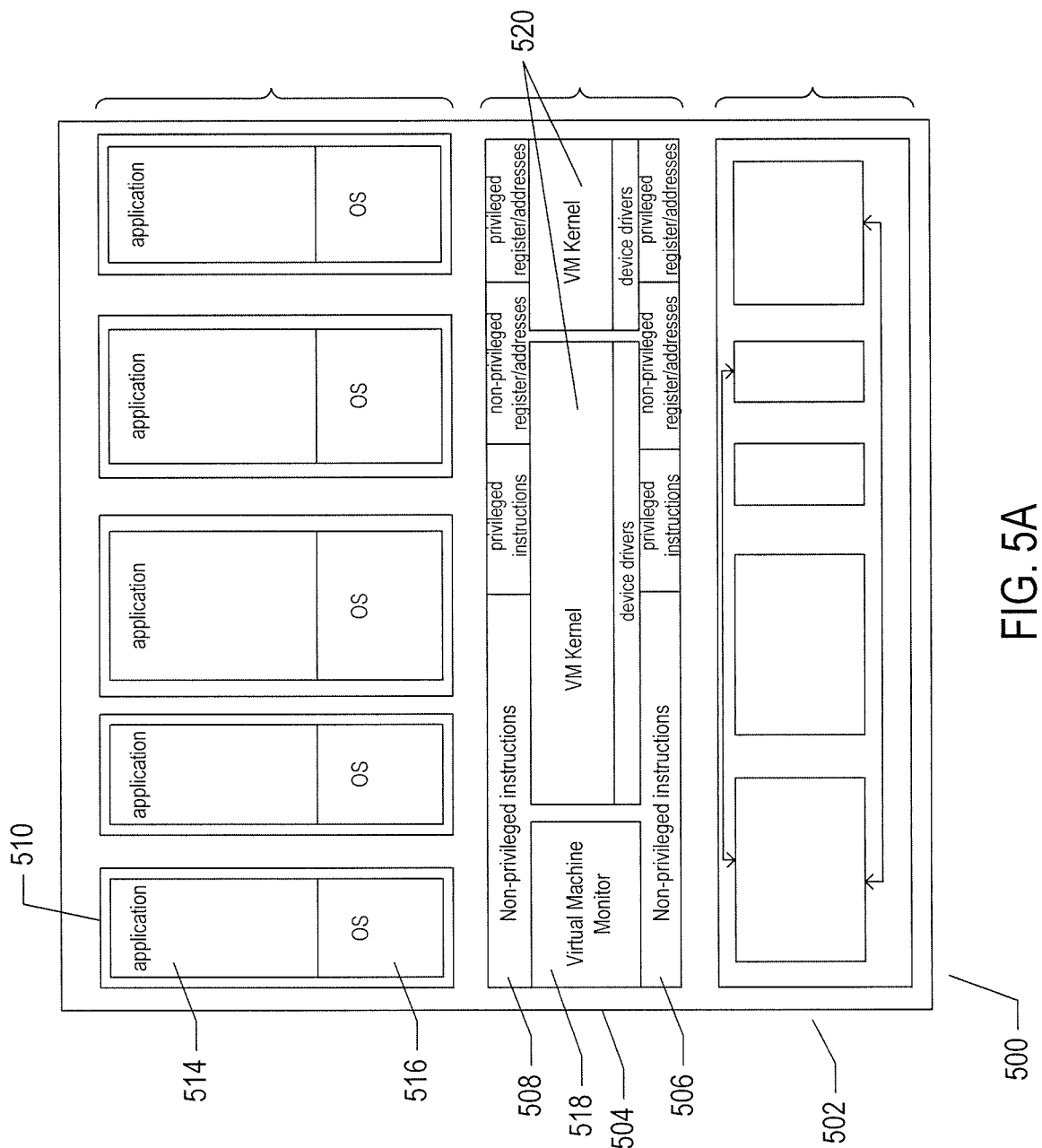
FIGS. 5A-B illustrate two types of virtual machine and virtual-machine execution environments.
Figure 5B:
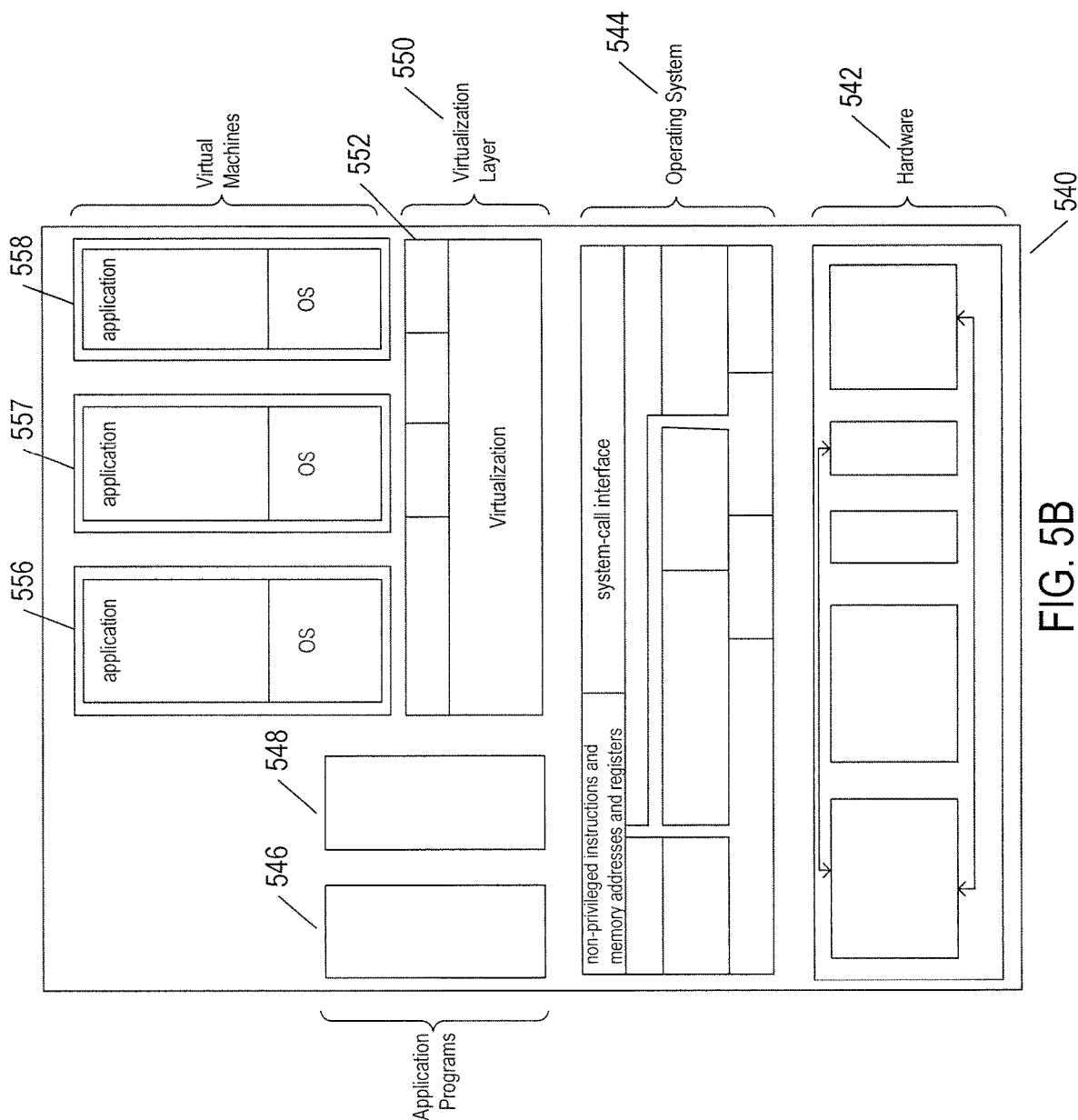

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
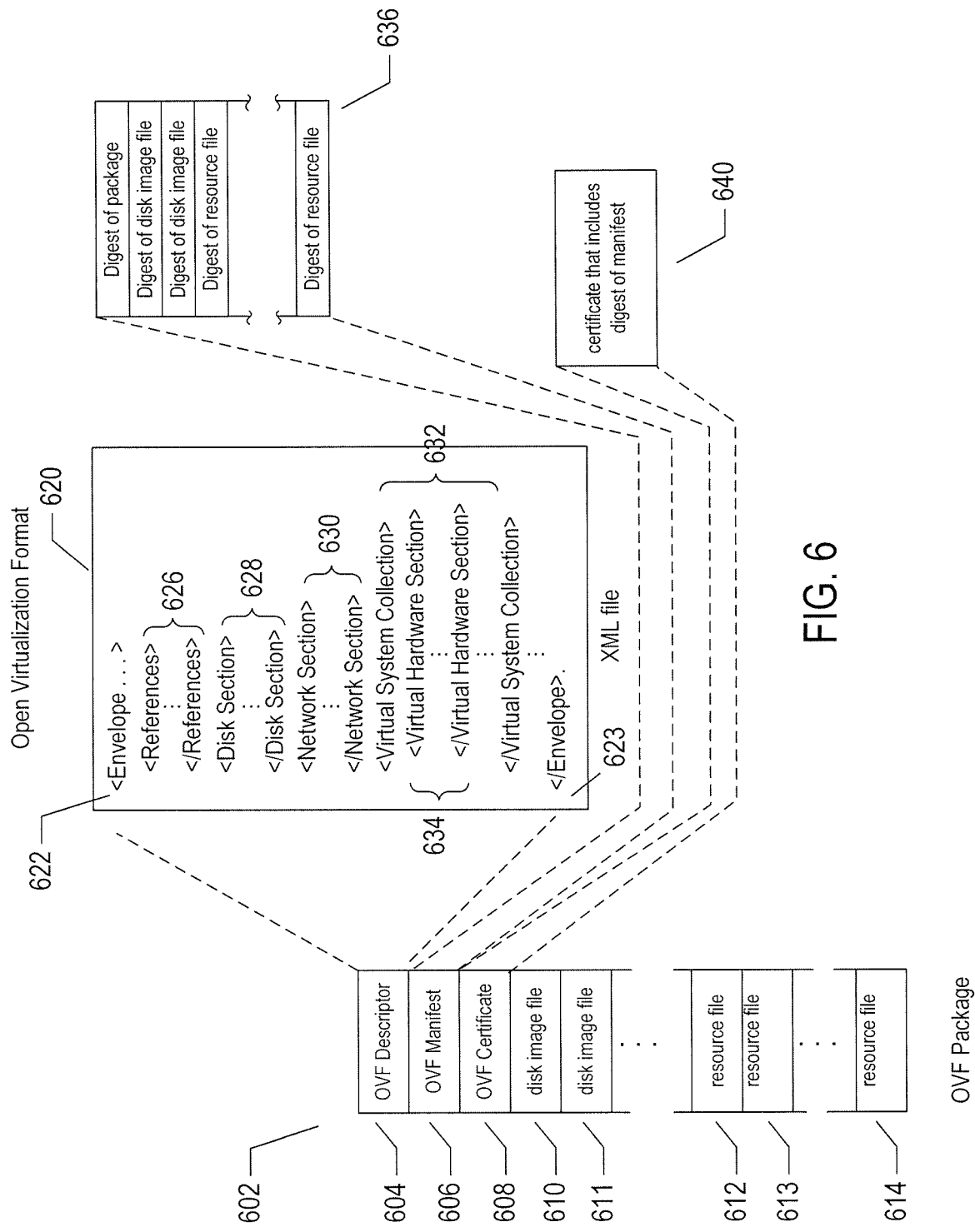
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
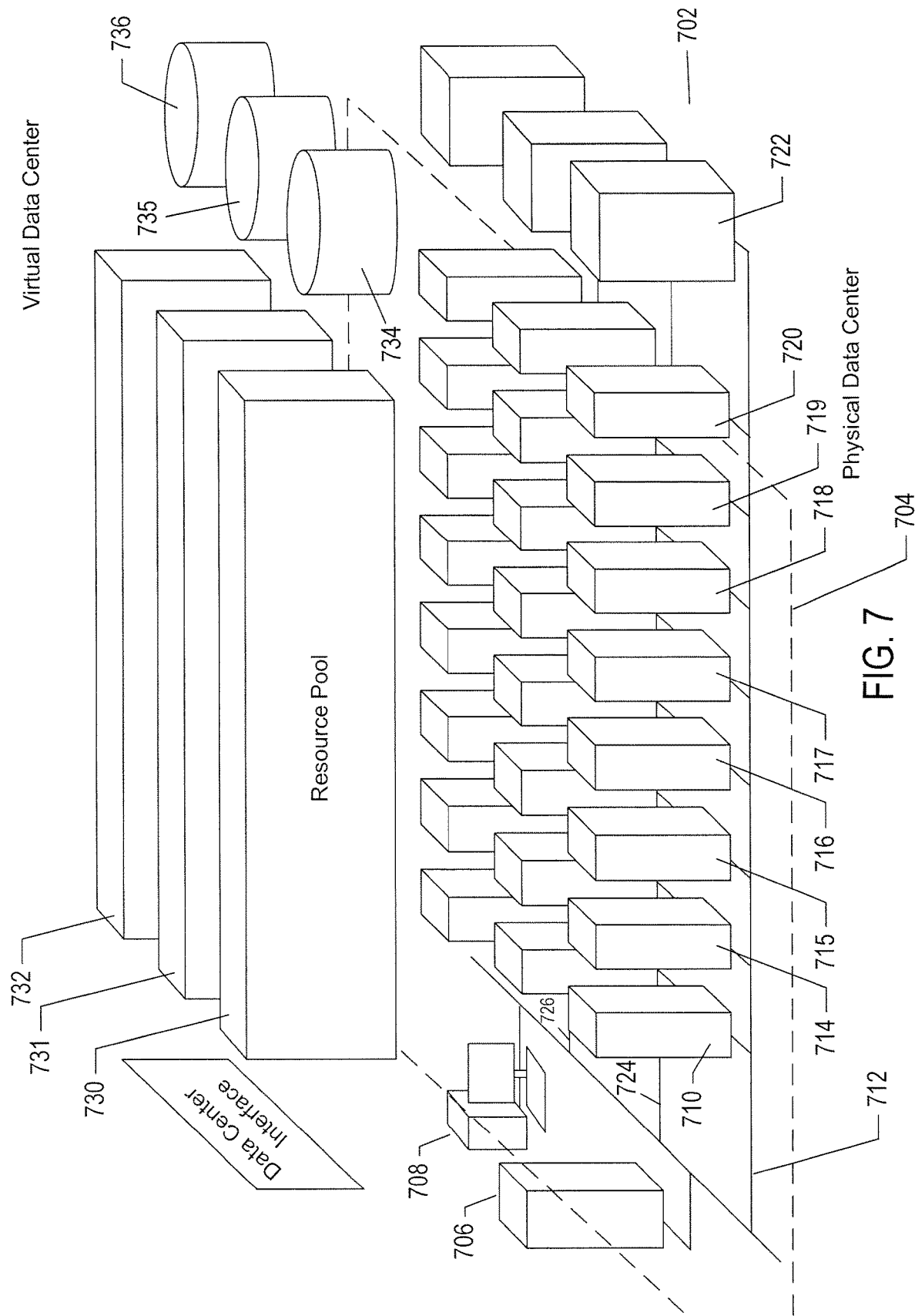
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
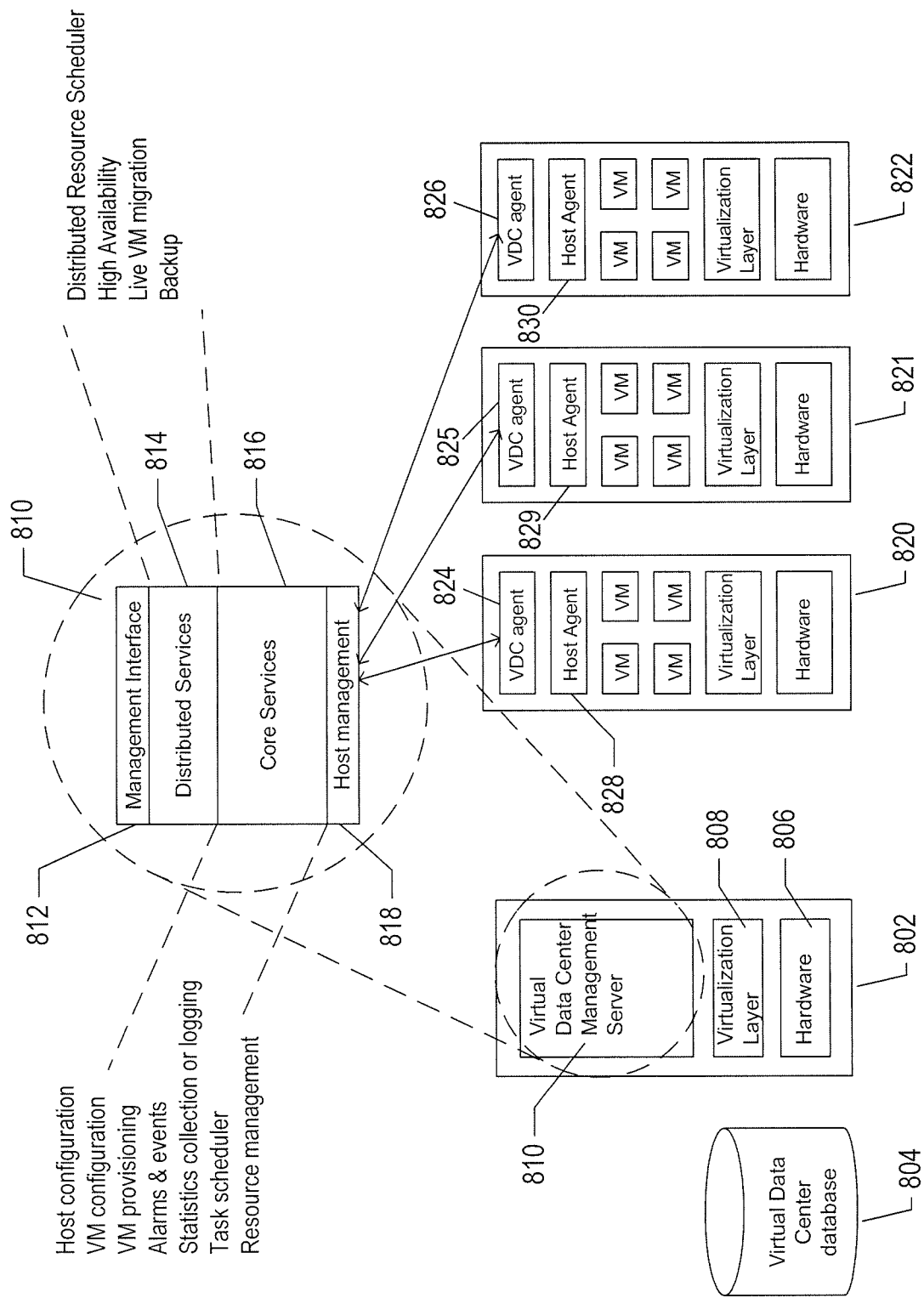
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
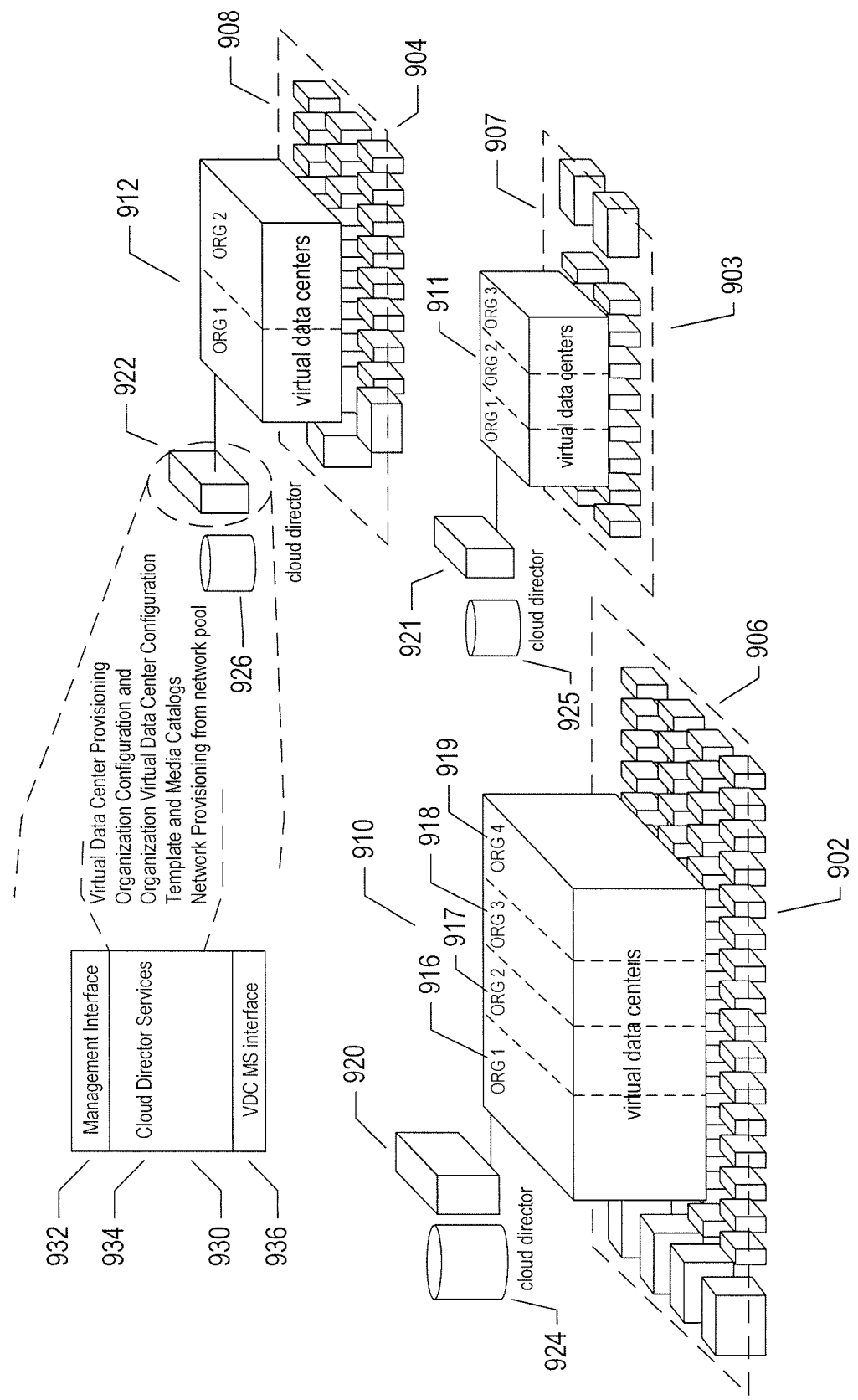
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
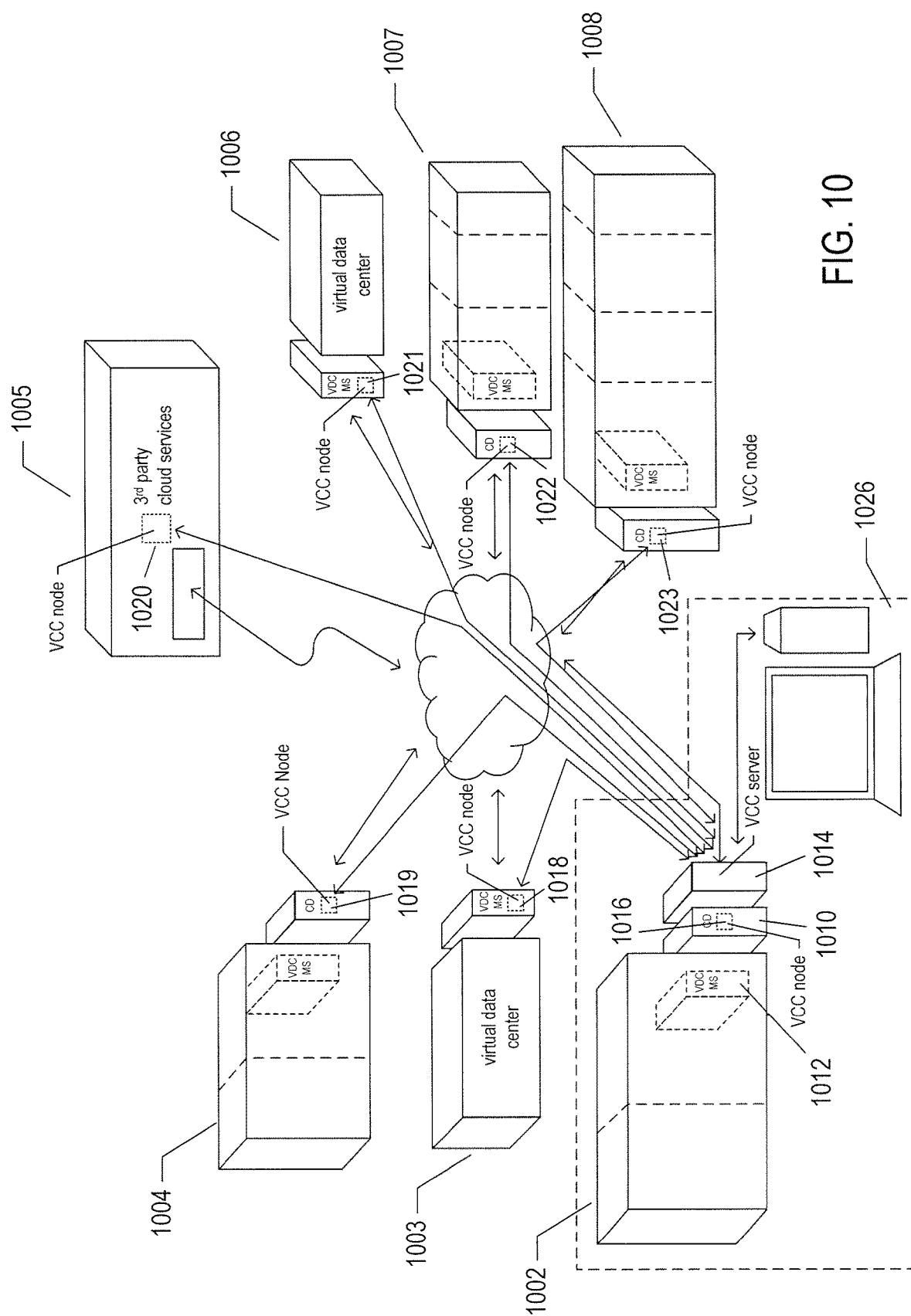
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
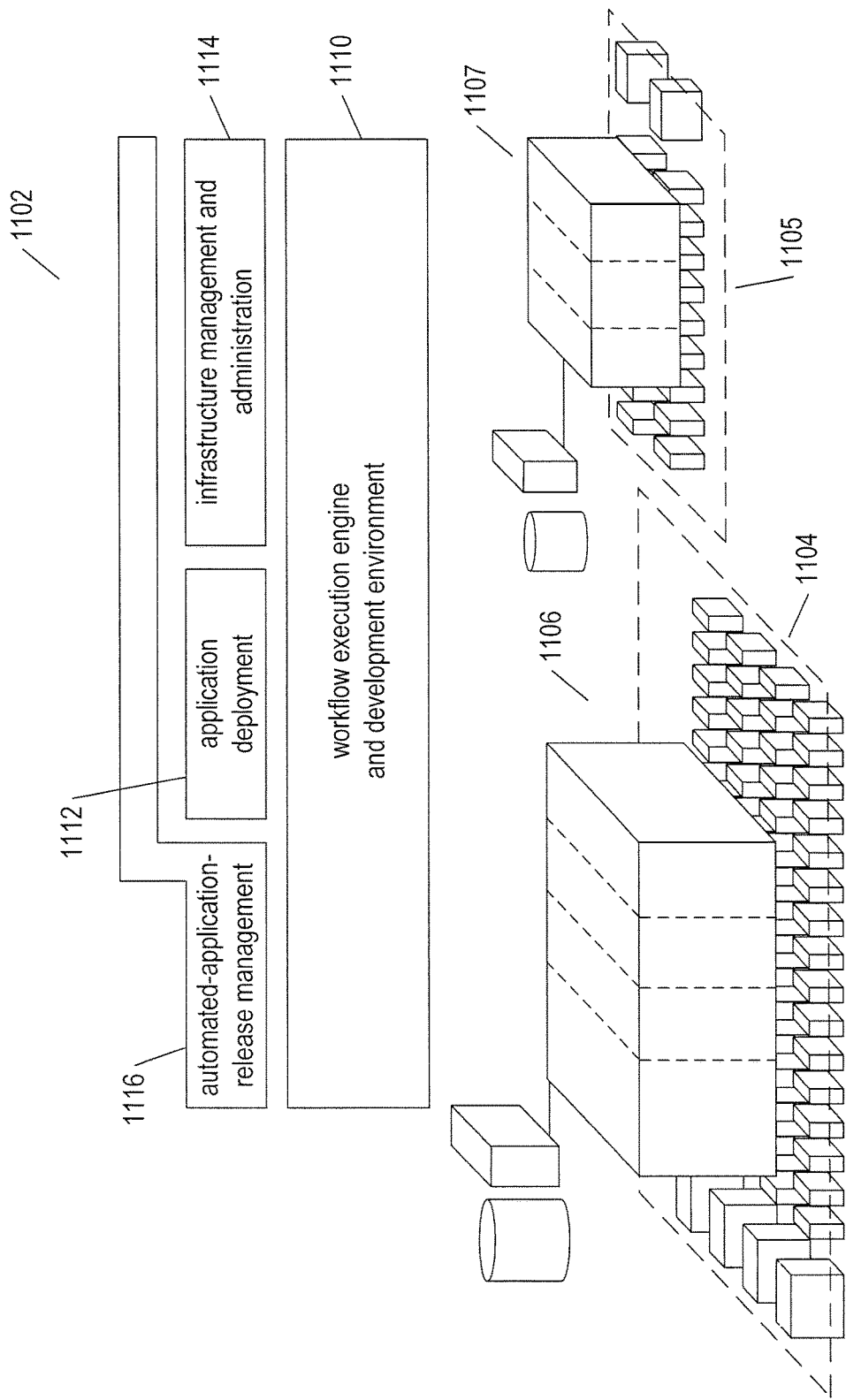
FIG. 11 shows a workflow-based cloud-management facility that has been developed to provide a powerful administrative and development interface to multiple multi-tenant cloud-computing facilities.

Workflow-Based Cloud Management Including an Automated-Application-Release-Management Subsystem FIG. 11 shows workflow-based cloud-management facility that has been developed to provide a powerful administrative and development interface to multiple multi-tenant cloud-computing facilities. The workflow-based management, administration, and development facility ("WF-MAD") is used to manage and administer cloud-computing aggregations, such as those discussed above with reference to FIG. 10, cloud-computing aggregations, such as those discussed above with reference to FIG. 9, and a variety of additional types of cloud-computing facilities as well as to deploy applications and continuously and automatically release complex applications on various types of cloud-computing aggregations. As shown in FIG. 11, the WFMAD 1102 is implemented above the physical hardware layers 1104 and 1105 and virtual data centers 1106 and 1107 of a cloud-computing facility or cloud-computing-facility aggregation. The WFMAD includes a workflow-execution engine and development environment 1110, an application-deployment facility 1112, an infrastructure-management-and-administration facility 1114, and an automated-application-release-management facility 1116. The workflow-execution engine and development environment 1110 provides an integrated development environment for constructing, validating, testing, and executing graphically expressed workflows, discussed in detail below. Workflows are high-level programs with many built-in functions, scripting tools, and development tools and graphical interfaces. Workflows provide an underlying foundation for the infrastructure-management-and-administration facility 1114, the application-development facility 1112, and the automated-application-release-management facility 1116. The infrastructure-management-and-administration facility 1114 provides a powerful and intuitive suite of management and administration tools that allow the resources of a cloud-computing facility or cloud-computing-facility aggregation to be distributed among clients and users of the cloud-computing facility or facilities and to be administered by a hierarchy of general and specific administrators. The infrastructure-management-and-administration facility 1114 provides interfaces that allow service architects to develop various types of services and resource descriptions that can be provided to users and clients of the cloud-computing facility or facilities, including many management and administrative services and functionalities implemented as workflows. The application-deployment facility 1112 provides an integrated application-deployment environment to facilitate building and launching complex cloud-resident applications on the cloud-computing facility or facilities. The application-deployment facility provides access to one or more artifact repositories that store and logically organize binary files and other artifacts used to build complex cloud-resident applications as well as access to automated tools used, along with workflows, to develop specific automated application-deployment tools for specific cloud-resident applications. The automated-application-release-management facility 1116 provides workflow-based automated release-management tools that enable cloud-resident-application developers to continuously generate application releases produced by automated deployment, testing, and validation functionalities. Thus, the WFMAD 1102 provides a powerful, programmable, and extensible management, administration, and development platform to allow cloud-computing facilities and cloud-computing-facility aggregations to be used and managed by organizations and teams of individuals.

Figure 12:
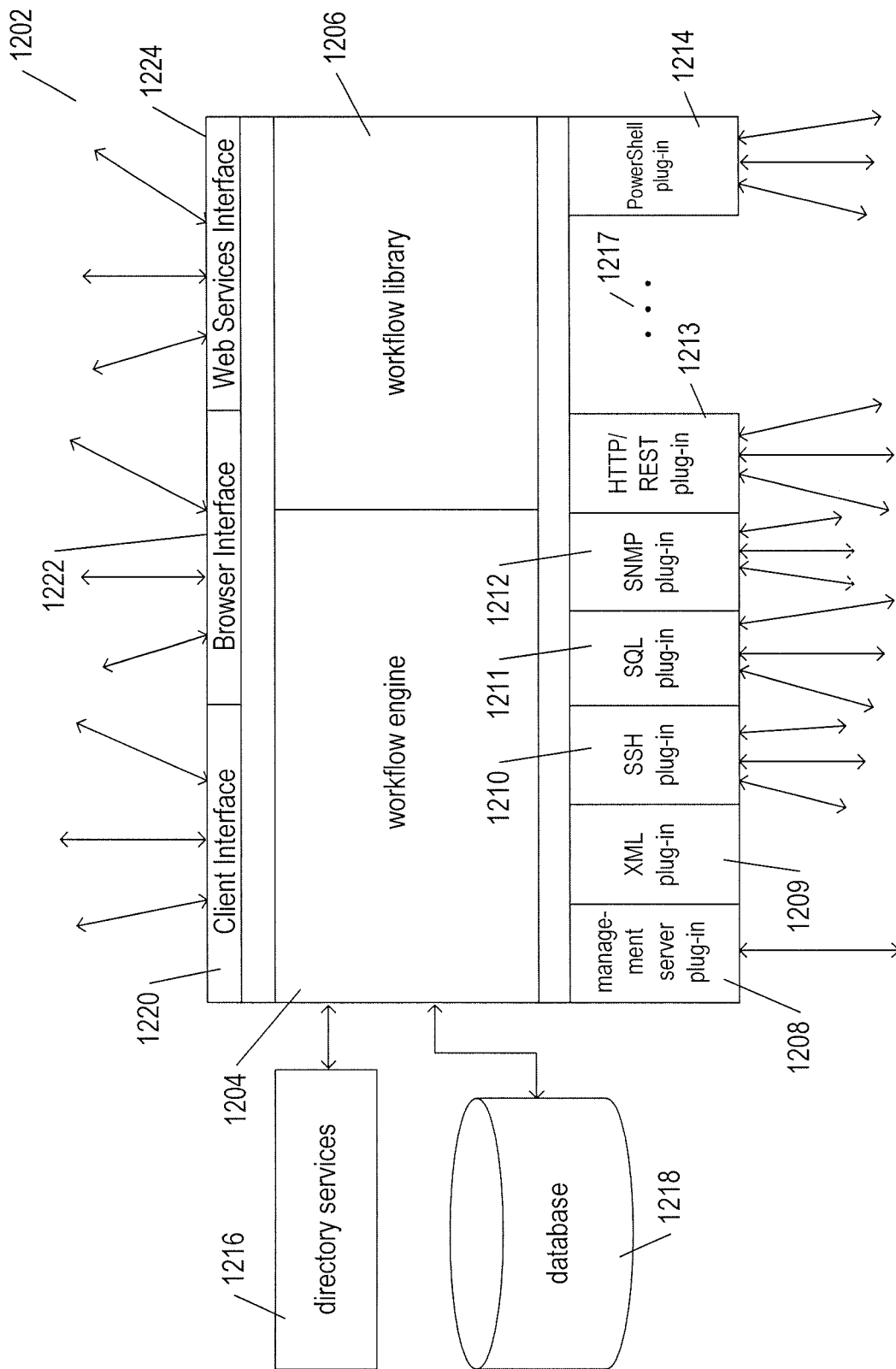
FIG. 12 provides an architectural diagram of the workflow-execution engine and development environment.

Next, the workflow-execution engine and development environment is discussed in greater detail. FIG. 12 provides an architectural diagram of the workflow-execution engine and development environment. The workflow-execution engine and development environment 1202 includes a workflow engine 1204, which executes workflows to carry out the many different administration, management, and development tasks encoded in workflows that comprise the functionalities of the WFMAD. The workflow engine, during execution of workflows, accesses many built-in tools and functionalities provided by a workflow library 1206. In addition, both the routines and functionalities provided by the workflow library and the workflow engine access a wide variety of tools and computational facilities, provided by a wide variety of third-party providers, through a large set of plug-ins 1208-1214. Note that the ellipses 1216 indicate that many additional plug-ins provide, to the workflow engine and workflow-library routines, access to many additional third-party computational resources. Plug-in 1208 provides for access, by the workflow engine and workflow-library routines, to a cloud-computing-facility or cloud-computing-facility-aggregation management server, such as a cloud director (920 in FIG. 9) or VCC server (1014 in FIG. 10). The XML plug-in 1209 provides access to a complete document object model ("DOM") extensible markup language ("XML") parser. The SSH plug-in 1210 provides access to an implementation of the Secure Shell v2 ("SSH-2") protocol. The structured query language ("SQL") plug-in 1211 provides access to a Java database connectivity ("JDBC") API that, in turn, provides access to a wide range of different types of databases. The simple network management protocol ("SNMP") plug-in 1212 provides access to an implementation of the SNMP protocol that allows the workflow-execution engine and development environment to connect to, and receive information from, various SNMP-enabled systems and devices. The hypertext transfer protocol ("HTTP")/representational state transfer ("REST") plug-in 1213 provides access to REST web services and hosts. The PowerShell plug-in 1214 allows the workflow-execution engine and development environment to manage PowerShell hosts and run custom PowerShell operations. The workflow engine 1204 additionally accesses directory services 1216, such as a lightweight directory access protocol ("LDAP") directory, that maintain distributed directory information and manages password-based user login. The workflow engine also accesses a dedicated database 1218 in which workflows and other information are stored. The workflow-execution engine and development environment can be accessed by clients running a client application that interfaces to a client interface 1220, by clients using web browsers that interface to a browser interface 1222, and by various applications and other executables running on remote computers that access the workflow-execution engine and development environment using a REST or small-object-access protocol ("SOAP") via a web-services interface 1224. The client application that runs on a remote computer and interfaces to the client interface 1220 provides a powerful graphical user interface that allows a client to develop and store workflows for subsequent execution by the workflow engine. The user interface also allows clients to initiate workflow execution and provides a variety of tools for validating and debugging workflows. Workflow execution can be initiated via the browser interface 1222 and web-services interface 1224. The various interfaces also provide for exchange of data output by workflows and input of parameters and data to workflows.

Figure 13A:
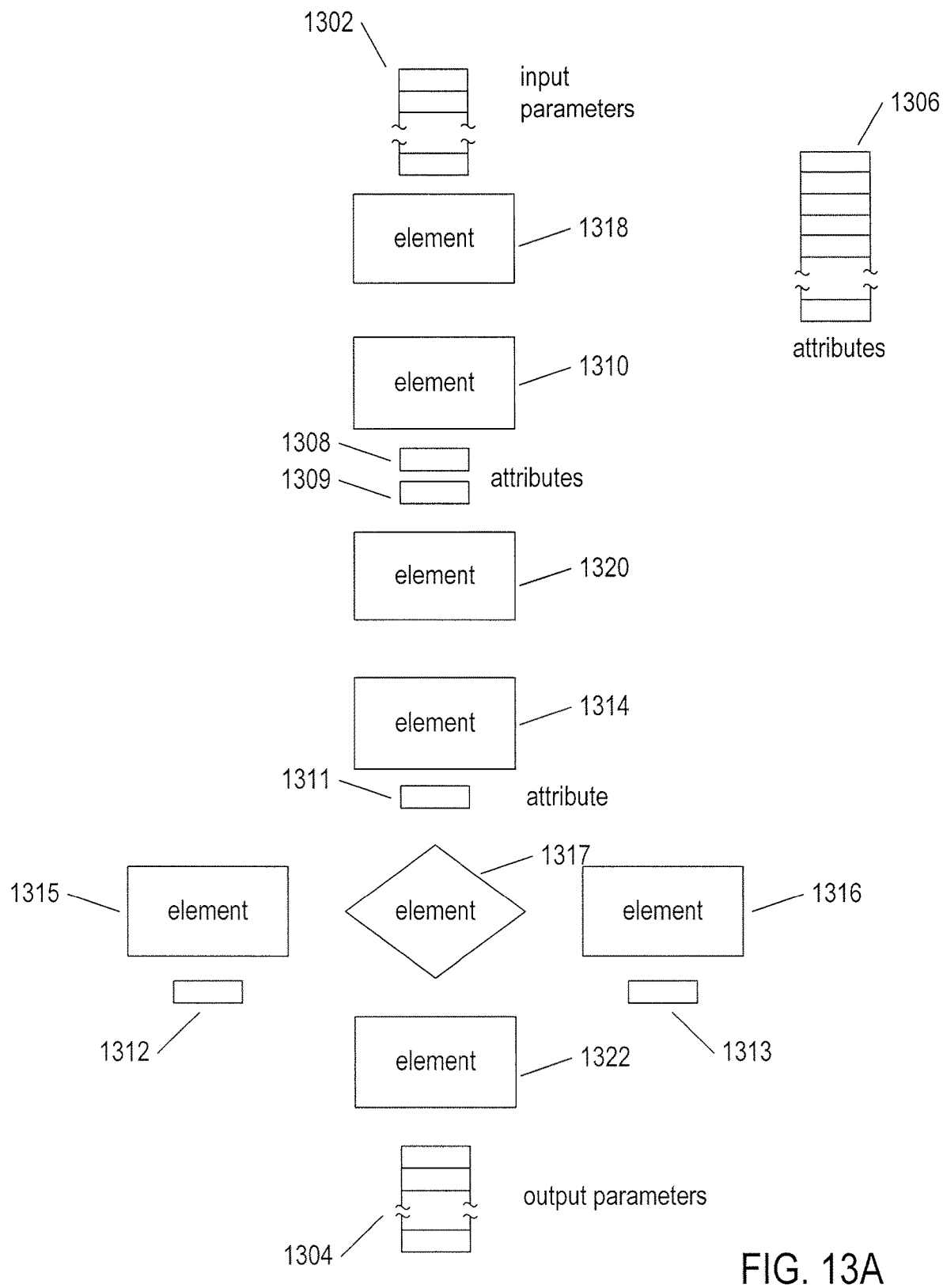
FIGS. 13A-C illustrate the structure of a workflow.
Figure 13B:
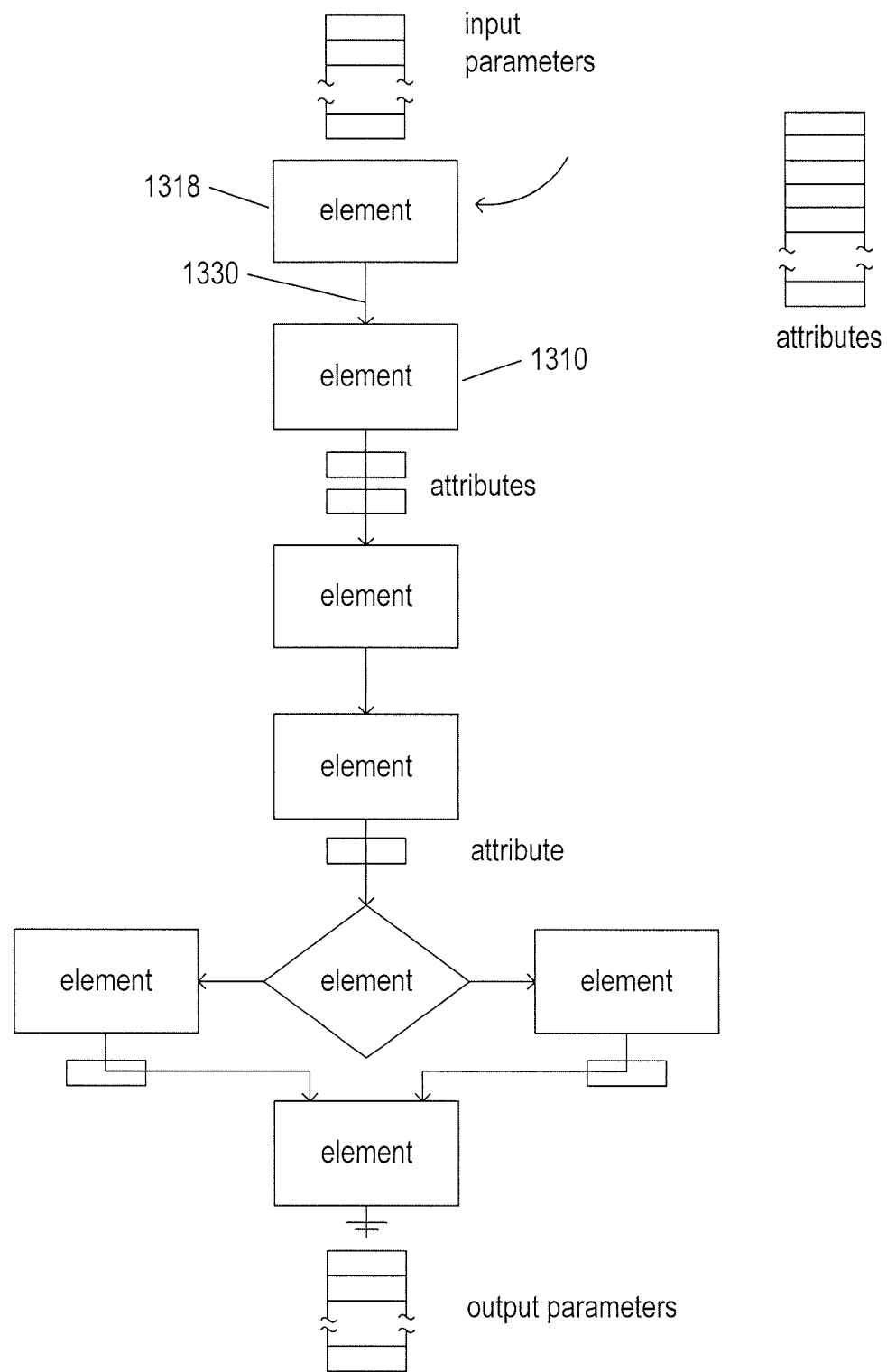
Figure 13C:
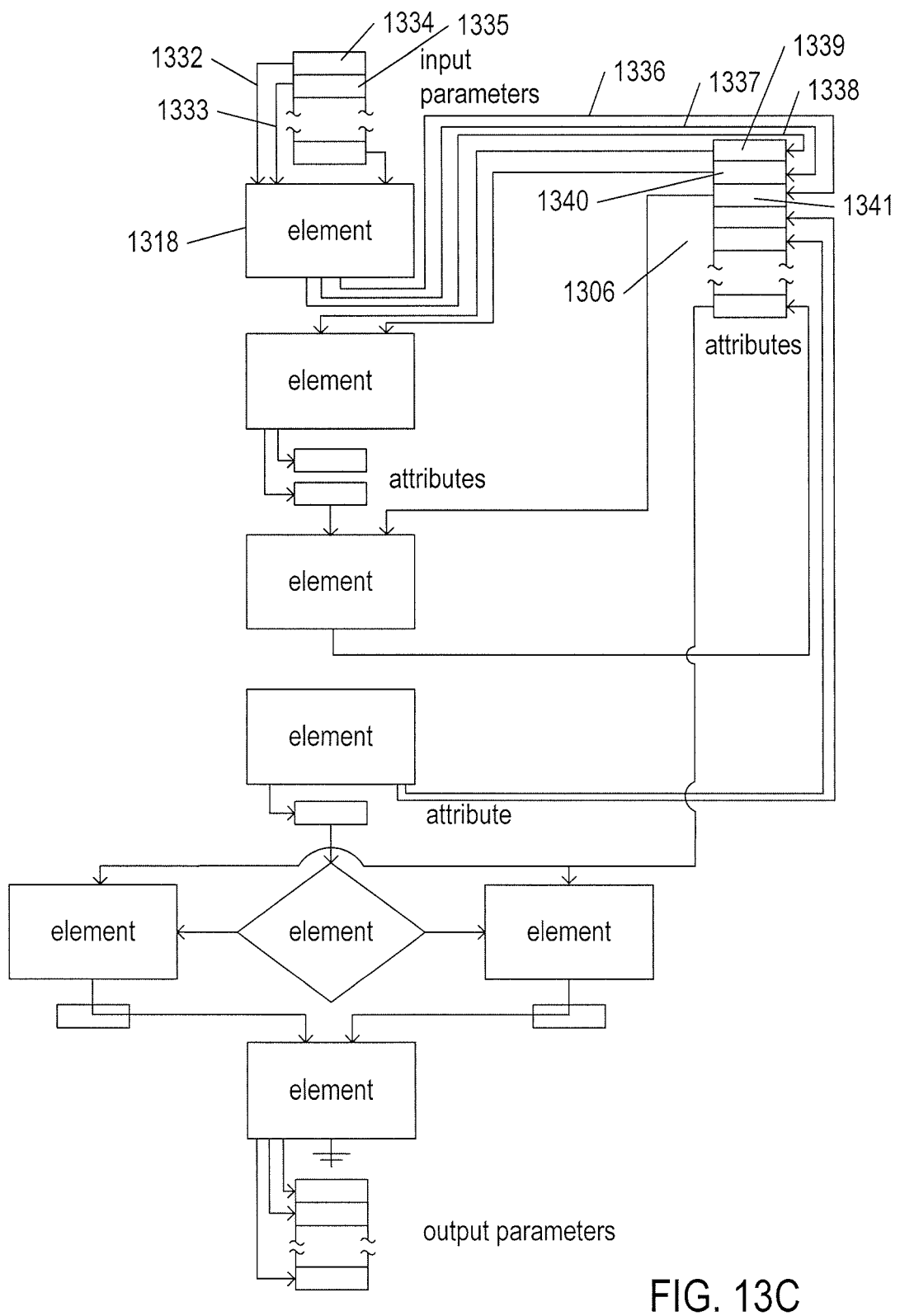

FIGS. 13A-C illustrate the structure of a workflow. A workflow is a graphically represented high-level program. FIG. 13A shows the main logical components of a workflow. These components include a set of one or more input parameters 1302 and a set of one or more output parameters 1304. In certain cases, a workflow may not include input and/or output parameters, but, in general, both input parameters and output parameters are defined for each workflow. The input and output parameters can have various different data types, with the values for a parameter depending on the data type associated with the parameter. For example, a parameter may have a string data type, in which case the values for the parameter can include any alphanumeric string or Unicode string of up to a maximum length. A workflow also generally includes a set of parameters 1306 that store values manipulated during execution of the workflow. This set of parameters is similar to a set of global variables provided by many common programming languages. In addition, attributes can be defined within individual elements of a workflow, and can be used to pass values between elements. In FIG. 13A, for example, attributes 1308-1309 are defined within element 1310 and attributes 1311, 1312, and 1313 are defined within elements 1314, 1315, and 1316, respectively. Elements, such as elements 1318, 1310, 1320, 1314-1316, and 1322 in FIG. 13A, are the execution entities within a workflow. Elements are equivalent to one or a combination of common constructs in programming languages, including subroutines, control structures, error handlers, and facilities for launching asynchronous and synchronous procedures. Elements may correspond to script routines, for example, developed to carry out an almost limitless number of different computational tasks. Elements are discussed, in greater detail, below.

As shown in FIG. 13B, the logical control flow within a workflow is specified by links, such as link 1330 which indicates that element 1310 is executed following completion of execution of element 1318. In FIG. 13B, links between elements are represented as single-headed arrows. Thus, links provide the logical ordering that is provided, in a common programming language, by the sequential ordering of statements. Finally, as shown in FIG. 13C, bindings that bind input parameters, output parameters, and attributes to particular roles with respect to elements specify the logical data flow in a workflow. In FIG. 13C, single-headed arrows, such as single-headed arrow 1332, represent bindings between elements and parameters and attributes. For example, bindings 1332 and 1333 indicate that the values of the first input parameters 1334 and 1335 are input to element 1318. Thus, the first two input parameters 1334-1335 play similar roles as arguments to functions in a programming language. As another example, the bindings represented by arrows 1336-1338 indicate that element 1318 outputs values that are stored in the first three attributes 1339, 1340, and 1341 of the set of attributes 1306.

Thus, a workflow is a graphically specified program, with elements representing executable entities, links representing logical control flow, and bindings representing logical data flow. A workflow can be used to specific arbitrary and arbitrarily complex logic, in a similar fashion as the specification of logic by a compiled, structured programming language, an interpreted language, or a script language.

FIGS. 14A-B include a table of different types of elements that may be included in a workflow. Workflow elements may include a start-workflow element 1402 and an end-workflow element 1404, examples of which include elements 1318 and 1322, respectively, in FIG. 13A. Decision workflow elements 1406-1407, an example of which is element 1317 in FIG. 13A, function as an if-then-else construct commonly provided by structured programming languages. Scriptable-task elements 1408 are essentially script routines included in a workflow. A user-interaction element 1410 solicits input from a user during workflow execution. Waiting-timer and waiting-event elements 1412-1413 suspend workflow execution for a specified period of time or until the occurrence of a specified event. Thrown-exception elements 1414 and error-handling elements 1415-1416 provide functionality commonly provided by throw-catch constructs in common programming languages. A switch element 1418 dispatches control to one of multiple paths, similar to switch statements in common programming languages, such as C and C++. A for each element 1420 is a type of iterator. External workflows can be invoked from a currently executing workflow by a workflow element 1422 or asynchronous-workflow element 1423. An action element 1424 corresponds to a call to a workflow-library routine. A workflow-note element 1426 represents a comment that can be included within a workflow. External workflows can also be invoked by schedule-workflow and nested-workflows elements 1428 and 1429.

Figure 15A:
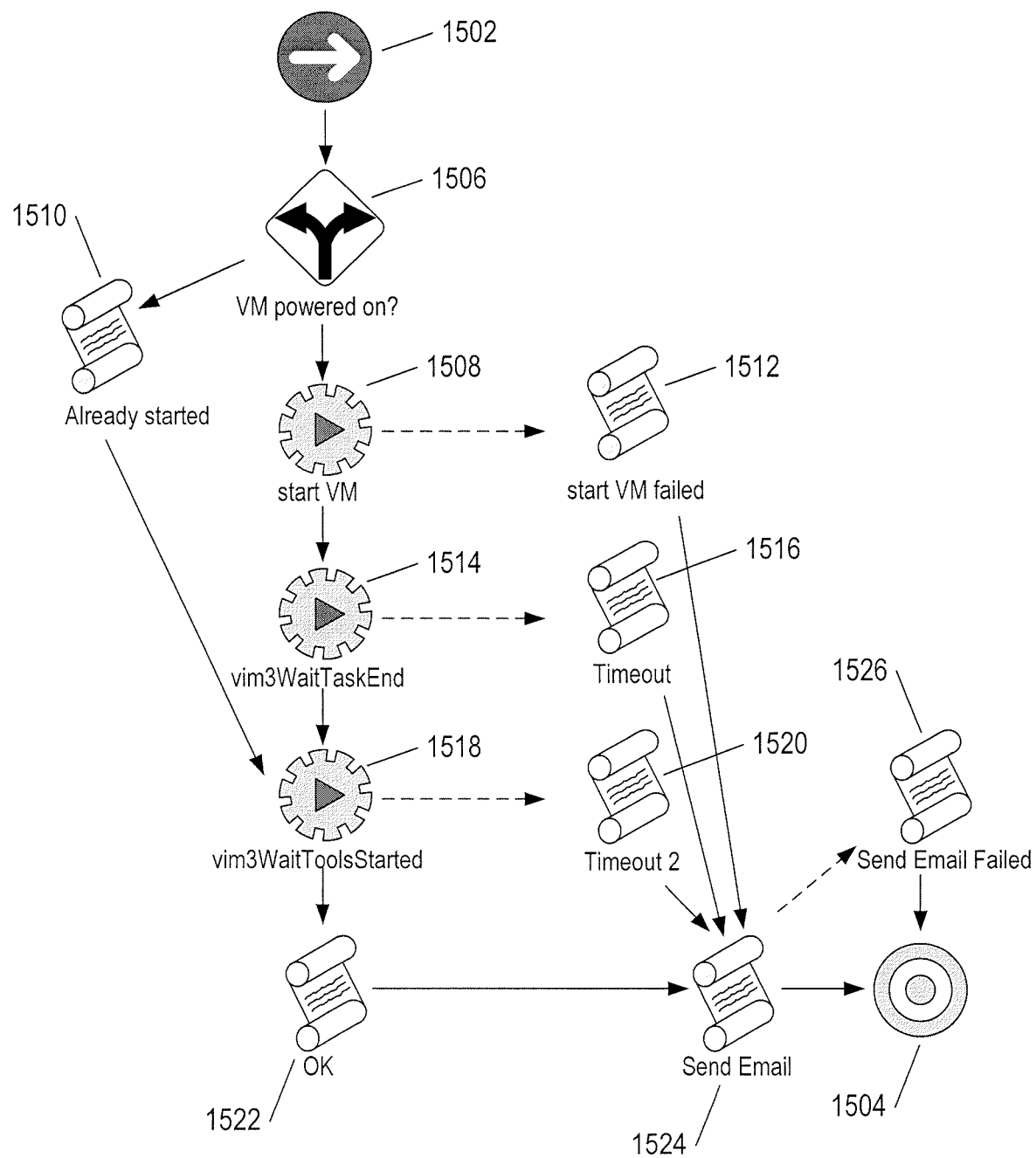
FIGS. 15A-B show an example workflow.
Figure 15B:
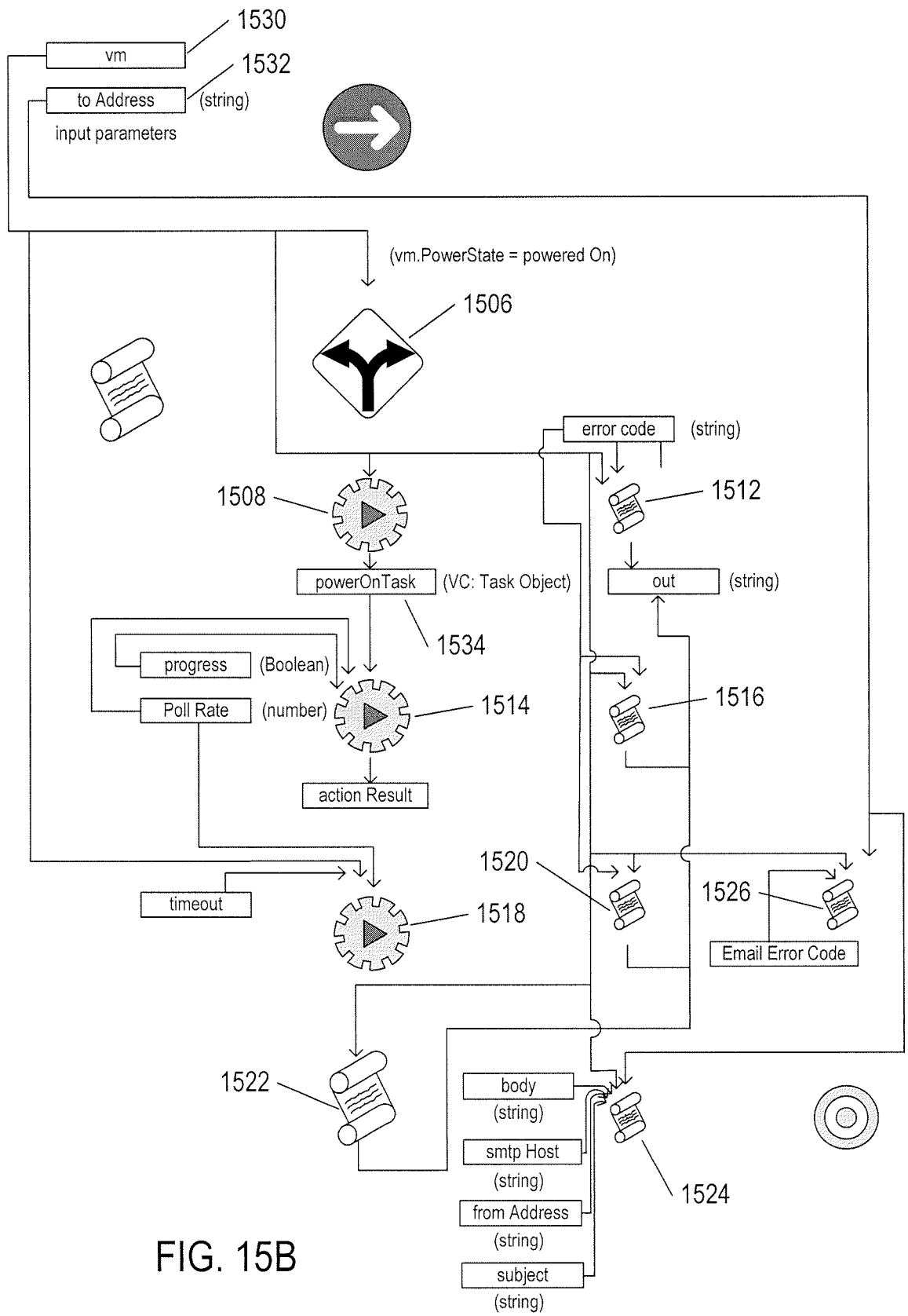

FIGS. 15A-B show an example workflow. The workflow shown in FIG. 15A is a virtual-machine-starting workflow that prompts a user to select a virtual machine to start and provides an email address to receive a notification of the outcome of workflow execution. The prompts are defined as input parameters. The workflow includes a start-workflow element 1502 and an end-workflow element 1504. The decision element 1506 checks to see whether or not the specified virtual machine is already powered on. When the VM is not already powered on, control flows to a start-VM action 1508 that calls a workflow-library function to launch the VM. Otherwise, the fact that the VM was already powered on is logged, in an already-started scripted element 1510. When the start operation fails, a start-VM-failed scripted element 1512 is executed as an exception handler and initializes an email message to report the failure. Otherwise, control flows to a vim3WaitTaskEnd action element 1514 that monitors the VM-starting task. A timeout exception handler is invoked when the start-VM task does not finish within a specified time period. Otherwise, control flows to a vim3WaitToolsStarted task 1518 which monitors starting of a tools application on the virtual machine. When the tools application fails to start, then a second timeout exception handler is invoked 1520. When all the tasks successfully complete, an OK scriptable task 1522 initializes an email body to report success. The email that includes either an error message or a success message is sent in the send-email scriptable task 1524. When sending the email fails, an email exception handler 1526 is called. The already-started, OK, and exception-handler scriptable elements 1510, 1512, 1516, 1520, 1522, and 1526 all log entries to a log file to indicate various conditions and errors. Thus, the workflow shown in FIG. 15A is a simple workflow that allows a user to specify a VM for launching to run an application.

FIG. 15B shows the parameter and attribute bindings for the workflow shown in FIG. 15A. The VM to start and the address to send the email are shown as input parameters 1530 and 1532. The VM to start is input to decision element 1506, start-VM action element 1508, the exception handlers 1512, 1516, 1520, and 1526, the send-email element 1524, the OK element 1522, and the vim3WaitToolsStarted element 1518. The email address furnished as input parameter 1532 is input to the email exception handler 1526 and the send-email element 1524. The VM-start task 1508 outputs an indication of the power on task initiated by the element in attribute 1534 which is input to the vim3WaitTaskEnd action element 1514. Other attribute bindings, input, and outputs are shown in FIG. 15B by additional arrows.

Figure 16A:
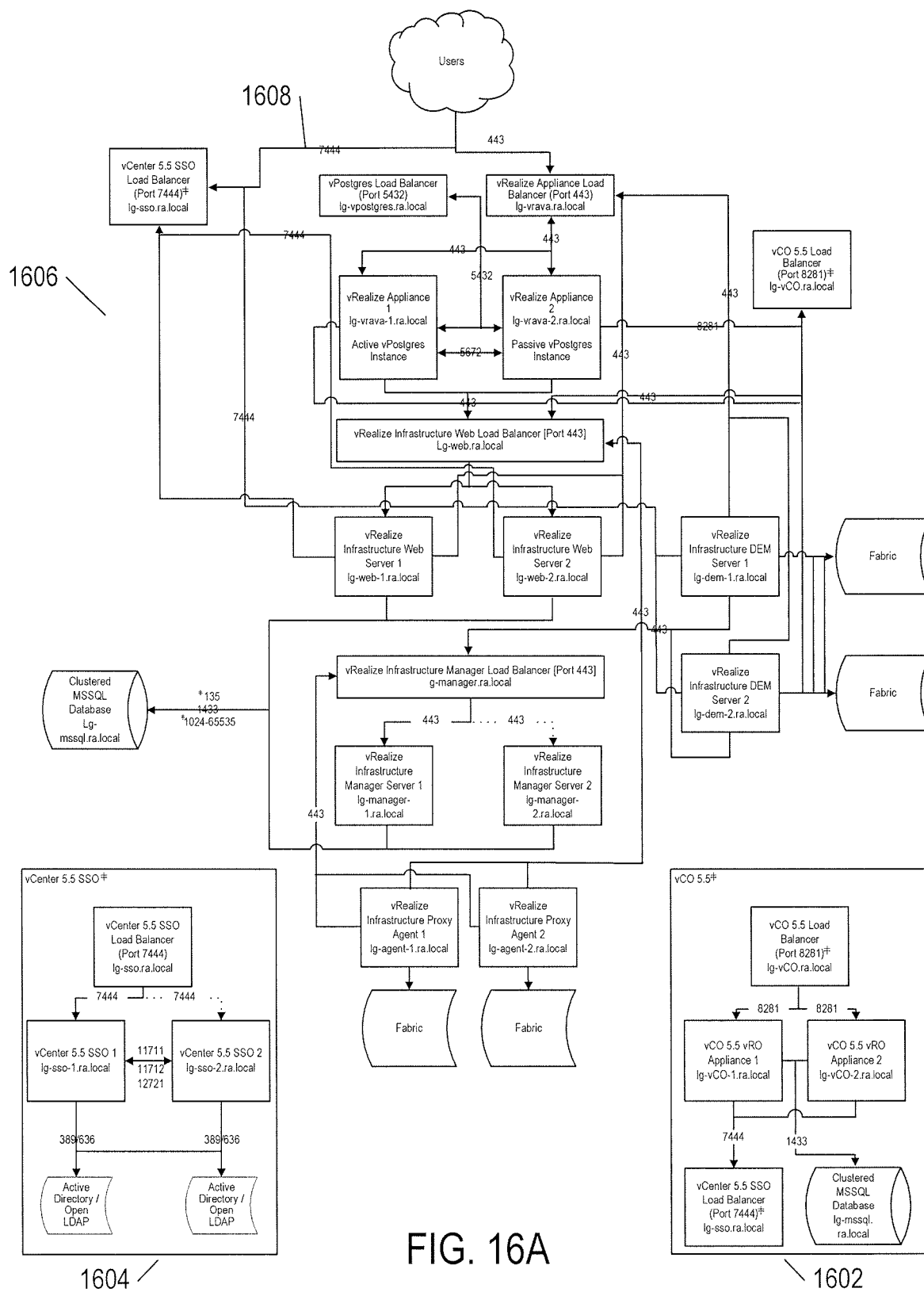

FIGS. 16A-C illustrate an example implementation and configuration of virtual appliances within a cloud-computing facility that implement the workflow-based management and administration facilities of the above-described WFMAD. FIG. 16A shows a configuration that includes the workflow-execution engine and development environment 1602, a cloud-computing facility 1604, and the infrastructure-management-and-administration facility 1606 of the above-described WFMAD. Data and information exchanges between components are illustrated with arrows, such as arrow 1608, labeled with port numbers indicating inbound and outbound ports used for data and information exchanges. FIG. 16B provides a table of servers, the services provided by the server, and the inbound and outbound ports associated with the server. Table 16C indicates the ports balanced by various load balancers shown in the configuration illustrated in FIG. 16A. It can be easily ascertained from FIGS. 16A-C that the WFMAD is a complex, multi-virtual-appliance/virtual-server system that executes on many different physical devices of a physical cloud-computing facility.

Figure 16D:
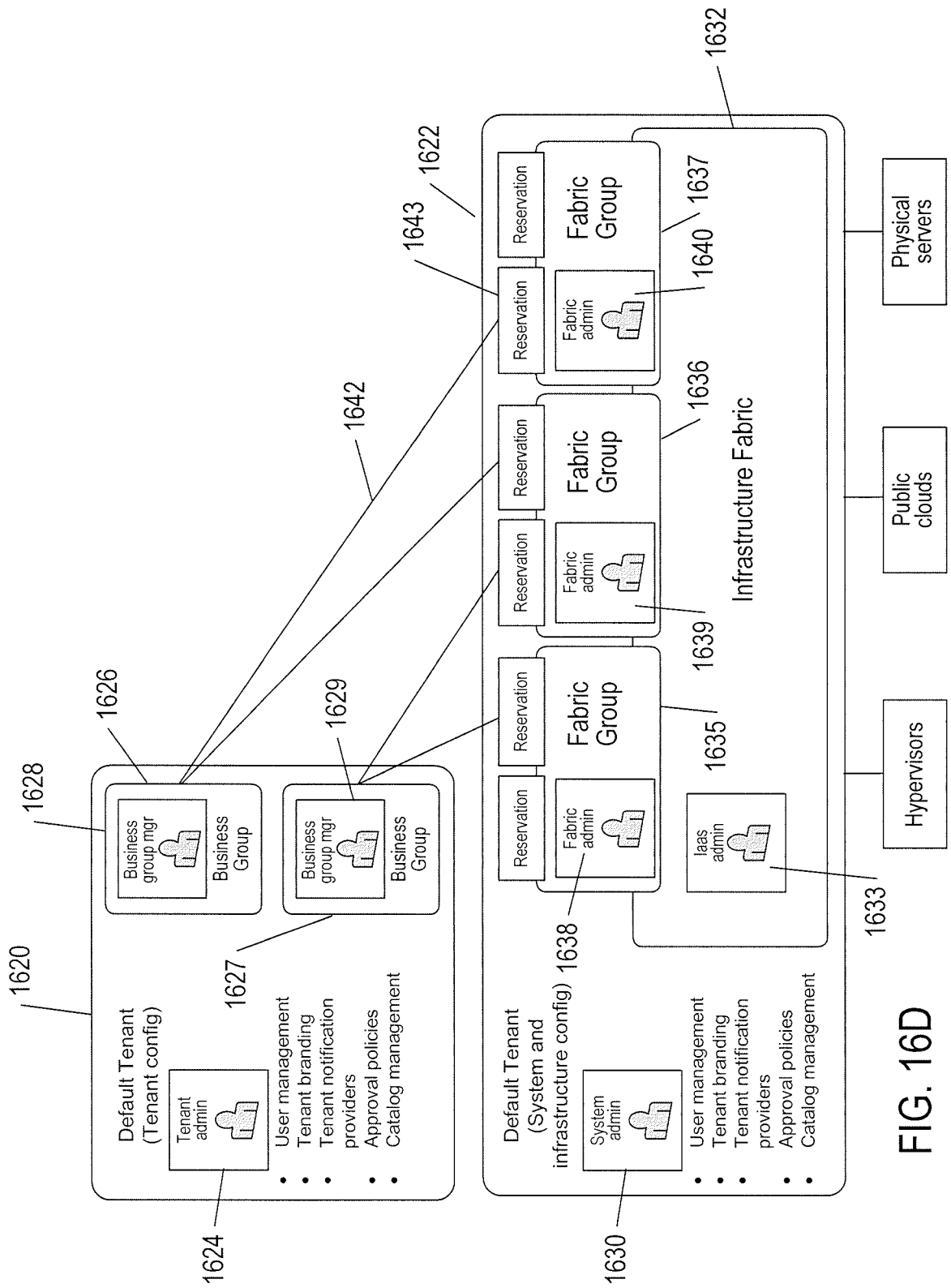
FIGS. 16D-F illustrate the logical organization of users and user roles with respect to the infrastructure-management-and-administration facility of the WFMAD.
Figure 16E:
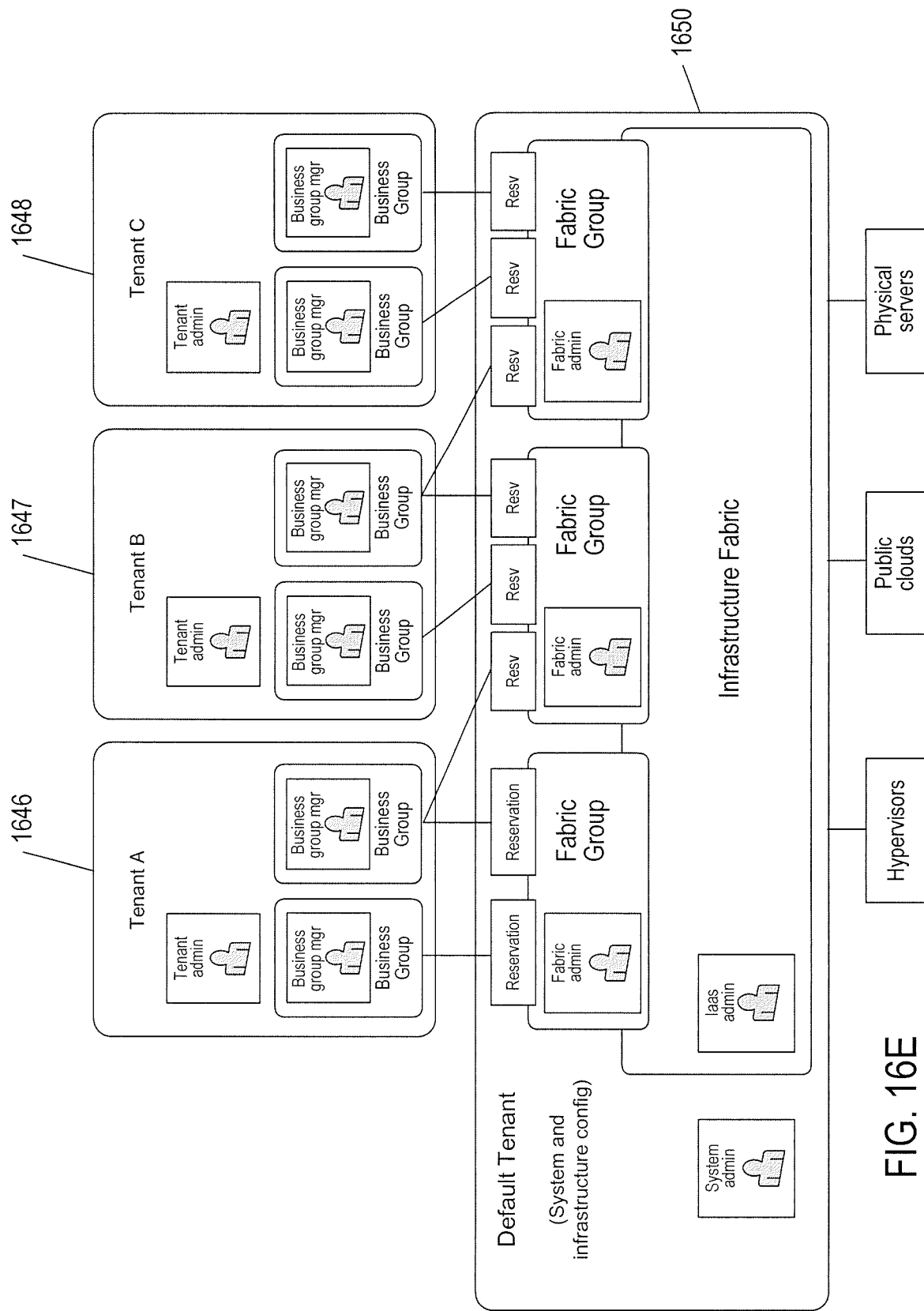
Figure 16F:
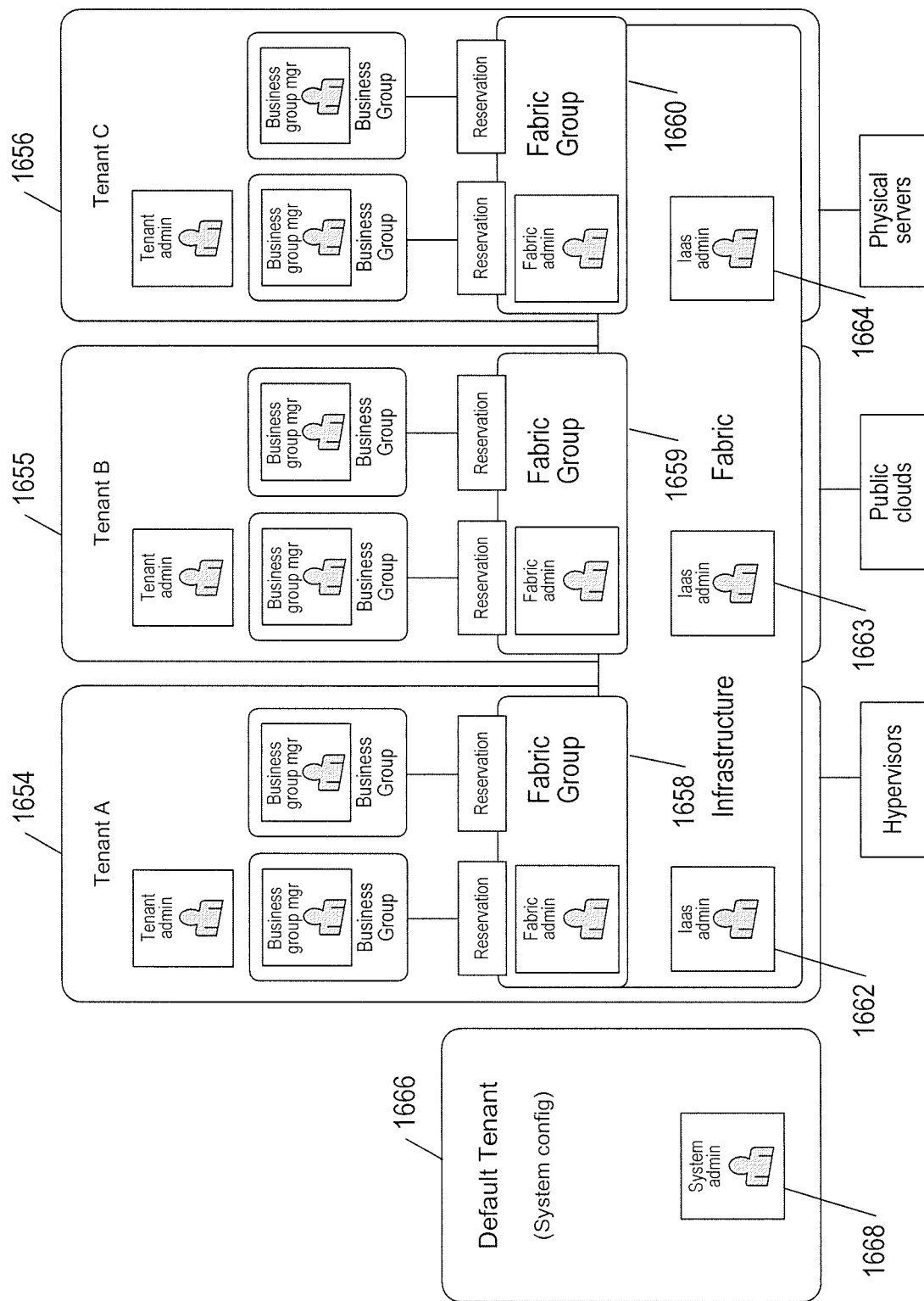

FIGS. 16D-F illustrate the logical organization of users and user roles with respect to the infrastructure-management-and-administration facility of the WFMAD (1114 in FIG. 11). FIG. 16D shows a single-tenant configuration, FIG. 16E shows a multi-tenant configuration with a single default-tenant infrastructure configuration, and FIG. 16F shows a multi-tenant configuration with a multi-tenant infrastructure configuration. A tenant is an organizational unit, such as a business unit in an enterprise or company that subscribes to cloud services from a service provider. When the infrastructure-management-and-administration facility is initially deployed within a cloud-computing facility or cloud-computing-facility aggregation, a default tenant is initially configured by a system administrator. The system administrator designates a tenant administrator for the default tenant as well as an identity store, such as an active-directory server, to provide authentication for tenant users, including the tenant administrator. The tenant administrator can then designate additional identity stores and assign roles to users or groups of the tenant, including business groups, which are sets of users that correspond to a department or other organizational unit within the organization corresponding to the tenant. Business groups are, in turn, associated with a catalog of services and infrastructure resources. Users and groups of users can be assigned to business groups. The business groups, identity stores, and tenant administrator are all associated with a tenant configuration. A tenant is also associated with a system and infrastructure configuration. The system and infrastructure configuration includes a system administrator and an infrastructure fabric that represents the virtual and physical computational resources allocated to the tenant and available for provisioning to users. The infrastructure fabric can be partitioned into fabric groups, each managed by a fabric administrator. The infrastructure fabric is managed by an infrastructure-as-a-service ("IAAS") administrator. Fabric-group computational resources can be allocated to business groups by using reservations.

FIG. 16D shows a single-tenant configuration for an infrastructure-management-and-administration facility deployment within a cloud-computing facility or cloud-computing-facility aggregation. The configuration includes a tenant configuration 1620 and a system and infrastructure configuration 1622. The tenant configuration 1620 includes a tenant administrator 1624 and several business groups 1626-1627, each associated with a business-group manager 1628-1629, respectively. The system and infrastructure configuration 1622 includes a system administrator 1630, an infrastructure fabric 1632 managed by an IAAS administrator 1633, and three fabric groups 1635-1637, each managed by a fabric administrator 1638-1640, respectively. The computational resources represented by the fabric groups are allocated to business groups by a reservation system, as indicated by the lines between business groups and reservation blocks, such as line 1642 between reservation block 1643 associated with fabric group 1637 and the business group 1626.

FIG. 16E shows a multi-tenant single-tenant-system-and-infrastructure-configuration deployment for an infrastructure-management-and-administration facility of the WFMAD. In this configuration, there are three different tenant organizations, each associated with a tenant configuration 1646-1648. Thus, following configuration of a default tenant, a system administrator creates additional tenants for different organizations that together share the computational resources of a cloud-computing facility or cloud-computing-facility aggregation. In general, the computational resources are partitioned among the tenants so that the computational resources allocated to any particular tenant are segregated from and inaccessible to the other tenants. In the configuration shown in FIG. 16E, there is a single default-tenant system and infrastructure configuration 1650, as in the previously discussed configuration shown in FIG. 16D.

FIG. 16F shows a multi-tenant configuration in which each tenant manages its own infrastructure fabric. As in the configuration shown in FIG. 16E, there are three different tenants 1654-1656 in the configuration shown in FIG. 16F. However, each tenant is associated with its own fabric group 1658-1660, respectively, and each tenant is also associated with an infrastructure-fabric IAAS administrator 1662-1664, respectively. A default-tenant system configuration 1666 is associated with a system administrator 1668 who administers the infrastructure fabric, as a whole.

System administrators, as mentioned above, generally install the WFMAD within a cloud-computing facility or cloud-computing-facility aggregation, create tenants, manage system-wide configuration, and are generally responsible for insuring availability of WFMAD services to users, in general. IAAS administrators create fabric groups, configure virtualization proxy agents, and manage cloud service accounts, physical machines, and storage devices. Fabric administrators manage physical machines and computational resources for their associated fabric groups as well as reservations and reservation policies through which the resources are allocated to business groups. Tenant administrators configure and manage tenants on behalf of organizations. They manage users and groups within the tenant organization, track resource usage, and may initiate reclamation of provisioned resources. Service architects create blueprints for items stored in user service catalogs which represent services and resources that can be provisioned to users. The infrastructure-management-and-administration facility defines many additional roles for various administrators and users to manage provision of services and resources to users of cloud-computing facilities and cloud-computing facility aggregations.

Figure 17:
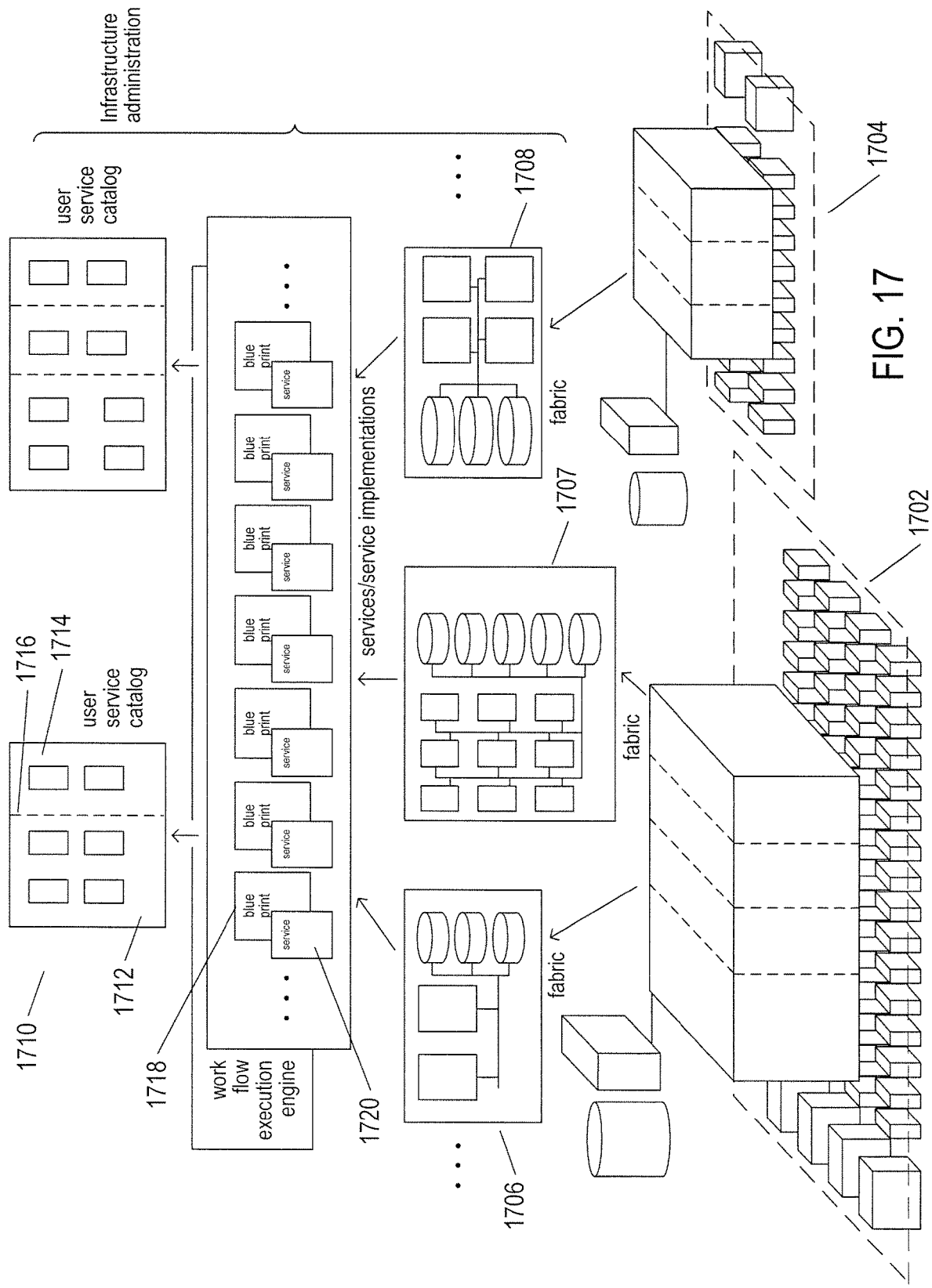
FIG. 17 illustrates the logical components of the infrastructure-management-and-administration facility of the WFMAD.

FIG. 17 illustrates the logical components of the infrastructure-management-and-administration facility (1114 in FIG. 11) of the WFMAD. As discussed above, the WFMAD is implemented within, and provides a management and development interface to, one or more cloud-computing facilities 1702 and 1704. The computational resources provided by the cloud-computing facilities, generally in the form of virtual servers, virtual storage devices, and virtual networks, are logically partitioned into fabrics 1706-1708. Computational resources are provisioned from fabrics to users. For example, a user may request one or more virtual machines running particular applications. The request is serviced by allocating the virtual machines from a particular fabric on behalf of the user. The services, including computational resources and workflow-implemented tasks, which a user may request provisioning of, are stored in a user service catalog, such as user service catalog 1710, that is associated with particular business groups and tenants. In FIG. 17, the items within a user service catalog are internally partitioned into categories, such as the two categories 1712 and 1714 and separated logically by vertical dashed line 1716. User access to catalog items is controlled by entitlements specific to business groups. Business group managers create entitlements that specify which users and groups within the business group can access particular catalog items. The catalog items are specified by service-architect-developed blueprints, such as blueprint 1718 for service 1720. The blueprint is a specification for a computational resource or task-service and the service itself is implemented by a workflow that is executed by the workflow-execution engine on behalf of a user.

FIGS. 18-20B provide a high-level illustration of the architecture and operation of the automated-application-release-management facility (1116 in FIG. 11) of the WFMAD. The application-release management process involves storing, logically organizing, and accessing a variety of different types of binary files and other files that represent executable programs and various types of data that are assembled into complete applications that are released to users for running on virtual servers within cloud-computing facilities. Previously, releases of new version of applications may have occurred over relatively long time intervals, such as biannually, yearly, or at even longer intervals. Minor versions were released at shorter intervals. However, more recently, automated application-release management has provided for continuous release at relatively short intervals in order to provide new and improved functionality to clients as quickly and efficiently as possible.

Figure 18:
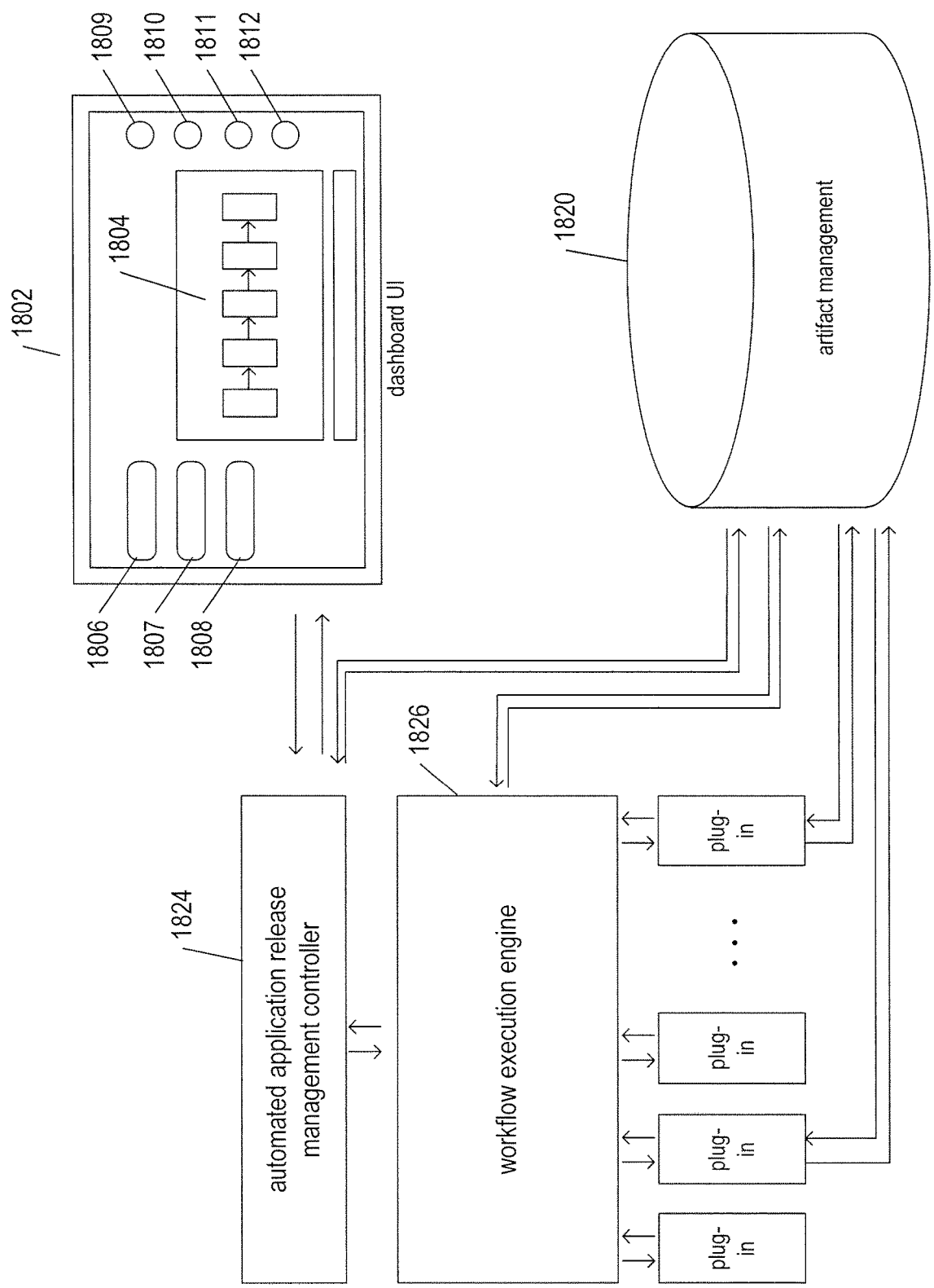
FIGS. 18-20B provide a high-level illustration of the architecture and operation of the automated-application-release-management facility of the WFMAD.

FIG. 18 shows main components of the automated-application-release-management facility (1116 in FIG. 11). The automated-application-release-management component provides a dashboard user interface 1802 to allow release managers and administrators to launch release pipelines and monitor their progress. The dashboard may visually display a graphically represented pipeline 1804 and provide various input features 1806-1812 to allow a release manager or administrator to view particular details about an executing pipeline, create and edit pipelines, launch pipelines, and generally manage and monitor the entire application-release process. The various binary files and other types of information needed to build and test applications are stored in an artifact-management component 1820. An automated-application-release-management controller 1824 sequentially initiates execution of various workflows that together implement a release pipeline and serves as an intermediary between the dashboard user interface 1802 and the workflow-execution engine 1826.

Figure 19:
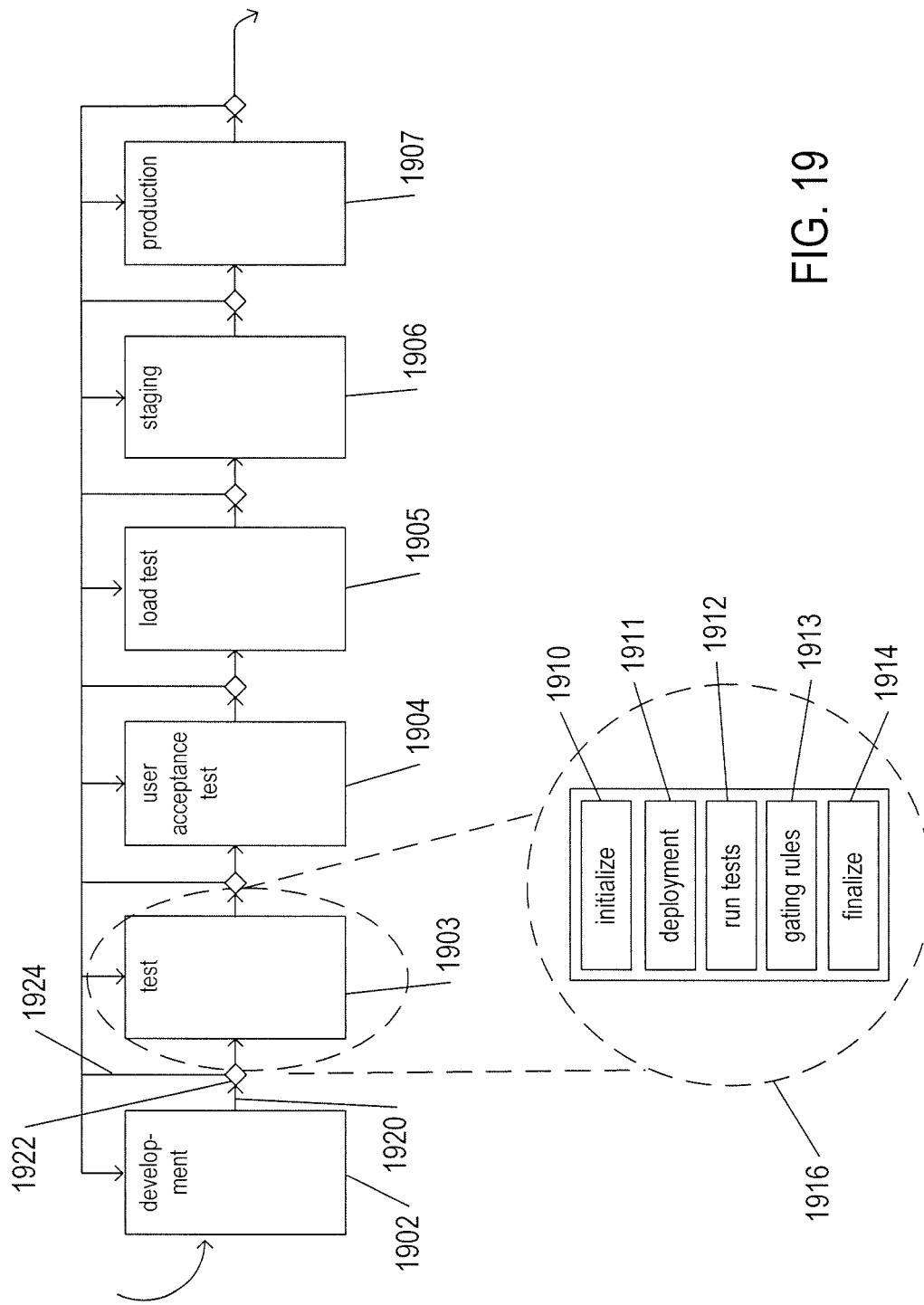

FIG. 19 illustrates a release pipeline. The release pipeline is a sequence of stages 1902-1907 that each comprises a number of sequentially executed tasks, such as the tasks 1910-1914 shown in inset 1916 that together compose stage 1903. In general, each stage is associated with gating rules that are executed to determine whether or not execution of the pipeline can advance to a next, successive stage. Thus, in FIG. 19, each stage is shown with an output arrow, such as output arrow 1920, that leads to a conditional step, such as conditional step 1922, representing the gating rules. When, as a result of execution of tasks within the stage, application of the gating rules to the results of the execution of the tasks indicates that execution should advance to a next stage, then any final tasks associated with the currently executing stage are completed and pipeline execution advances to a next stage. Otherwise, as indicated by the vertical lines emanating from the conditional steps, such as vertical line 1924 emanating from conditional step 1922, pipeline execution may return to re-execute the current stage or a previous stage, often after developers have supplied corrected binaries, missing data, or taken other steps to allow pipeline execution to advance.

Figure 20A:
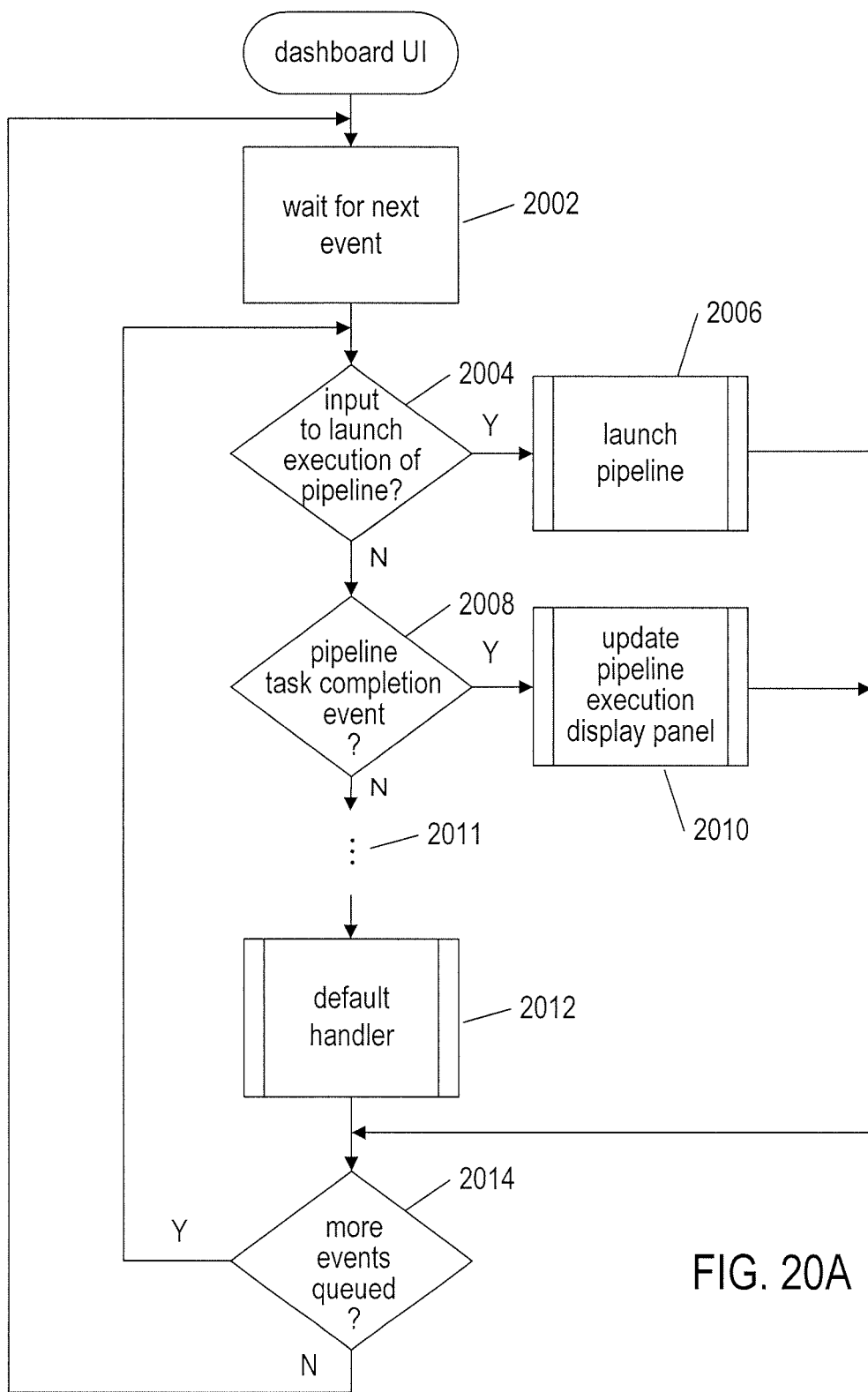
Figure 20B:
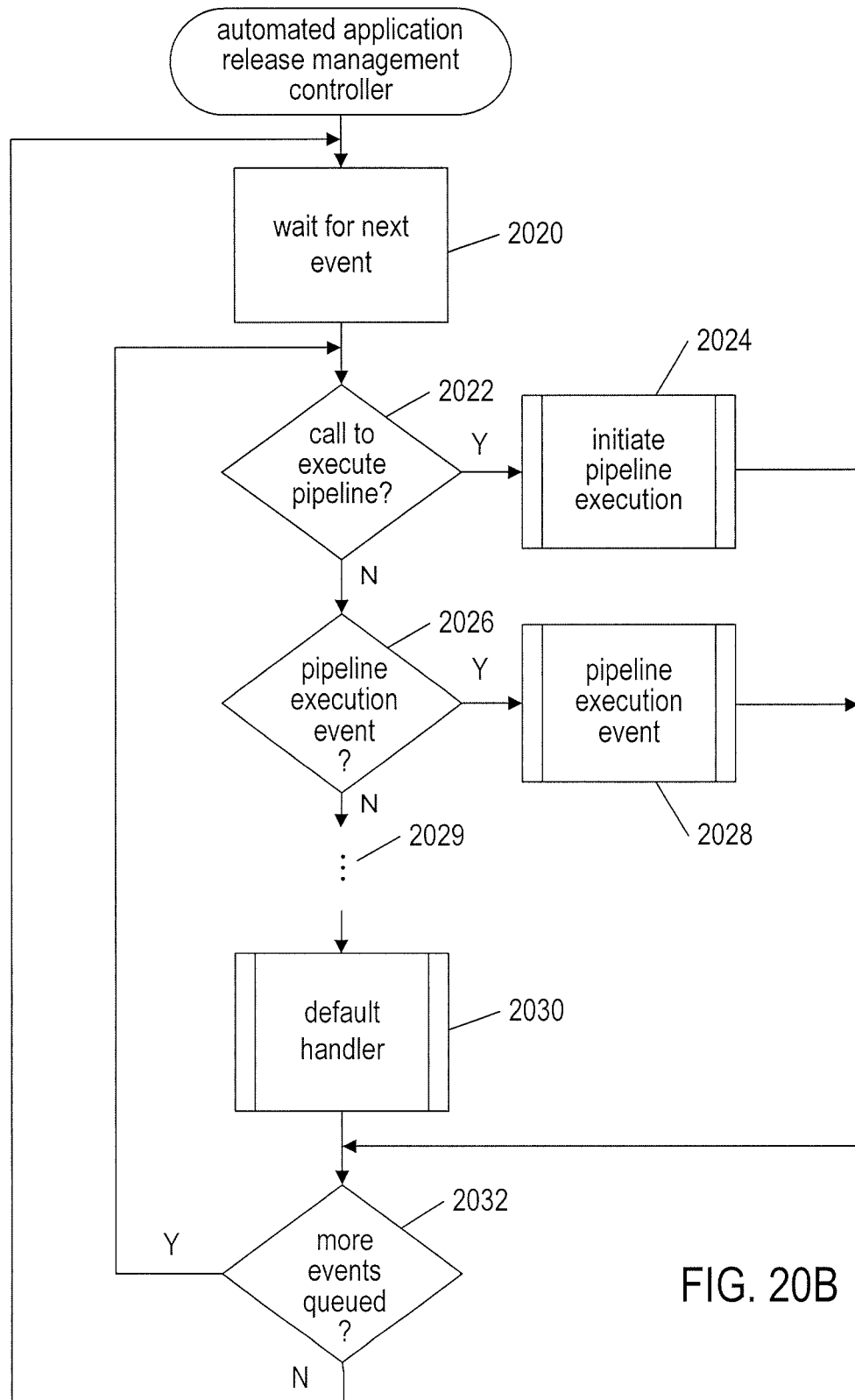

FIGS. 20A-B provide control-flow diagrams that indicate the general nature of dashboard and automated-application-release-management-controller operation. FIG. 20A shows a partial control-flow diagram for the dashboard user interface. In step 2002, the dashboard user interface waits for a next event to occur. When the next occurring event is input, by a release manager, to the dashboard to direct launching of an execution pipeline, as determined in step 2004, then the dashboard calls a launch-pipeline routine 2006 to interact with the automated-application-release-management controller to initiate pipeline execution. When the next-occurring event is reception of a pipeline task-completion event generated by the automated-application-release-management controller, as determined in step 2008, then the dashboard updates the pipeline-execution display panel within the user interface via a call to the routine "update pipeline execution display panel" in step 2010. There are many other events that the dashboard responds to, as represented by ellipses 2011, including many additional types of user input and many additional types of events generated by the automated-application-release-management controller that the dashboard responds to by altering the displayed user interface. A default handler 2012 handles rare or unexpected events. When there are more events queued for processing by the dashboard, as determined in step 2014, then control returns to step 2004. Otherwise, control returns to step 2002 where the dashboard waits for another event to occur.

FIG. 20B shows a partial control-flow diagram for the automated application-release-management controller. The control-flow diagram represents an event loop, similar to the event loop described above with reference to FIG. 20A. In step 2020, the automated application-release-management controller waits for a next event to occur. When the event is a call from the dashboard user interface to execute a pipeline, as determined in step 2022, then a routine is called, in step 2024, to initiate pipeline execution via the workflow-execution engine. When the next-occurring event is a pipeline-execution event generated by a workflow, as determined in step 2026, then a pipeline-execution-event routine is called in step 2028 to inform the dashboard of a status change in pipeline execution as well as to coordinate next steps for execution by the workflow-execution engine. Ellipses 2029 represent the many additional types of events that are handled by the event loop. A default handler 2030 handles rare and unexpected events. When there are more events queued for handling, as determined in step 2032, control returns to step 2022. Otherwise, control returns to step 2020 where the automated application-release-management controller waits for a next event to occur.

Branching of Release Pipelines Facilitated by Gating Rules

Figure 21:
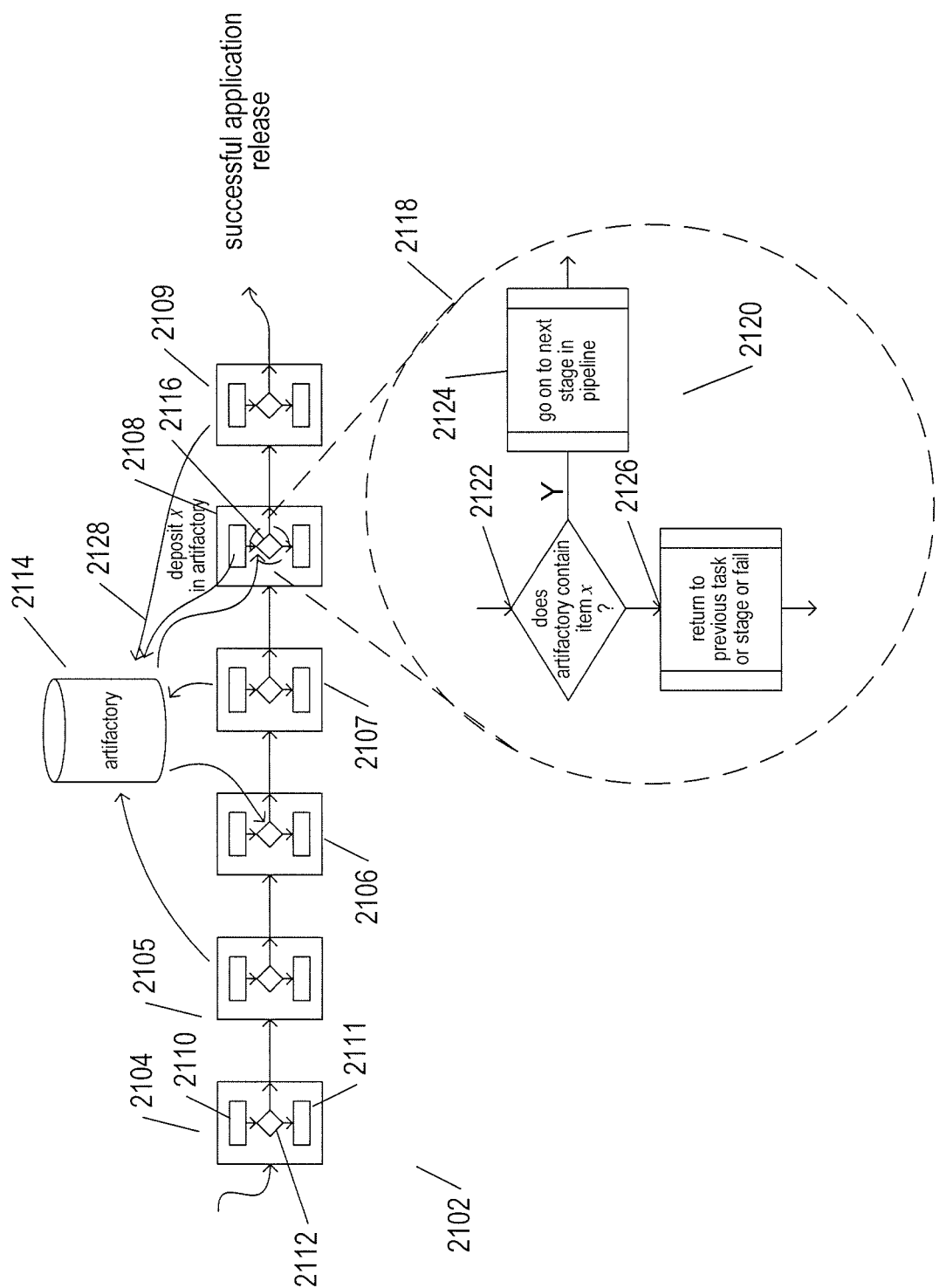
FIG. 21 illustrates an application-release-management pipeline using somewhat different illustration conventions than used in FIG. 19.

FIG. 21 illustrates an application-release-management pipeline using somewhat different illustration conventions than used in FIG. 19. In the example shown in FIG. 21, the application-release-management pipeline 2102 includes six stages 2104-2109. The task-based logic within each stage is represented by several rectangles, such as rectangles 2110-2111 in stage 2104, and by a diamond-shaped conditional step, such as conditional step 2112 in stage 2104, that represents the gating rule or rules for the stage. During execution of tasks within stages of the pipeline, data can be stored in, and retrieved from, the artifact-management component 2114, referred to as the "artifactory." Pipeline execution begins with execution of stage 2104. When stage 2109 is finally executed, and when the gating rule within stage 2109 indicates successful completion, pipeline execution terminates with output of a next released version of the application associated with the pipeline. The gating rule or conditional step 2116 within stage 2108 is encircled with a dashed line. Additional details with respect to this conditional step are provided in inset 2118. In the example shown in FIG. 21, at least one portion of the gating rule or rules corresponding to conditional step 2116 can be represented by the control-flow-diagram extract 2120 shown within inset 2118. Evaluation of a component or term of the gating rule or rules represented by the control-flow-diagram extract 2120 determines, in conditional step 2122, whether the artifactory contains a particular item x. When the artifactory does contain item x, as determined in step 2122, then the term evaluates to true and, in the case of a single-term gating rule, results in an indication to proceed to the next stage in the pipeline, as represented by step 2124. Otherwise, the term evaluates to false, in which case pipeline execution returns to either a previous task within the current stage or to a previous stage, in certain cases, or completely fails, in other cases, as represented by step 2126. In the example shown in FIG. 21, as represented by arrow 2128, the item x is deposited into the artifactory in a task within stage 2108 that precedes evaluation of the gating rule or rules. The term of the gating rule, represented by the control-flow-diagram extract 2120, checks to make sure that item x has been successfully deposited into the artifactory before allowing pipeline execution to advance to the next stage 2109. This is but one possible example of many different types of events that may be verified, during evaluation of gating rules, by determining whether particular items have been stored within the artifactory. In this example, item x may be associated with a timestamp, and the conditional logic represented by step 2122 may determine whether the artifactory contains item x and whether the timestamp indicates that item x was deposited during current execution of the pipeline.

Figure 22:
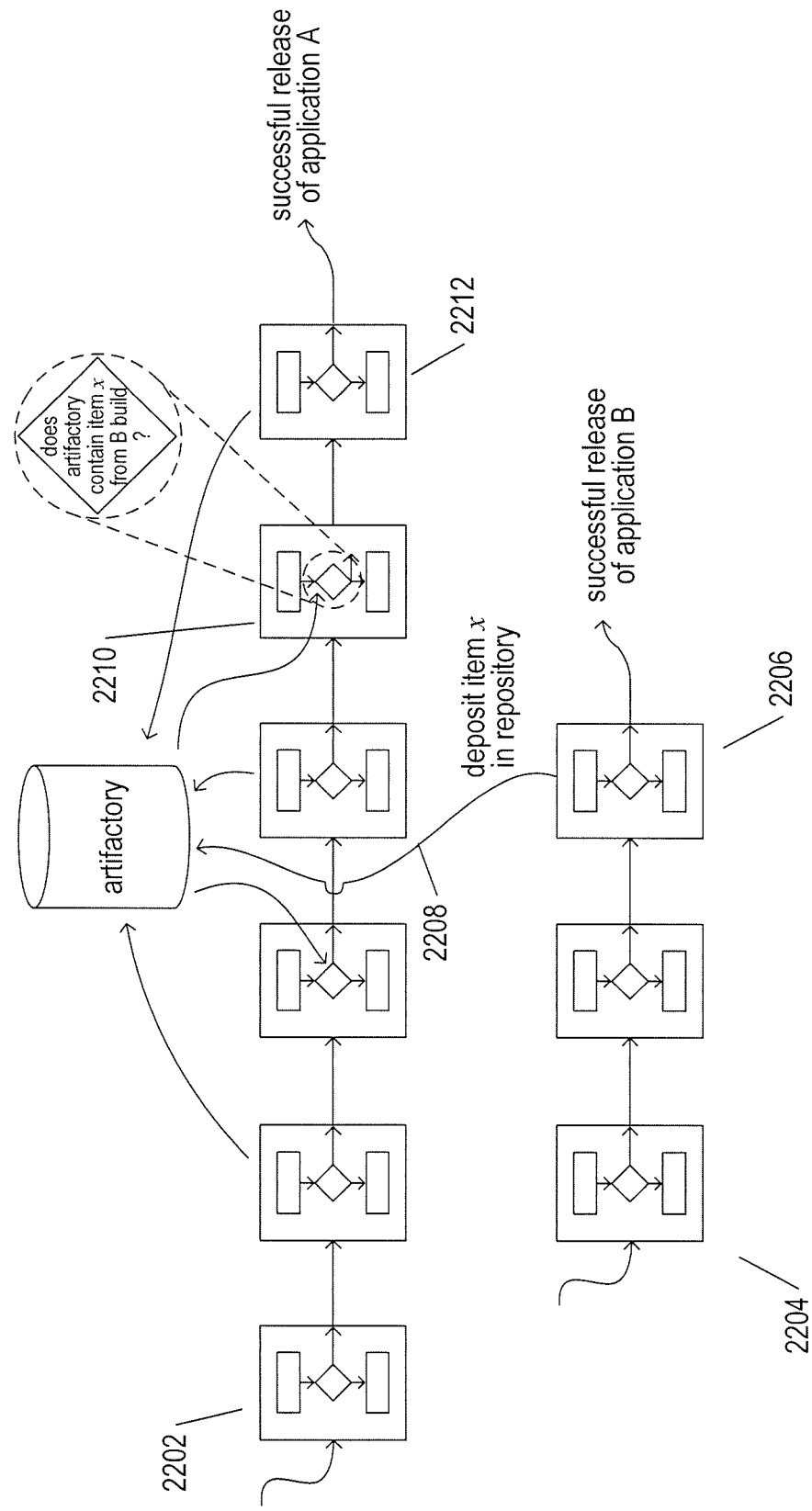
FIG. 22 illustrates, using the same illustration conventions as used in FIG. 21, an inter-application dependency.

FIG. 22 illustrates, using the same illustration conventions as used in FIG. 21, an inter-application dependency. Because each application-release-management pipeline is associated with a particular application, there is a one-to-one correspondence between pipelines and applications. In FIG. 22, two application-release-management pipelines 2202 and 2204 are shown. Execution of the final stage 2206 of the lower, shorter pipeline 2204 results in deposit of an item x into the artifactory, as represented by arrow 2208. Then, in stage 2210 of pipeline 2202, the gating rule or rules, or one term of the gating rule or rules, checks to see whether item x has been successfully deposited to the artifactory, allowing execution of the first pipeline to proceed from stage 2210 to stage 2212 only when item x is found to have been deposited in the artifactory. In FIG. 22, the first pipeline 2202 is associated with application A and the second pipeline 2204 is associated with application B. As in the example shown in FIG. 21, the test for the presence of item x in the artifactory may include examination of a timestamp associated with item x to ensure that item x was deposited during a relatively recent execution of pipeline 2204, associated with application B.

The gating rule or rules in stage 2210 of pipeline 2202 shown in FIG. 22 represents an inter-application dependency. Pipeline 2202 cannot complete unless a particular item has been deposited within the artifactory during a recent execution of pipeline 2204. This is but one example of many possible inter-application dependencies. While gating rules can be generally expressed in Boolean expressions to encompass inter-application dependencies, the presence of such gating rules would present numerous problems to users of an automated application-release-management facility. For example, different pipelines associated with different applications may be developed and executed by different teams of application developers. Failure of pipeline 2202 due to failure of the gating rule that expresses the inter-application dependency in stage 2210 may lead to a delay or failure in a subsequent release of application A that cannot be directly ameliorated by the application-A development team. The application-A development team may have little or no control over the execution schedule for pipeline 2204 associated with application B. Thus, full automation of the development and release of application A may be frustrated by the inter-application dependency expressed in the gating rule of stage 2210 of pipeline 2202.

In order to resolve the above-discussed inter-application dependency, the current document discloses an inter-application-dependency term for a gating rule that not only verifies the presence of a particular item in the artifactory, but that, when the item needs to be deposited during execution of a different application-release-management pipeline associated with a different application, launches that execution pipeline in order to resolve the inter-application dependency. In other words, using the example of FIG. 22, the two execution pipelines 2202 and 2204 may be joined by a branch point represented by an inter-application-dependency term within the gating rule or rules of stage 2210 of pipeline 2202.

Figure 23A:
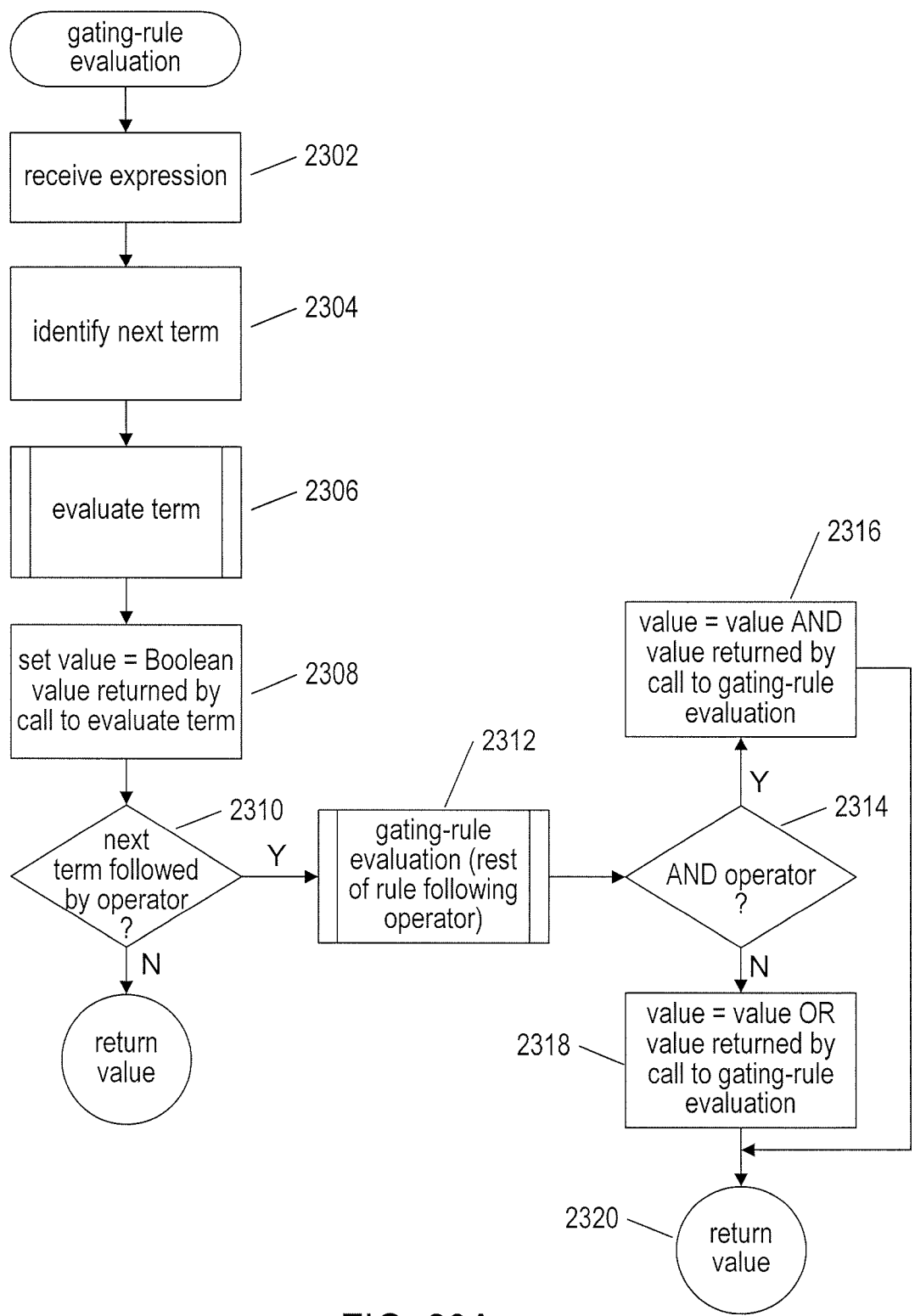
FIGS. 23A-C provide control-flow diagrams that illustrate one implementation of an automated-application-release-management subsystem that provides for branching pipelines.
Figure 23B:
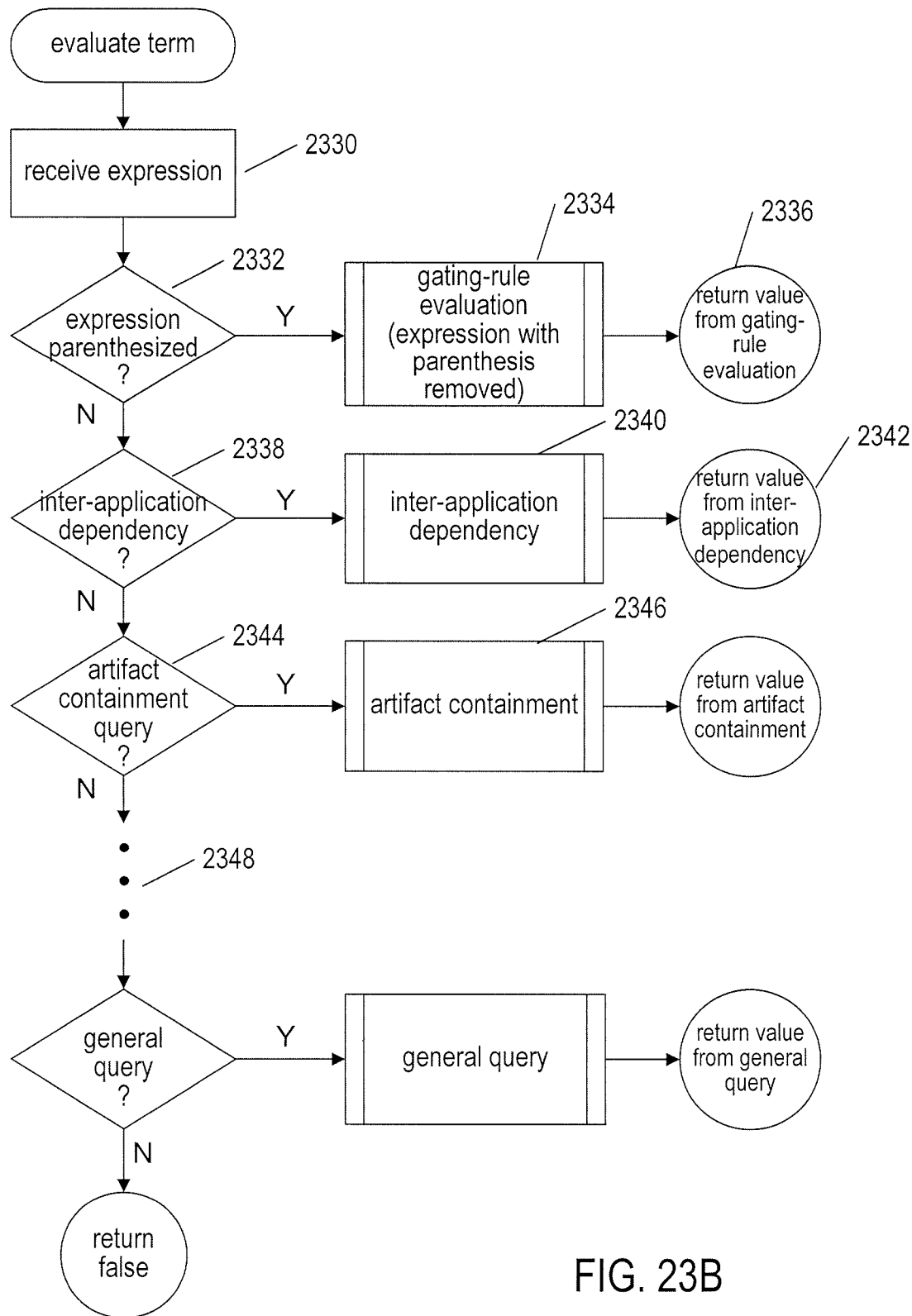
Figure 23C:
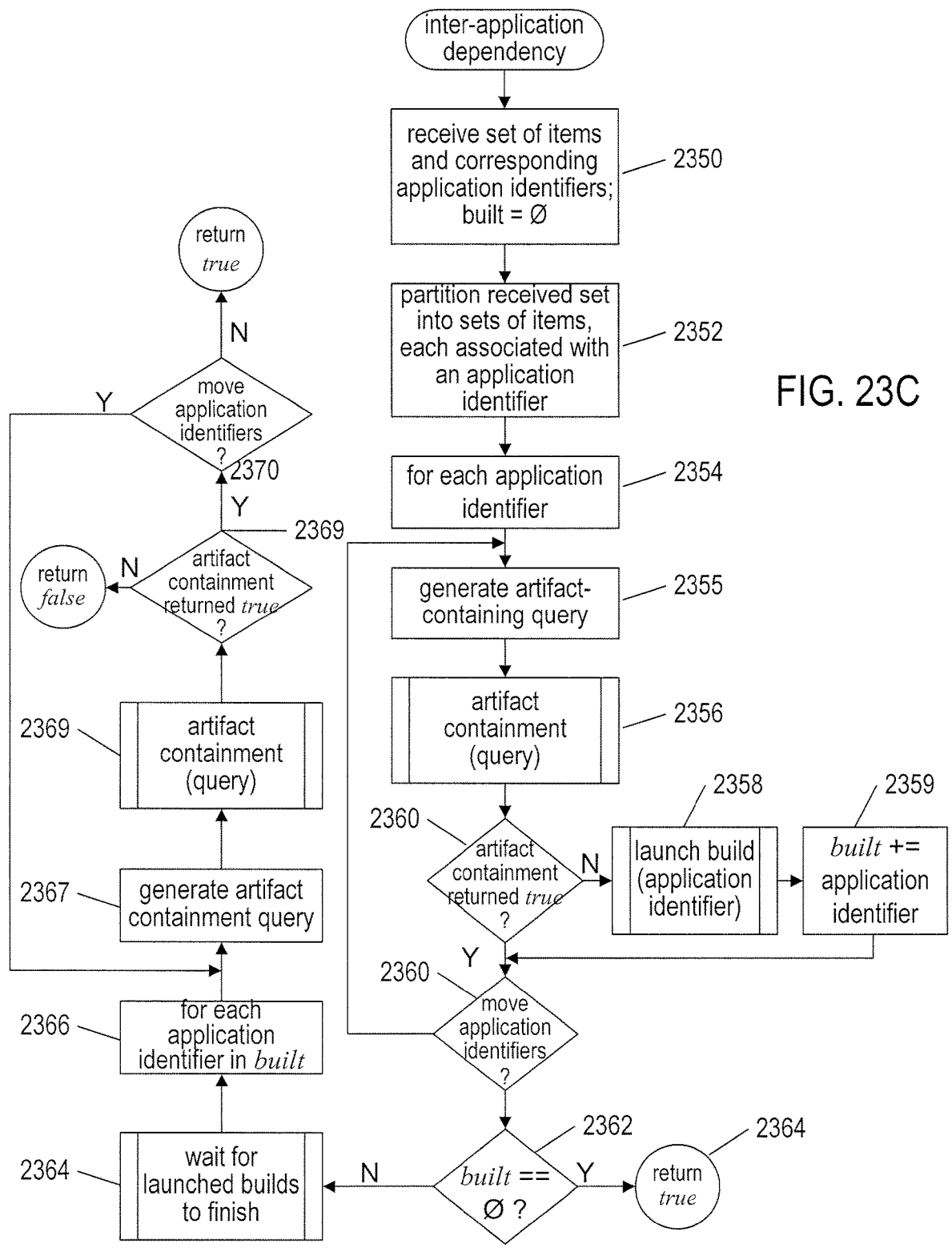

FIGS. 23A-C provide control-flow diagrams that illustrate one implementation of an automated-application-release-management subsystem that provides for branching pipelines. FIG. 23A provides a control-flow diagram for generalized gating-rule-evaluation logic. The routine "gating-rule evaluation," illustrated in FIG. 23A, recursively evaluates gating rules expressed as Boolean expressions. In step 2302, the gating-rule-evaluation routine receives a Boolean expression to evaluate. In step 2304, the gating-rule-evaluation routine identifies a next term in the expression for evaluation. The term is evaluated by a call to the routine "evaluate term," discussed below with reference to FIG. 23B, in step 2306. A local variable value is set, in step 2308, to the value returned by the call to the routine "evaluate term," in step 2306. When the next term is followed by a Boolean operator, as determined in step 2310, the routine "gating-rule evaluation" is recursively called, in step 2312, to evaluate the rest of the expression following the operator. When the operator is an AND operator, as determined in step 2314, the local variable value is set, in step 2316, to the value of the conjunction of the current value of the local variable value and the value returned by the recursive call to the function "gating-rule evaluation," in step 2312. Otherwise, in step 2318, the value of the local variable value is set to the disjunction of the current value of the local variable value and the value returned by the recursive call to the function "gating-rule evaluation," in step 2312. The contents of the local variable value is returned in step 2320.

FIG. 23B provides a portion of a control-flow diagram for the routine "evaluate term," called in step 2306 of FIG. 23A. In step 2330, the routine "evaluate term" receives an expression to evaluate. When the expression is parenthesized, as determined in step 2332, the function "gating-rule evaluation" is called, in step 2334, to evaluate the contents of the parentheses, and the value returned by the function "gating-rule evaluation" is returned in step 2336. Otherwise, when the expression is an inter-application dependency, as determined in step 2338, the routine "inter-application dependency" is called, in step 2340, and the value returned by that routine is returned in step 2342. Other types of terms are handled by additional steps. For example, when the term is an artifact-containment query, as determined in step 2344, then an artifact-containment routine is called, in step 2346. Ellipses 2348 indicate that many other types of terms may be handled by the routine "evaluate term." As one example, a term that begins with a Boolean NOT symbol may be handled by removing the NOT symbol and calling the function "evaluate term" recursively on the remaining expression, returning the opposite value returned by the recursive call to the function "evaluate term." Gating-rule terms may be queries, Boolean variables, logic that determines whether or not a non-Boolean variable has a particular value or falls within a particular range of values, and other types of logic, queries, or routine calls that return one of the two Boolean values true or false.

FIG. 23C provides a control-flow diagram for the routine "inter-application dependency," called in step 2340 of FIG. 23B. This routine is one example of an implementation of logic that evaluates an inter-application-dependency term within a gating rule that represents a pipeline branch point within an application-release-management pipeline according to the disclosure of the current document. In step 2350, the routine "inter-application dependency" receives a set of items and corresponding application identifiers and sets a local set variable built to the empty set. In step 2352, the routine "inter-application dependency" partitions the received set of items into sets of one or more items that are each associated with a particular application identifier. Thus, the routine "inter-application dependency" implements a generalized, multi-pipeline branch point within an application-release-management pipeline. In the for-loop of steps 2354-2360, each set of items associated with an application identifier is considered. During each successive iteration of the for-loop, an artifact-containment query is generated, in step 2355, for the currently considered application identifier and set of one or more items associated with the application identifier. In step 2356, the routine "artifact containment" is called with the query generated in step 2355 as an argument. This query is evaluated by the routine "artifact containment" to determine whether or not the artifactory contains each of the items in the set of items. In certain implementations, the items may be associated with a timestamp as well as with an indication of the pipeline, during execution of which the items were deposited. Thus, evaluation of the query may determine not only whether the items are present in the artifactory, but whether the items were deposited by the pipeline associated with the application identified by the application identifier. When the function "artifact containment" returns a true value, as determined in step 2357, then no additional logic is applied to the currently considered application identifier and associated item list. However, when the routine "artifact containment" returns the Boolean value false, as determined in step 2357, then, in step 2358, a build or pipeline execution for the pipeline associated with the application identified by the currently considered application identifier is launched. Then, in step 2359, the application identifier is added to the set of application identifiers built. At the conclusion of execution of the for-loop of step 2354-2360, the routine "inter-application dependency" determines whether the local set variable built is empty, in step 2362. When the set represented by the local set variable built is empty, the routine "inter-application dependency" returns the value true, in step 2364. This is because all of the items associated with all of the application identifiers were found in the artifactory and thus the inter-application dependencies have all been successfully satisfied. Otherwise, the routine "inter-application dependency" waits, in step 2364, for all of the pipeline executions launched in the for-loop of steps 2354-2360 to finish. Then, in the for-loop of steps 2366-2370, the application identifiers for those applications associated with pipelines launched in the for-loop of steps 2354-2360 are reconsidered. In step 2367, an artifact-containment query is generated for the currently considered application identifier and set of items associated with that application identifier. In step 2368, the routine "artifact containment" is called to evaluate the query. When the query evaluates to false, as determined in step 2369, then the routine "inter-application dependency" returns the value false, because not all of the inter-application dependencies have been successfully satisfied. Otherwise, when there are more application identifiers in the set represented by the local variable built to consider, as determined in step 2370, then control returns to step 2367. Otherwise, the routine "inter-application dependency" returns a value true.

Figure 24:
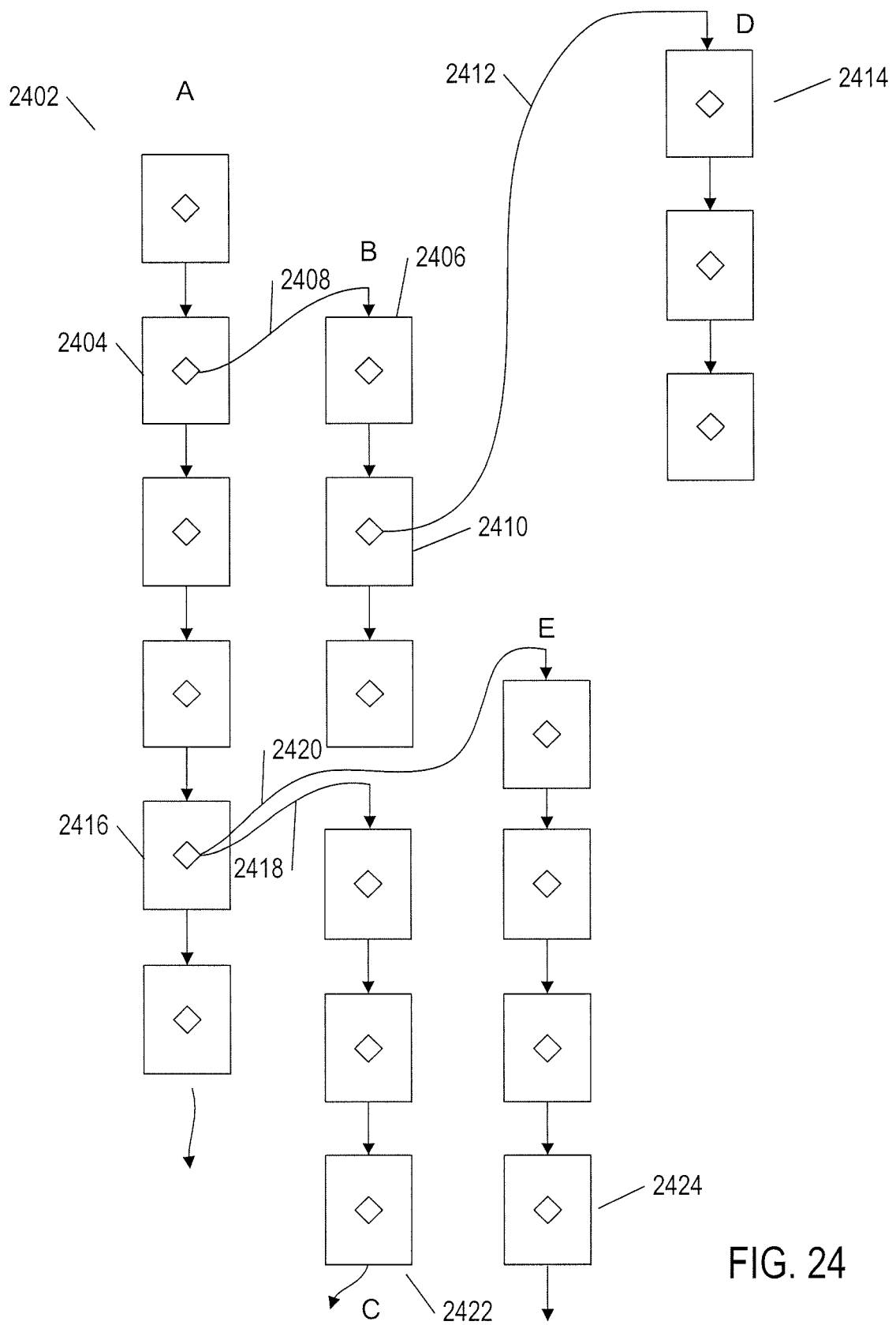
FIG. 24 graphically represents a branching application-release-management pipeline that incorporates inter-application dependencies.

FIG. 24 graphically represents a branching application-release-management pipeline that incorporates inter-application dependencies. In FIG. 24, the pipelines are shown in vertical orientations. A first pipeline associated with application A 2402 includes an inter-application dependency in a gating rule or rules within stage 2404. That dependency may result in launching of the application-release-management pipeline 2406 associated with application B, as represented by curved arrow 2408. Stage 2410 of pipeline 2406 includes a gating rule with an additional inter-application dependency, represented by curved arrow 2412. Evaluation of that gating rule may, in turn, launch execution of application-release-management pipeline 2414 associated with application D. Application-release-management pipeline 2402 includes a second branch point in the gating rule of stage 2416. This gating rule includes dependencies on application C and application E, as represented by curved arrows 2418 and 2420. Evaluation of the gating rule in stage 2416 of application-release-management pipeline 2402 may result in launching of pipeline 2422, associated with application C and/or pipeline 2424, associated with application E. As is apparent in FIG. 24, the inclusion inter-application-dependency terms in gating rules transforms a linear application-release-management pipeline, such as pipeline 2402, into a tree-like structure, execution of which may involve launching of multiple linear pipelines, each associated with a particular application. Incorporation of inter-application-dependency terms and gating rules thus allows inter-application dependencies to be automatically resolved during pipeline execution of a pipeline associated with a particular application.

Parameter Sharing within Release Pipelines

Figure 25A:
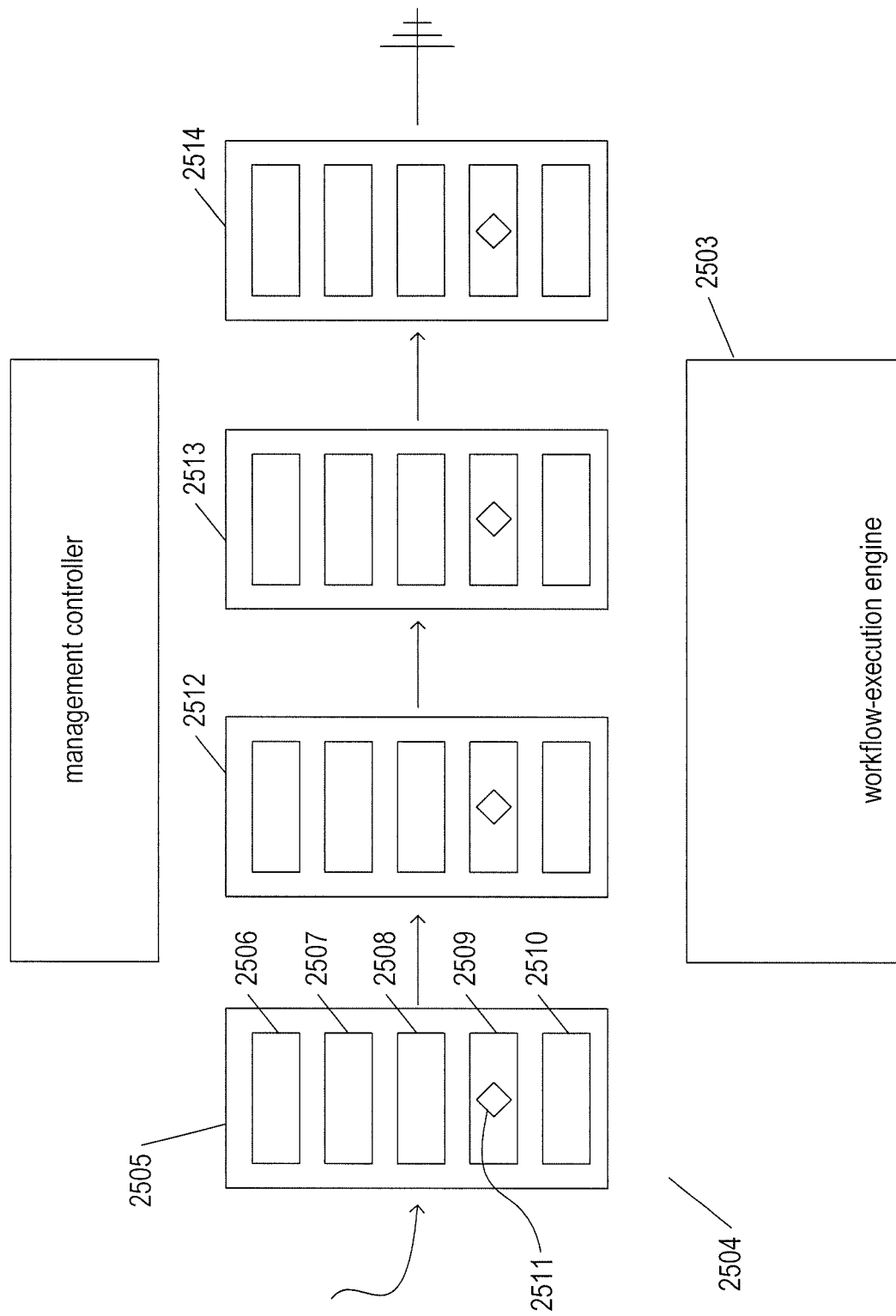

FIGS. 25A-E illustrate task execution controlled by an automated-application-release-management-subsystem management controller, subsequently referred to as a "management controller" in this document. The illustration conventions used in FIG. 25A are used for FIGS. 25B-E and are similar to the illustration conventions used in FIGS. 22A-F. These illustration conventions are next described with reference to FIG. 25A.

In FIG. 25A, the application-release-management-pipeline execution machinery within an automated-application-release-management subsystem, discussed above with reference to FIGS. 18-20B, is shown using block-diagram illustration conventions. This application-release-management-pipeline execution machinery includes the management controller 2502 and the workflow-execution engine 2503. A four-stage pipeline 2504 is shown in the center of FIG. 25A. Each stage, including the first stage 2505, includes a number of tasks, such as tasks 2506-2510 in stage 2505. The gaiting-rule task 2509 is illustrated with a conditional-step symbol 2511. Similar illustration conventions are used for the remaining three stages 2512-2514.

Figure 25B:
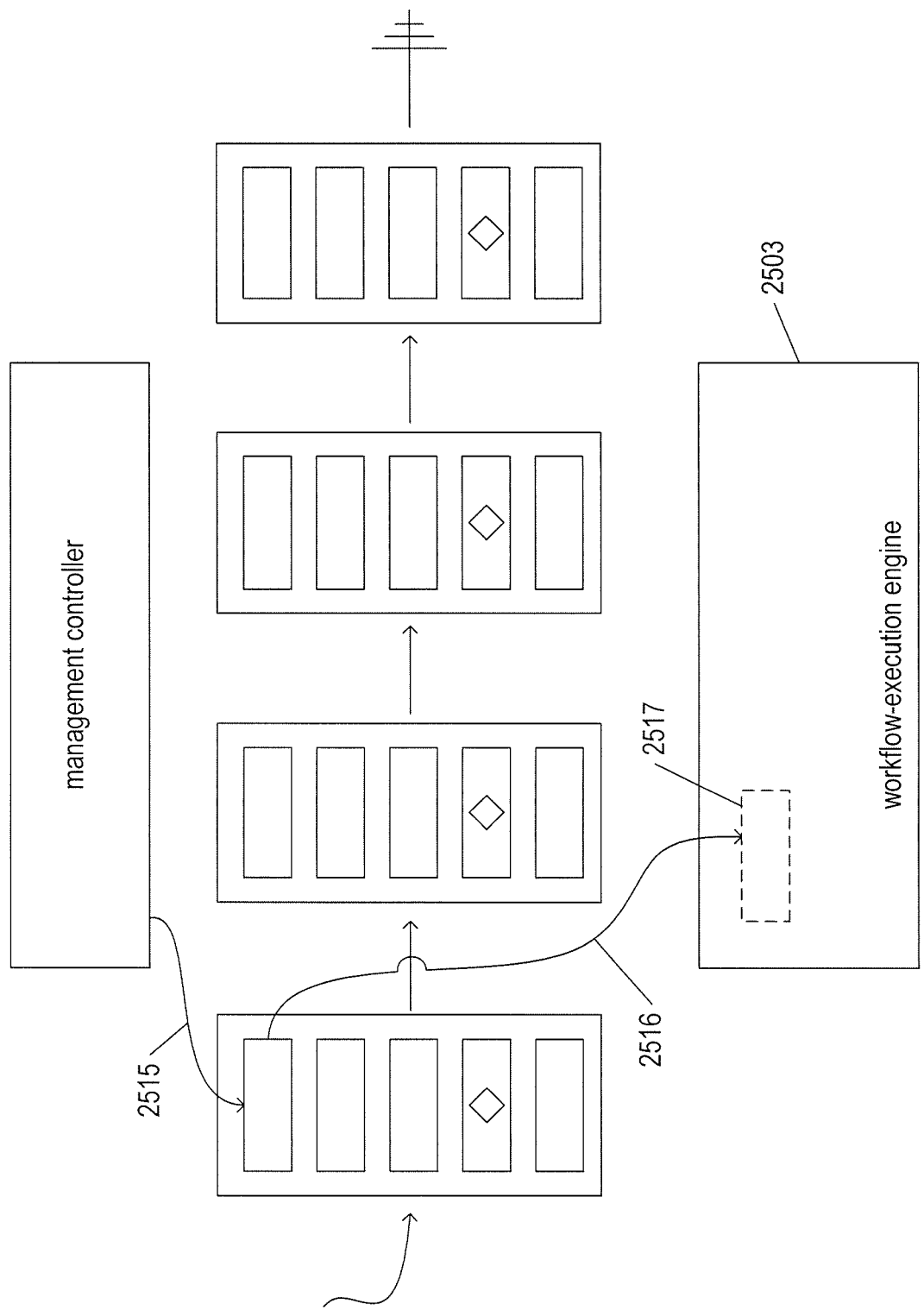

As shown in FIG. 25B, in the initial steps of task execution, the management controller selects a next task for execution, as represented by curved arrow 2515 in FIG. 25B, and then forwards a reference to this task along with any input-parameter values required for task execution to the workflow-execution engine, as represented in FIG. 25B by curved arrow 2516 and the task image 2517 within the workflow-execution engine 2503.

Next, as shown in FIG. 25C, the workflow-execution engine executes the task. This execution may involve, as discussed above, storage and retrieval of data from an artifact-management subsystem 2518, various routine and function calls to external plug-in modules, routines, and subsystems 2519-2520, and various task-execution operations carried out by the workflow-execution engine 2503. During execution of the task, as discussed above, the workflow-execution engine may make callbacks to the management controller that results in information exchange in one or both directions, as represented by double-headed arrow 2521 in FIG. 25C.

As shown in FIG. 25D, when execution of the task completes, the workflow-execution engine notifies the management controller, as represented by curved-arrow 2522. The management controller carries out various task-completion operations, including, in many cases, receiving and processing output parameters output by execution of the task.

Next, as shown in FIG. 25E, the management controller selects a next task to execute, represented by curved arrow 2523 in FIG. 25E, and forwards a reference to this task to the workflow-execution engine 2503, which executes the task, as discussed above. This process continues for each task of each stage of the pipeline.

In many automated-application-release-management subsystems, while the management controller may furnish parameter values as inputs for task execution and may receive output parameters from tasks following completion of their execution, there is no method or logic that allows tasks to exchange parameter values among themselves during execution of a pipeline. The tasks and stages are predefined, prior to execution of the pipeline, with predefined input and output parameters.

FIGS. 26A-F illustrate the management controller to which the current document is directed. This management controller, and the automated-application-release-management subsystem in which the management controller operates, provides for information exchange between tasks of an executing pipeline.

Figure 26A:
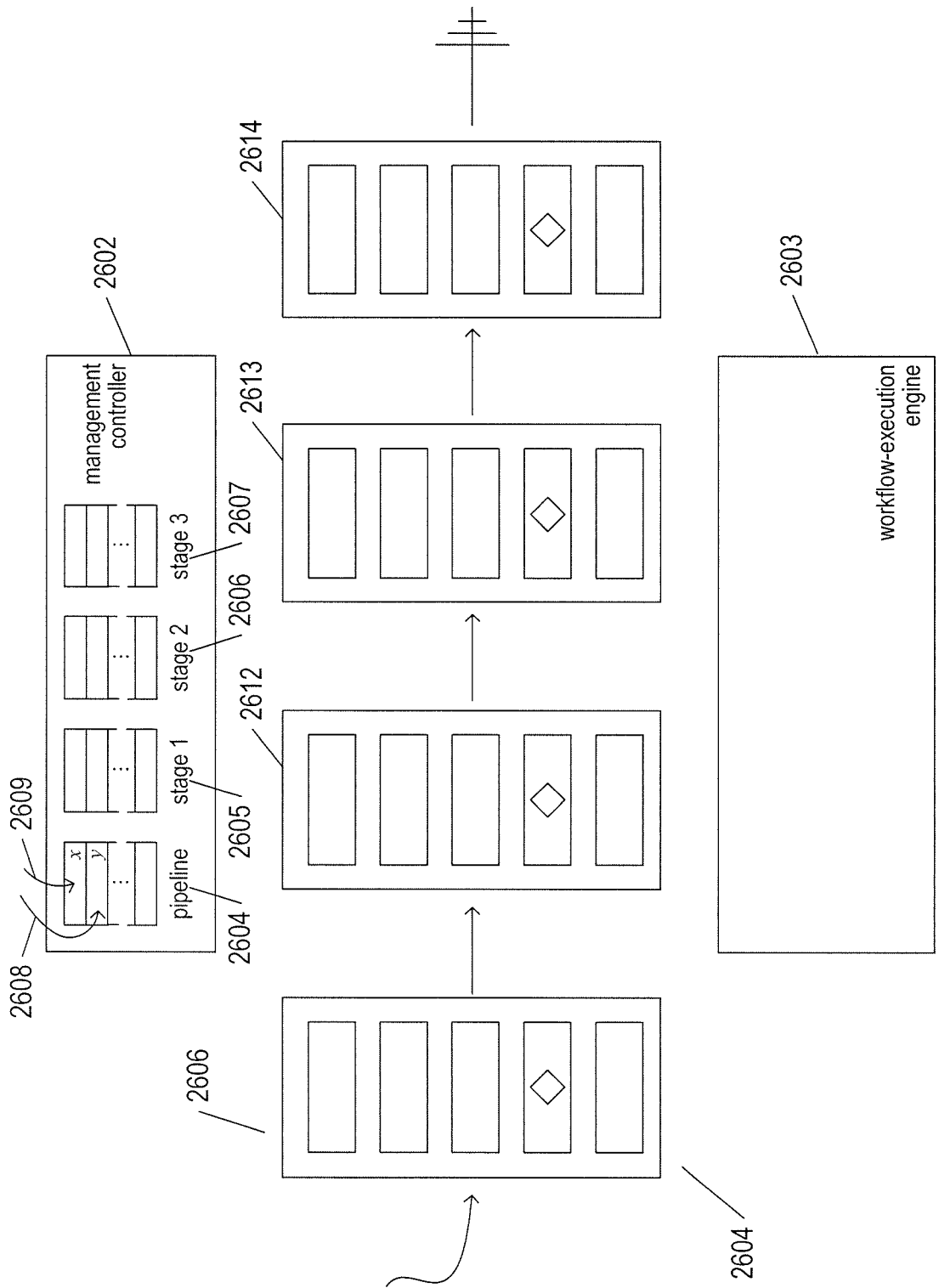
FIGS. 26A-F illustrate the management controller to which the current document is directed. This management controller, and the automated-application-release-management subsystem in which the management controller operates, provides for information exchange between tasks of an executing pipeline.

As shown in FIG. 26A, the management controller to which the current document is directed 2602 includes parameter-value storage arrays 2604-2607 that reside in memory and that are accessible from within the execution context of the management controller. These memory-resident parameter-value arrays are maintained over the course of execution of any particular pipeline. The first array 2604 stores pipeline parameters that serve a role similar to global variables in structured programming languages. The values of these parameters are available prior to and throughout execution of each pipeline. The remaining memory-resident parameter-value arrays 2605-2607 contain parameter values output by tasks during execution of each of the first three stages 2505 and 2512-2513 of pipeline 2504. When the pipeline has a greater number or fewer stages, there are a greater number or fewer stage-specific memory-resident parameter-value arrays maintained in the execution context of the management controller. While shown as arrays in the example of FIGS. 26A-F, the parameter values may be alternatively stored in linked lists, associative parameter-value data storage, and in other types of data-storage data structures. In alternative implementations, there may be a separate memory-resident data structure for each task of each stage. In FIG. 26A, the management controller is preparing to execute pipeline 2504. The pipeline, using features described below, is specified and configured to provide for pipeline parameters that are associated with the pipeline and maintained in memory during execution of the pipeline. In FIG. 26A, the management controller initializes two of the pipeline parameters to have the values x and y, as indicated by curved arrows 2608 and 2609 in FIG. 26A.

Figure 26B:
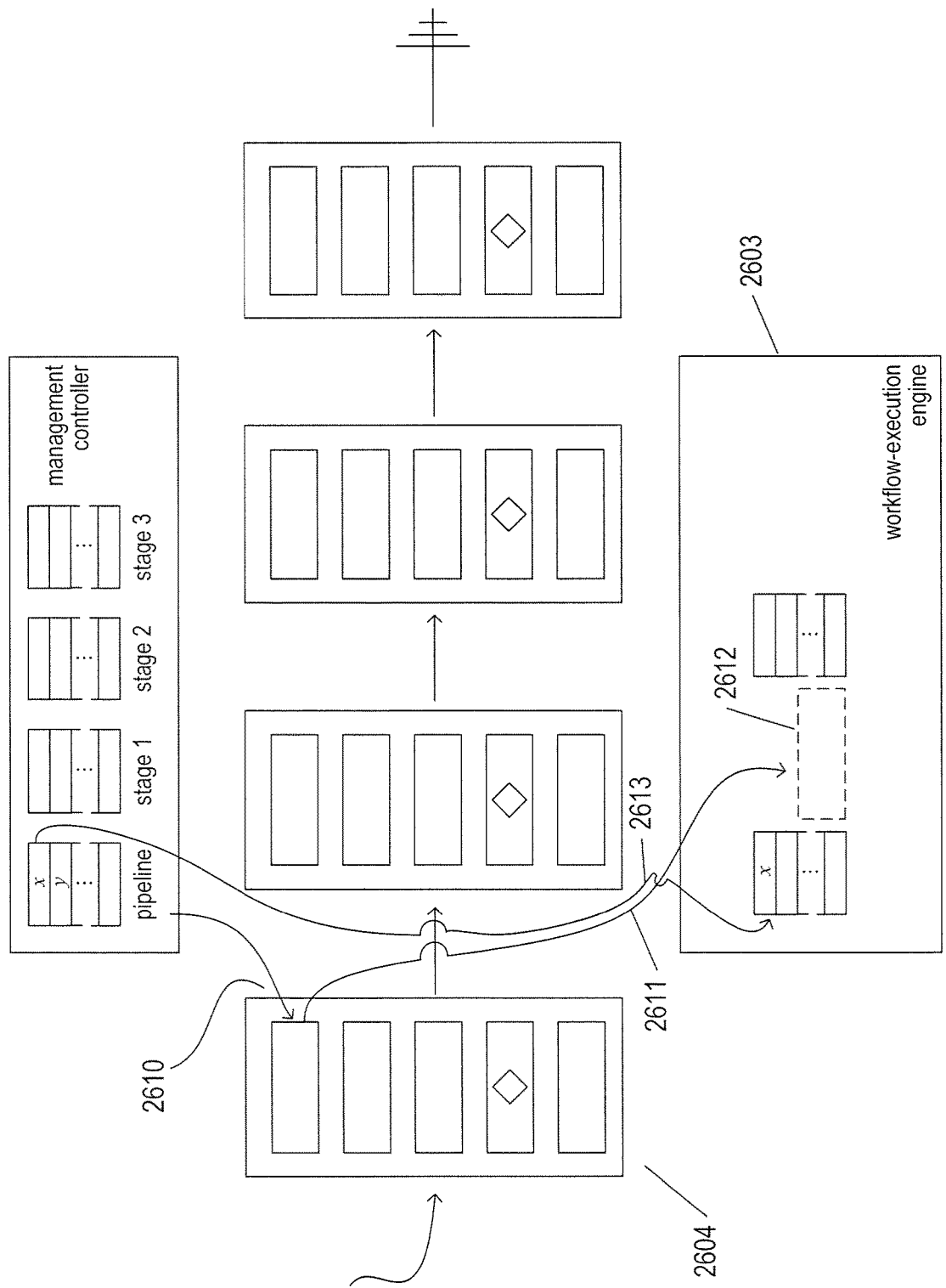

FIG. 26B shows launching of a first task for execution by the management controller to which the current document is directed. As discussed previously, the first task is selected 2610 by the management controller and transferred to the workflow-execution engine 2503, as indicated by curved arrow 2611 and task image 2612. In addition, because the pipeline has been developed to access parameter variables, and because the first task includes a mapping or specification of the first pipeline variable as the first input parameter to the task, the management controller, as indicated by curved arrow 2612, extracts the first value from the pipeline parameter-value array and passes the parameter value as the first input value for the first task to the workflow-execution engine, as represented by curved arrow 2613.

Figure 26C:
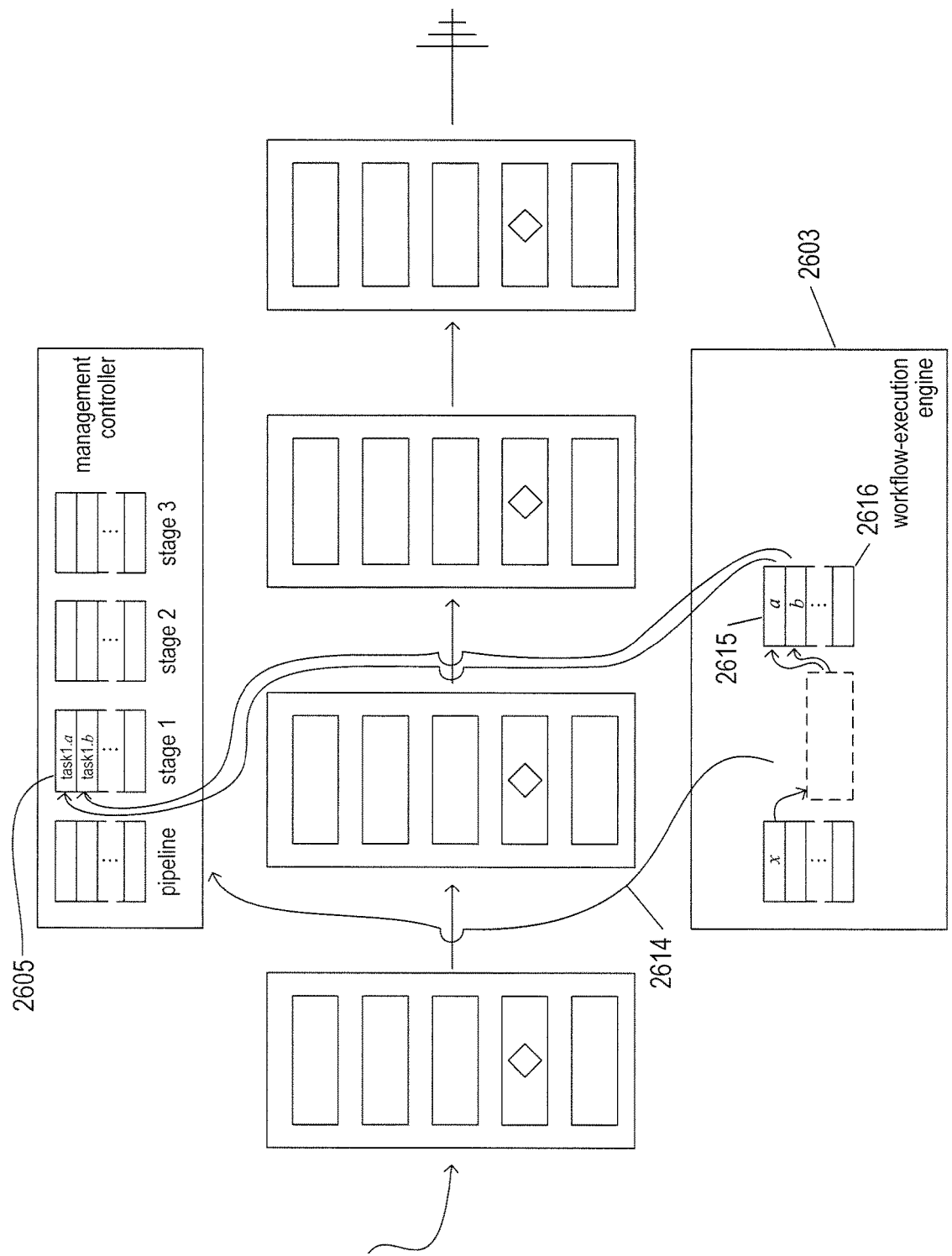

FIG. 26C shows execution and task-execution completion for the first task. As shown in FIG. 26C, when execution of the first task is completed, the workflow-execution engine 2503 notifies the management controller of task completion, as indicated by curved arrow 2614 in FIG. 26C. The output parameters from the first task, with values a 2615 and b 2616, are retrieved by the management controller and entered into the parameter-value memory-resident array 2605 for the first stage. Note that the parameter values are stored with task specifiers, as in the example of the task-specifier/parameter value "task 1.a." As mentioned above, in alternative implementations, there may be a separate memory-resident parameter-value array for each task of each stage, in which case the task specifiers would not be needed.

Figure 26D:
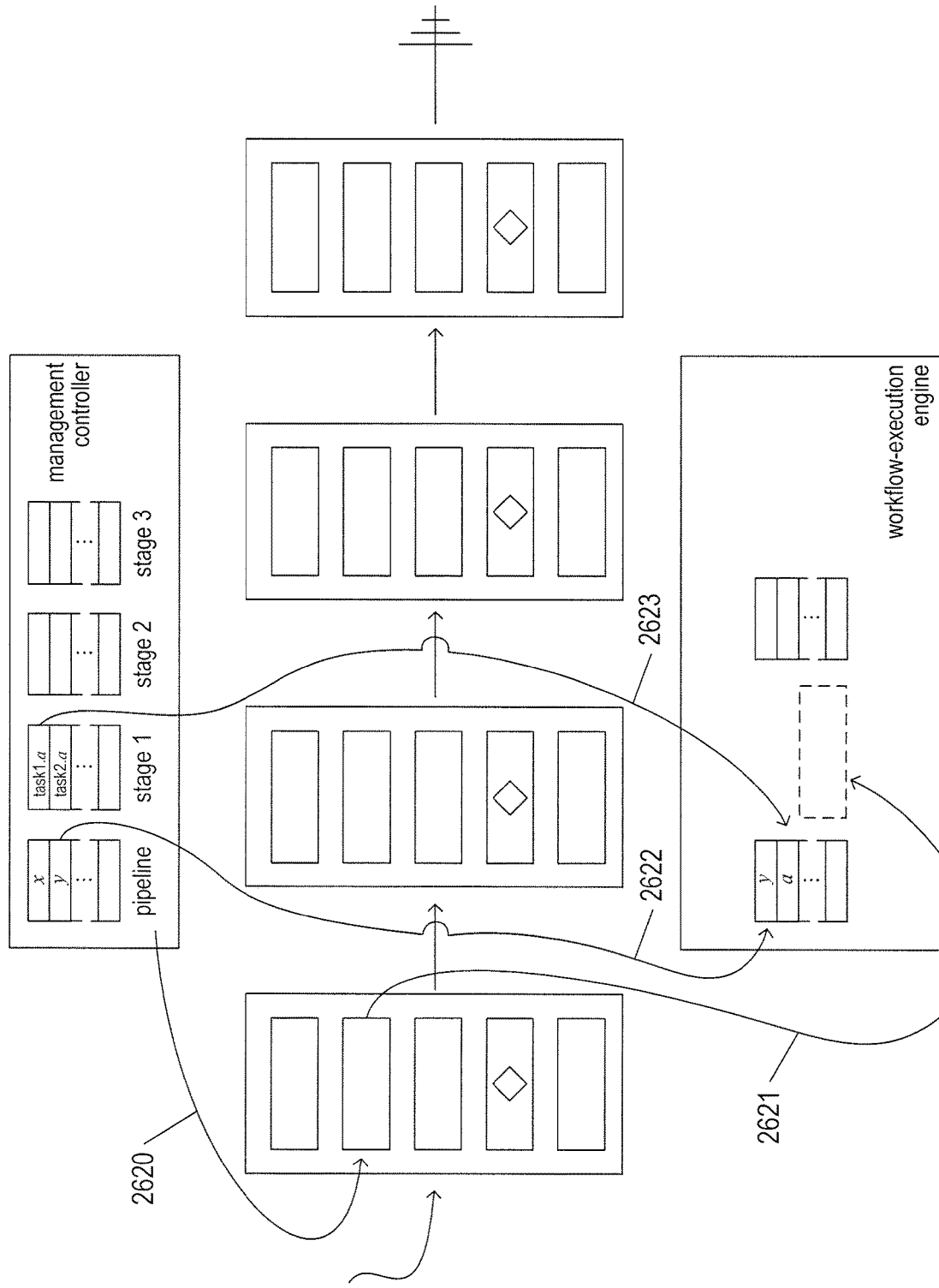

FIG. 26D shows launching of a second task by the management controller. The management controller selects the second task 2620 for execution and forwards that task to the workflow-execution engine 2621. The second task has been developed to receive, as input parameter values, the second pipeline parameter value and the first parameter value output by the previously executed task. The management controller finds the stored parameter values specified for input to the second task and furnishes these values to the workflow-execution engine, as represented by curved arrow 2622 and 2623. Values may be specified as arguments to a task-execution command, which includes a reference to the task to be executed, or may be alternatively specified, depending on the workflow-execution-engine API.

Figure 26E:
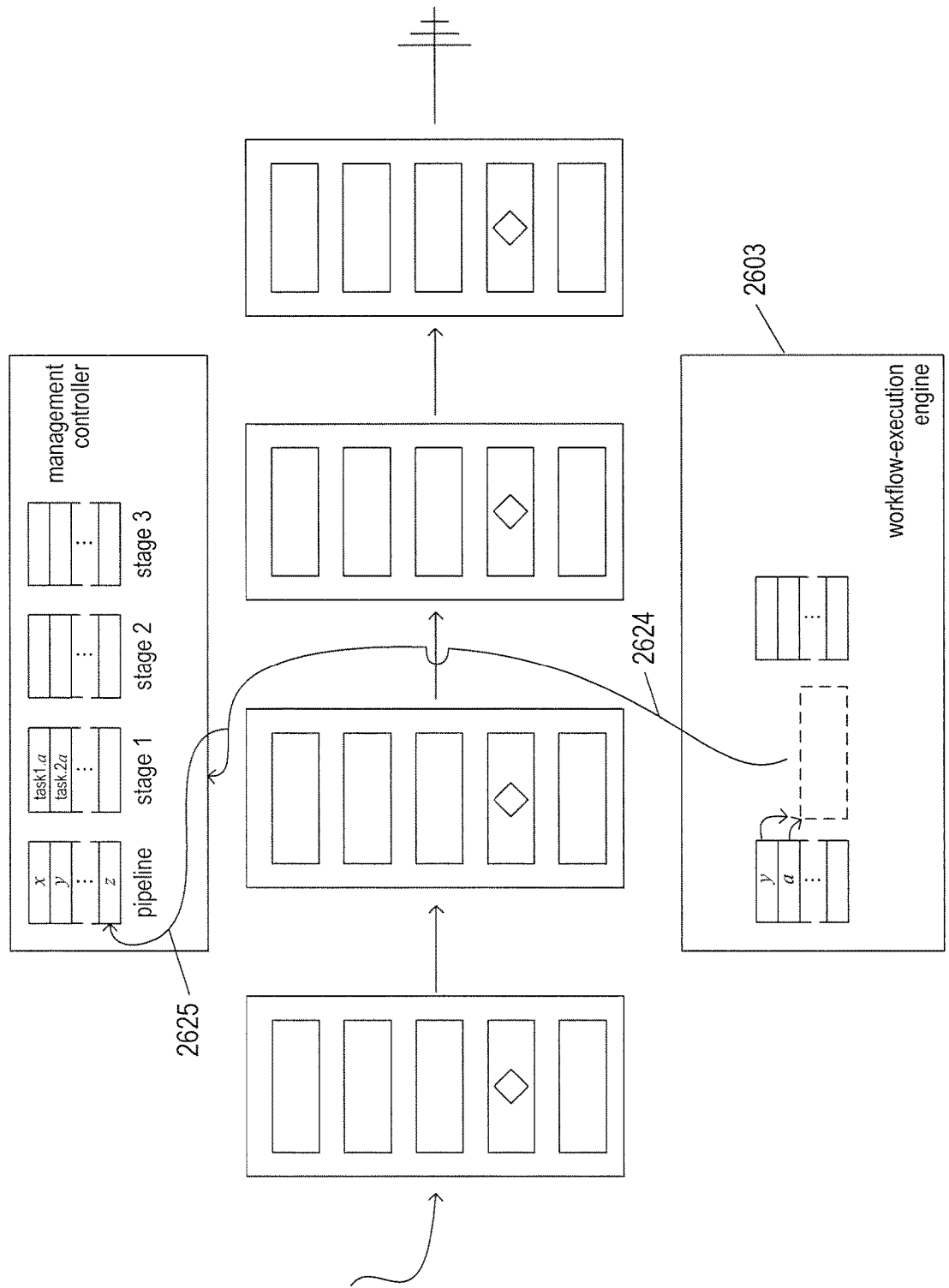

As shown in FIG. 26E, during execution of the second task, the workflow-execution engine 2503 may make a callback, as represented by curved arrow 2624, to the management controller. In the example shown in FIG. 26E, the callback involves passing a parameter value to the management controller to store as the current value of a pipeline variable, as indicated by curved arrow 2625. In other callbacks, the value of a pipeline parameter may be fetched and returned to the workflow-execution engine. Event-reporting callbacks were discussed above with reference to FIG. 20B. Thus, the values of pipeline parameters may be used as global variables for pipeline-task execution.

Figure 26F:
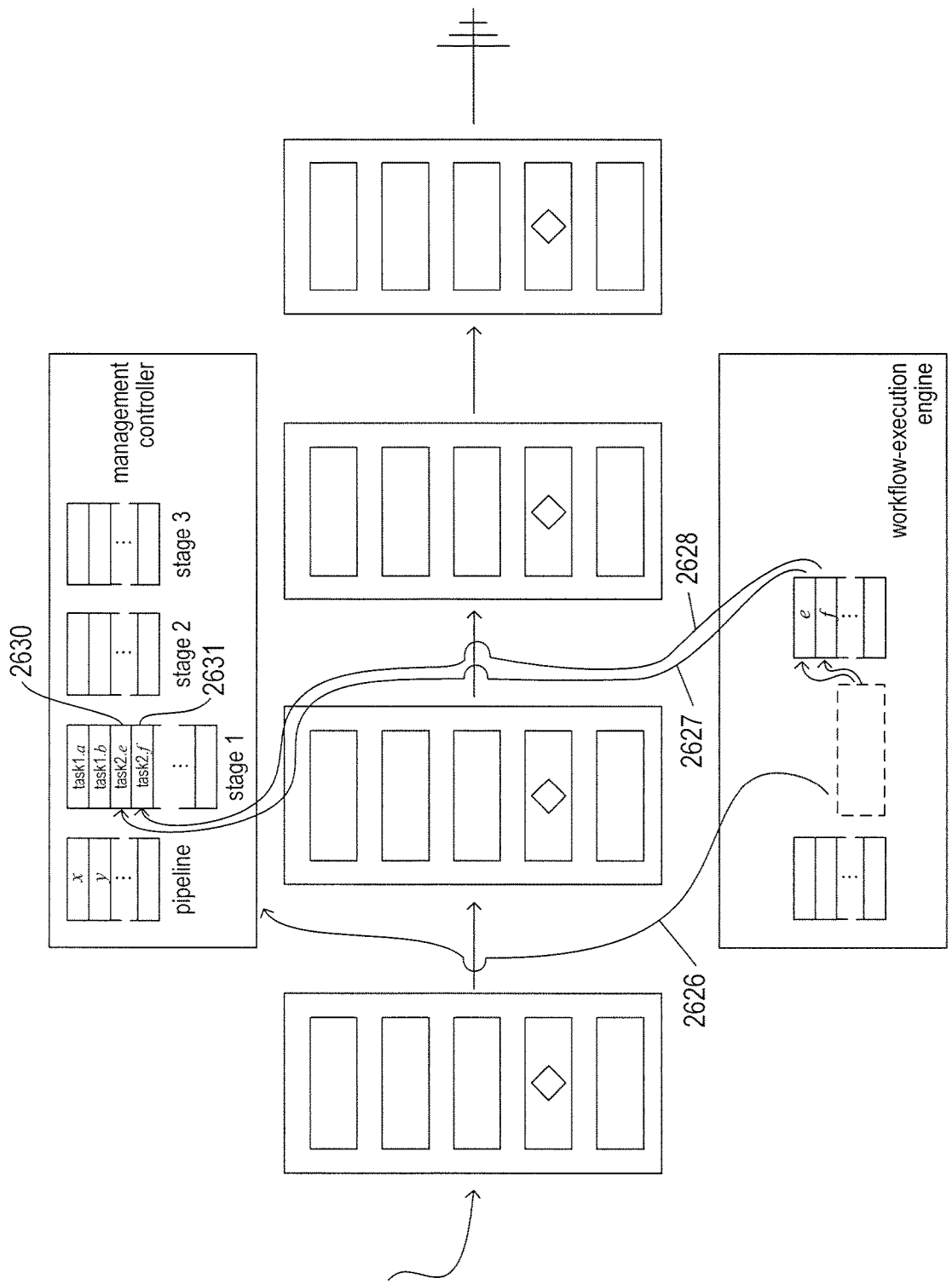

FIG. 26F shows execution and completion of execution of the second task. When the second task finishes executing, as indicated by curved arrow 2626 in FIG. 26F, the management controller is notified. The management controller receives, as indicated by curved arrows 2627 and 2628, the values of two output parameters from the workflow-execution controller output by the second task and stores these parameter values in entries 2630 and 2631 of the memory-resident parameter-value array 2605 with task specifiers indicating that they are output by task 2. These parameter values, along with the previously stored output parameter values from task 1, are now available for input to subsequently executed tasks of the current stage and subsequently executed stages.

FIGS. 27A-E illustrate an example parameter, parameter-specifying subexpressions, and example specification of inter-task parameter-value exchange via the graphical user interface provided by the automated-application-release-management subsystem. FIG. 27A shows a JSON encoding of an output parameter machineOutput. This output parameter is an array of objects of type Machine, each a structure-like data type that includes a name, various parameters that describe a server, and a type indication "MACHINE." The output parameter shown in FIG. 27A includes a single object 2702 of type Machine. The management controller provides flexible data typing for parameter values exchanged between tasks during pipeline execution. The management controller can parse JSON encodings, XML, and other such self-describing data types and can receive and output various different types of data-type values well known in both compiled and interpreted programming languages.

As shown in FIG. 27B, and as discussed below, during configuration of a pipeline via the graphical under interface provided by the automated-application-release-management subsystem, a parameter value can be specified as the value output by another task or as the value of a pipeline parameter. In one implementation, a dollar-sign-and-bracket notation is used to enclose a path-like specification of a particular inter-task parameter or pipeline parameter. An inter-task parameter, for example, is specified by the expression type 2704, with the contents of the braces including the specification of a stage, a task within a stage, and a particular parameter output by the task. By contrast, pipeline parameters are specified by the term "pipeline" followed by the name of the parameter, as indicated in expression 2705 in FIG. 27B.

FIG. 27C shows an input window displayed by the graphical user interface of an automated-application-release-management subsystem. In the text-entry field 2706, a pipeline definer has input text indicating that a provision task outputs a first parameter machineOutput that is an array of data objects of type "Machine." In FIG. 27D, a graphical-user-interface input window shows configuration of a subsequent task that receives, as an input parameter, the value of parameter machineOutput that is output by the task configured in FIG. 27C, as indicated using the dollar-sign-and-brace notation 2708.

FIG. 27E shows how the JSON-encoded output parameter machineOutput generated by the provision task, in part configured through the input window displayed by the graphical user interface that is shown in FIG. 27C and discussed above, can be accessed in a subsequent task. The output parameter machineOutput is a JSON array containing one or more objects of type Machine, as discussed above. The entire array can be referenced, as shown by reference 2310 in FIG. 27E, as "$DEV.ProvisionTask.machineOutput[0].name." However, individual objects of type Machine, and fields and objects within individual objects of type Machine, can be also be referenced. For example, the first object of type Machine in the array, previously shown as the single object 2703 of type Machine in FIG. 27A, can be accessed using the reference (2712 in FIG. 27E) "$DEV.ProvisionTask.machineOutput[0]." The name field 2716 of this first object, having the value "vcac-prov01," can be accessed by the reference (2714 in FIG. 27E) as "$DEV.ProvisionTask.machineOutput[0].name." The hostIP field of the value field of this first object 2720 can be accessed by the reference (2718 in FIG. 27E) "$DEV.ProvisionTask.machineOutput[0].value.hostIP"

The parameter binding between tasks is agnostic with respect to the type of encoding, allowing parameter values to be encoded in Extensible Markup Language ("XML"), JSON, YAML, and other such standard encoding formats. The input and output parameters have data types, such as the data type "array of objects of type Machine" used in the example of FIGS. 27A-E. As can be seen in the example of FIGS. 27A-E, the data types are essentially arbitrarily complex and, in many cases, are self-describing or at least partially self-describing, to facilitate exchange between pipeline tasks and external plug-ins. When a type mismatch between a parameter output by a first task and input by a second task is detected, binding may nonetheless be achieved by data-type transformations, in which field, objects, and values may be cast from one type to another or from one encoding to another encoding, in order to facilitate data exchange between tasks and between tasks and plug-ins.

Figure 28A:
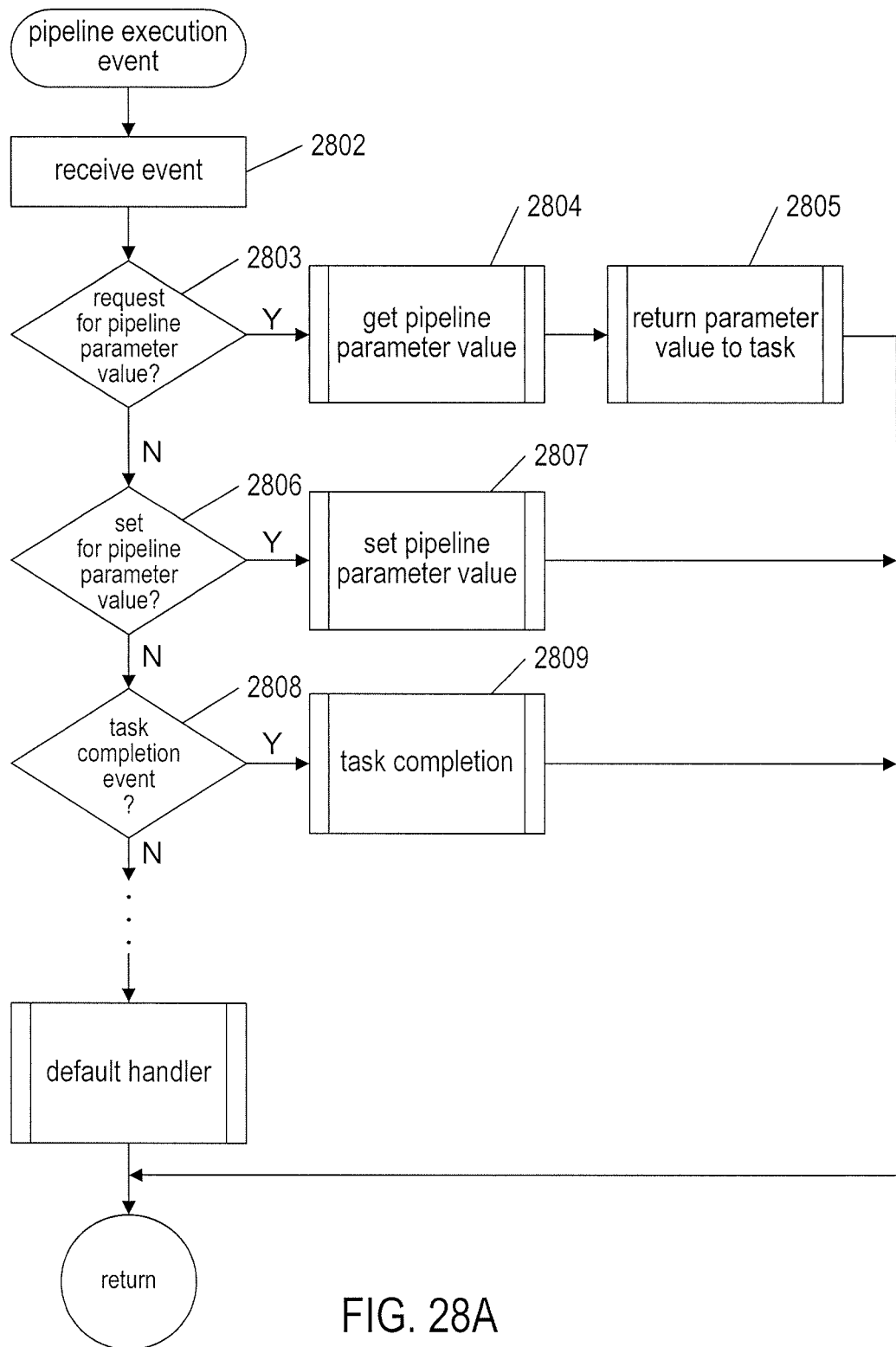
FIGS. 28A-D provide extracts of control-flow diagrams to indicate how, in one implementation, the management controller provides for inter-task information exchange.

FIGS. 28A-D provide extracts of control-flow diagrams to indicate how, in one implementation, the management controller provides for inter-task information exchange. FIG. 28A shows a partial implementation of the pipeline-execution-event routine called in step 2028 of FIG. 20B. In step 2802, the pipeline-execution-event routine receives an indication of the pipeline-execution event that needs to be handled. When the event is a request, by the workflow-execution engine, for a parameter value via a callback, as determined in step 2803, then, in step 2804, the management controller accesses the specified pipeline parameter value in the memory-resident pipeline-parameter-value array and returns that value to the workflow-execution engine for task execution, in step 2806. Otherwise, when the event is a request to set a pipeline-parameter value via a callback by the workflow-execution engine, as determined in step 2806, then the management controller sets the specified pipeline parameter to the indicated value in step 2807. When the event is a task-completion event, as determined in step 2808, then a task-completion handler is called in step 2809.

Figure 28B:
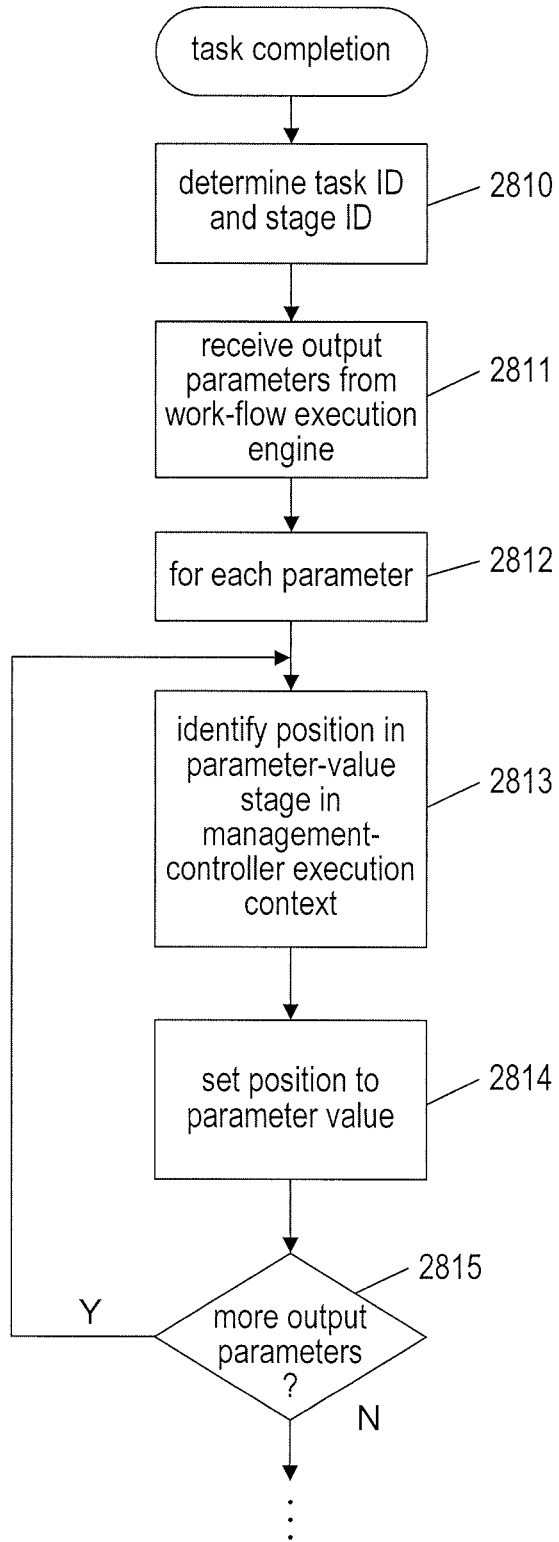

FIG. 28B shows a partial implementation of the task-completion handler called in step 2809 of FIG. 28A. In step 2810, the task-completion handler determines the identifier of the currently executing task and stage that includes the currently executing task. In step 2811, the task-completion handler receives the output parameters from the workflow-execution engine. Then, in the for-loop of steps 2812-2815, the task-completion handler considers each output parameter returned by the task, execution of which just completed. In step 2813, the task-completion handler identifies the position in which to place the returned parameter value within a memory-resident parameter-value array in the management-controller execution context. Then, in step 2814, the value at that position is set to the returned parameter value.

Figure 28C:
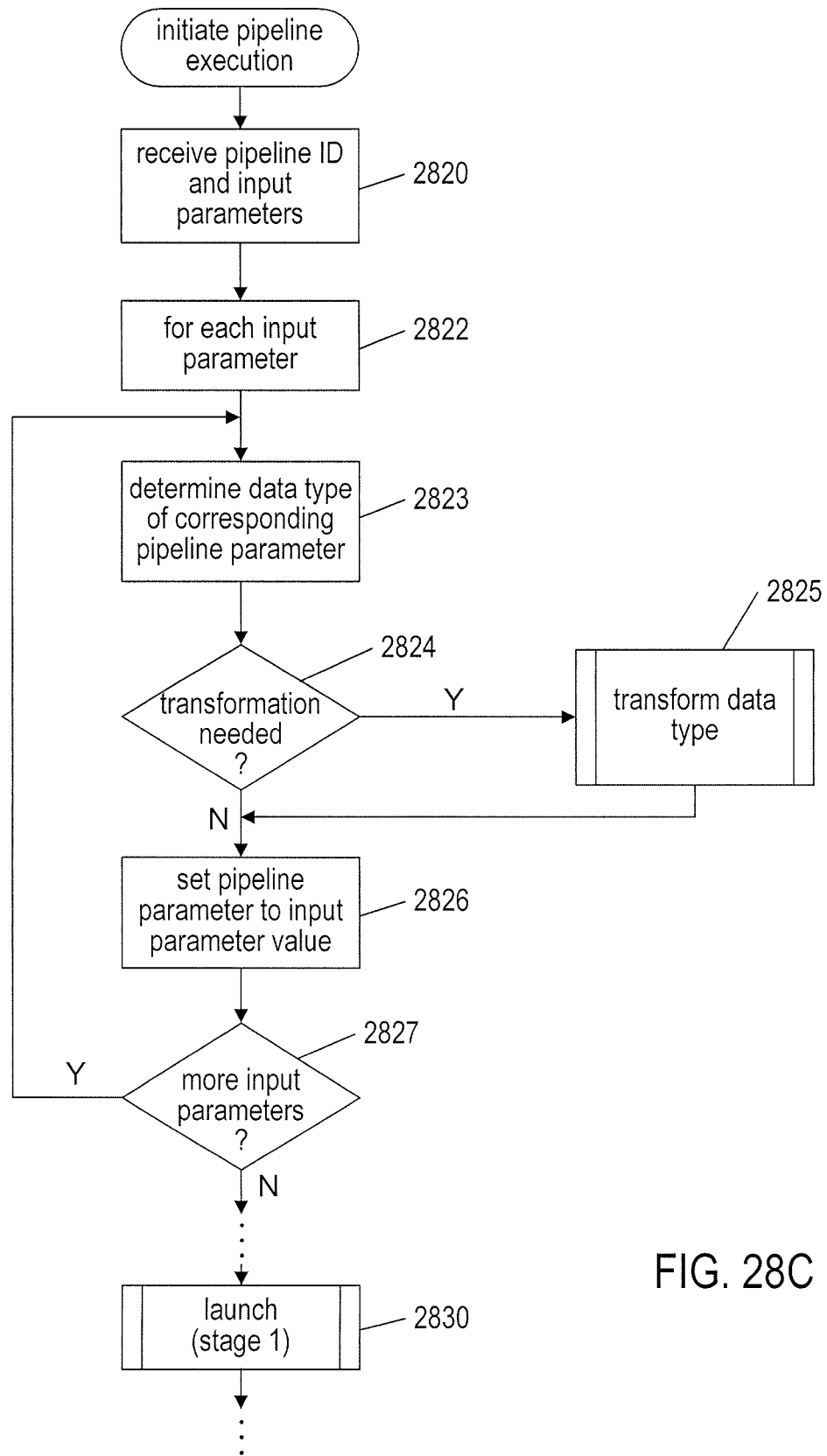

FIG. 28C shows a partial implementation of the initiate-pipeline-execution handler called in step 2024 in FIG. 20B. In step 2820, the initiate-pipeline-execution handler receives a pipeline ID and input parameters. In the for-loop of steps 2822-2827, the handler considers each received input parameter. In step 2823, the handler determines the data type of the corresponding pipeline parameter. In step 2824, the handler determines whether a data-type transformation is needed to transform the input parameter to a stored pipeline-parameter value. When a transformation is needed, a transformation-data-type routine is called in step 2825. In step 2826, the handler sets the pipeline parameter corresponding to the input parameter to the input parameter value. In a subsequent step 2830, the initiate-pipeline-execution handler launches the first stage of a pipeline.

Figure 28D:
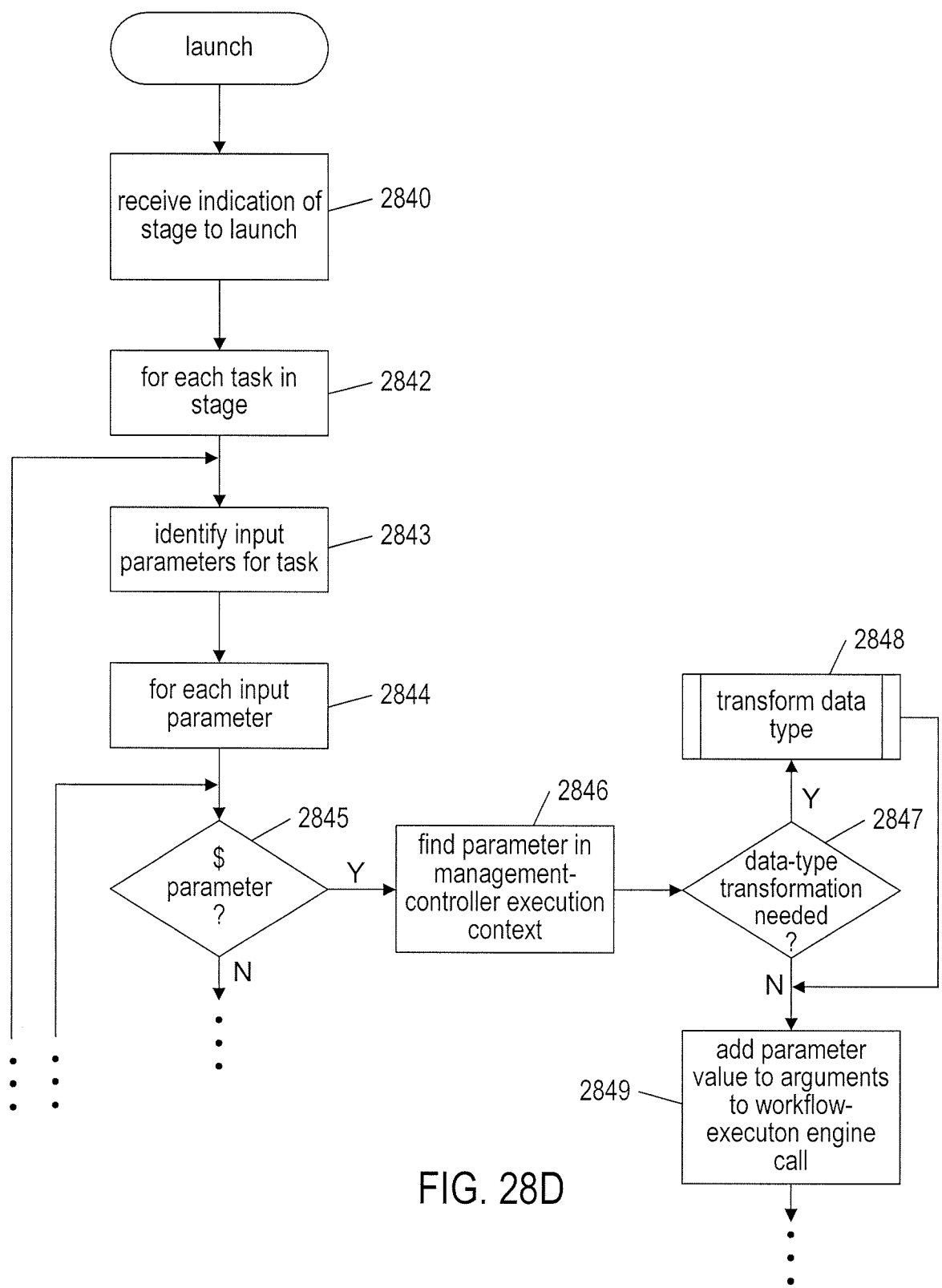

FIG. 28D shows a partial implementation of the launch routine called in step 2830 of FIG. 28C. In step 2840, the launch routine receives an indication of a stage for which execution needs to be initiated. In the for-loop of steps 2842-2849, each task in the stage is launched. For the currently considered task, the launch routine identifies the input parameters for the task in step 2843. For each input parameter, in an inner for-loop comprising steps 2844-2849, each of the input parameters is considered. When the input parameter is an inter-task parameter, as determined in step 2845, then, in step 2846, the launch routine finds the parameter in the management-controller execution context. When a data type transformation is needed for the parameter, as determined in step 2847, the stored parameter value is transformed, in step 2848. In step 2849, the parameter value is added as an argument to a workflow-execution-engine call to launch execution of the currently considered task. In steps not shown in FIG. 28D, the launch routine waits for execution to continue before launching execution of a subsequent task.

The REST Protocol and RESTful Applications

Figure 29:
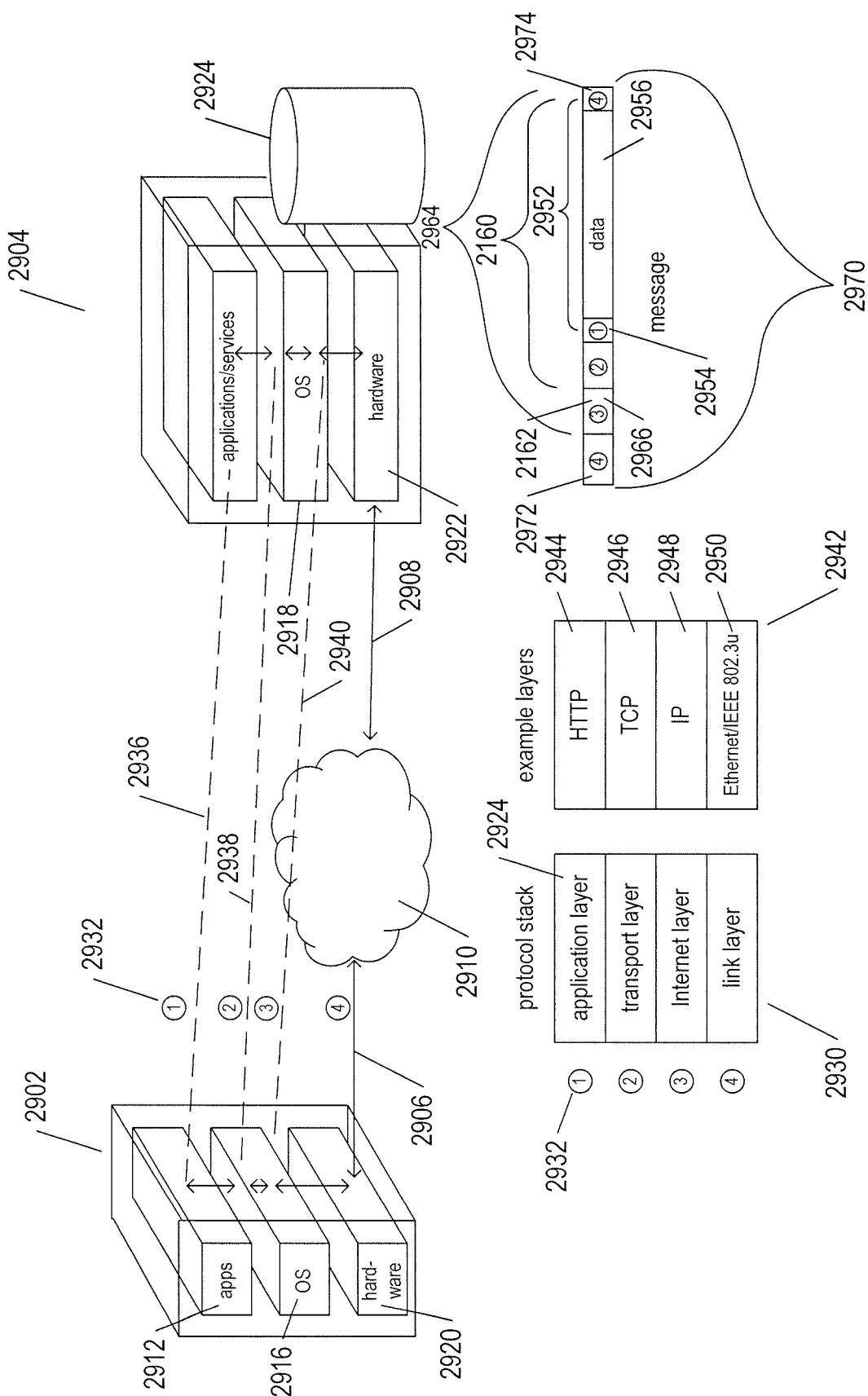
FIG. 29 shows a representation of a common protocol stack.

Electronic communications between computer systems generally comprises packets of information, referred to as datagrams, transferred from client computers to server computers and from server computers to client computers. In many cases, the communications between computer systems is commonly viewed from the relatively high level of an application program which uses an application-layer protocol for information transfer. However, the application-layer protocol is implemented on top of additional layers, including a transport layer, Internet layer, and link layer. These layers are commonly implemented at different levels within computer systems. Each layer is associated with a protocol for data transfer between corresponding layers of computer systems. These layers of protocols are commonly referred to as a "protocol stack." FIG. 29 shows a representation of a common protocol stack. In FIG. 29, a representation of a common protocol stack 2930 is shown below the interconnected server and client computers 2904 and 2902. The layers are associated with layer numbers, such as layer number "1" 2932 associated with the application layer 2934. These same layer numbers are used in the depiction of the interconnection of the client computer 2902 with the server computer 2904, such as layer number "1" 2932 associated with a horizontal dashed line 2936 that represents interconnection of the application layer 2912 of the client computer with the applications/services layer 2914 of the server computer through an application-layer protocol. A dashed line 2936 represents interconnection via the application-layer protocol in FIG. 29, because this interconnection is logical, rather than physical. Dashed-line 2938 represents the logical interconnection of the operating-system layers of the client and server computers via a transport layer. Dashed line 2940 represents the logical interconnection of the operating systems of the two computer systems via an Internet-layer protocol. Finally, links 2906 and 2908 and cloud 2910 together represent the physical communications media and components that physically transfer data from the client computer to the server computer and from the server computer to the client computer. These physical communications components and media transfer data according to a link-layer protocol. In FIG. 29, a second table 2942 aligned with the table 2930 that illustrates the protocol stack includes example protocols that may be used for each of the different protocol layers. The hypertext transfer protocol ("HTTP") may be used as the application-layer protocol 2944, the transmission control protocol ("TCP") 2946 may be used as the transport-layer protocol, the Internet protocol 2948 ("IP") may be used as the Internet-layer protocol, and, in the case of a computer system interconnected through a local Ethernet to the Internet, the Ethernet/IEEE 802.3u protocol 2950 may be used for transmitting and receiving information from the computer system to the complex communications components of the Internet. Within cloud 2910, which represents the Internet, many additional types of protocols may be used for transferring the data between the client computer and server computer.

Consider the sending of a message, via the HTTP protocol, from the client computer to the server computer. An application program generally makes a system call to the operating system and includes, in the system call, an indication of the recipient to whom the data is to be sent as well as a reference to a buffer that contains the data. The data and other information are packaged together into one or more HTTP datagrams, such as datagram 2952. The datagram may generally include a header 2954 as well as the data 2956, encoded as a sequence of bytes within a block of memory. The header 2954 is generally a record composed of multiple byte-encoded fields. The call by the application program to an application-layer system call is represented in FIG. 29 by solid vertical arrow 2958. The operating system employs a transport-layer protocol, such as TCP, to transfer one or more application-layer datagrams that together represent an application-layer message. In general, when the application-layer message exceeds some threshold number of bytes, the message is sent as two or more transport-layer messages. Each of the transport-layer messages 2960 includes a transport-layer-message header 2962 and an application-layer datagram 2952. The transport-layer header includes, among other things, sequence numbers that allow a series of application-layer datagrams to be reassembled into a single application-layer message. The transport-layer protocol is responsible for end-to-end message transfer independent of the underlying network and other communications subsystems, and is additionally concerned with error control, segmentation, as discussed above, flow control, congestion control, application addressing, and other aspects of reliable end-to-end message transfer. The transport-layer datagrams are then forwarded to the Internet layer via system calls within the operating system and are embedded within Internet-layer datagrams 2964, each including an Internet-layer header 2966 and a transport-layer datagram. The Internet layer of the protocol stack is concerned with sending datagrams across the potentially many different communications media and subsystems that together comprise the Internet. This involves routing of messages through the complex communications systems to the intended destination. The Internet layer is concerned with assigning unique addresses, known as "IP addresses," to both the sending computer and the destination computer for a message and routing the message through the Internet to the destination computer. Internet-layer datagrams are finally transferred, by the operating system, to communications hardware, such as a network-interface controller ("NIC") which embeds the Internet-layer datagram 2964 into a link-layer datagram 2970 that includes a link-layer header 2972 and generally includes a number of additional bytes 2974 appended to the end of the Internet-layer datagram. The link-layer header includes collision-control and error-control information as well as local-network addresses. The link-layer packet or datagram 2970 is a sequence of bytes that includes information introduced by each of the layers of the protocol stack as well as the actual data that is transferred from the source computer to the destination computer according to the application-layer protocol.

Figure 30:
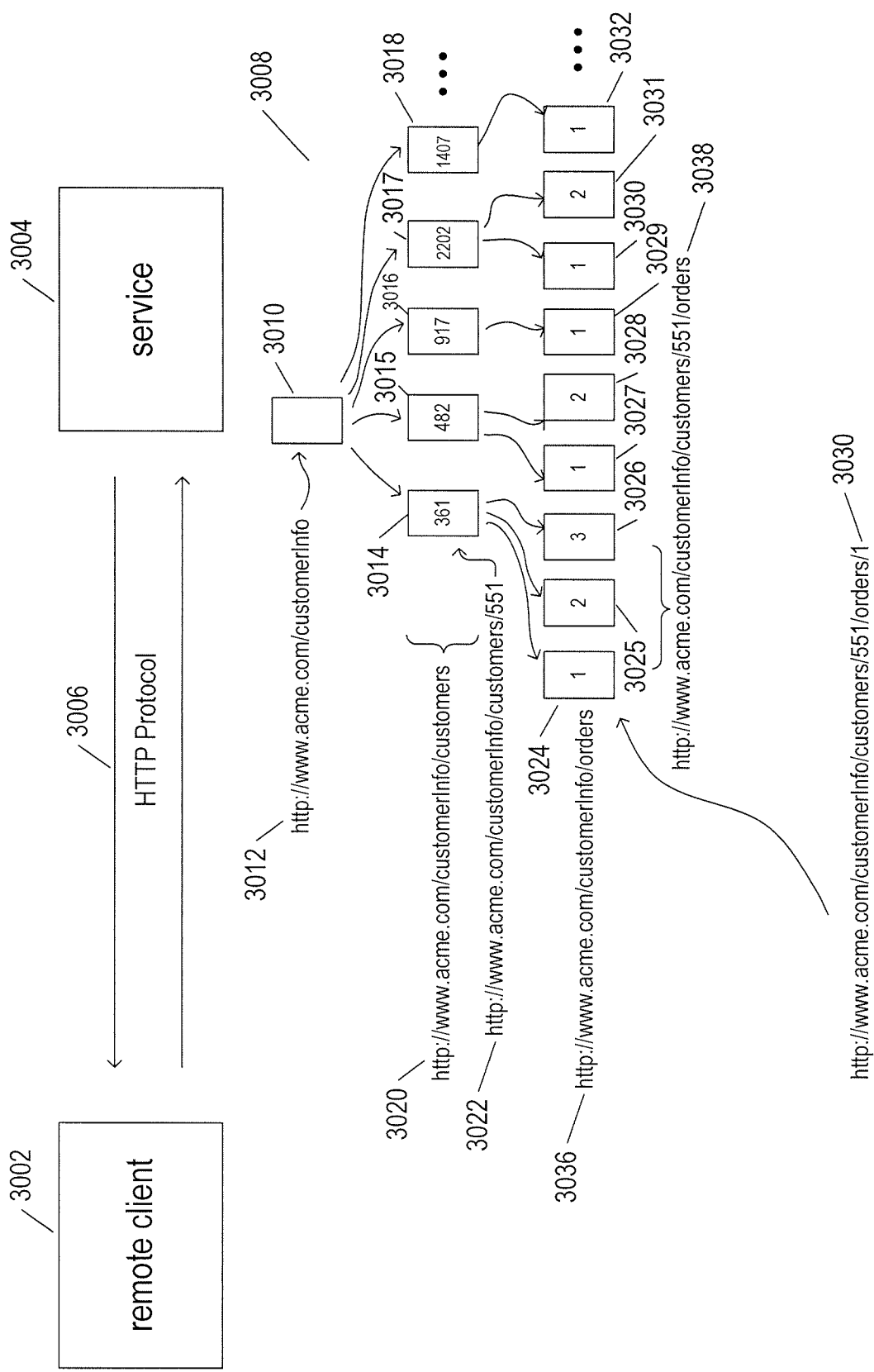
FIG. 30 illustrates the role of resources in RESTful APIs.

Next, the RESTful approach to web-service APIs is described, beginning with FIG. 30. FIG. 30 illustrates the role of resources in RESTful APIs. In FIG. 30, and in subsequent figures, a remote client 3002 is shown to be interconnected and communicating with a service provided by one or more service computers 3004 via the HTTP protocol 3006. Many RESTful APIs are based on the HTTP protocol. Thus, the focus is on the application layer in the following discussion. However, as discussed above with reference to FIG. 30, the remote client 3002 and service provided by one or more server computers 3004 are, in fact, physical systems with application, operating-system, and hardware layers that are interconnected with various types of communications media and communications subsystems, with the HTTP protocol the highest-level layer in a protocol stack implemented in the application, operating-system, and hardware layers of client computers and server computers. The service may be provided by one or more server computers, as discussed above in a preceding section. As one example, a number of servers may be hierarchically organized as various levels of intermediary servers and end-point servers. However, the entire collection of servers that together provide a service are addressed by a domain name included in a uniform resource identifier ("URI"), as further discussed below. A RESTful API is based on a small set of verbs, or operations, provided by the HTTP protocol and on resources, each uniquely identified by a corresponding URI. Resources are logical entities, information about which is stored on one or more servers that together comprise a domain. URIs are the unique names for resources. A resource about which information is stored on a server that is connected to the Internet has a unique URI that allows that information to be accessed by any client computer also connected to the Internet with proper authorization and privileges. URIs are thus globally unique identifiers, and can be used to specify resources on server computers throughout the world. A resource may be any logical entity, including people, digitally encoded documents, organizations, and other such entities that can be described and characterized by digitally encoded information. A resource is thus a logical entity. Digitally encoded information that describes the resource and that can be accessed by a client computer from a server computer is referred to as a "representation" of the corresponding resource. As one example, when a resource is a web page, the representation of the resource may be a hypertext markup language ("HTML") encoding of the resource. As another example, when the resource is an employee of a company, the representation of the resource may be one or more records, each containing one or more fields, that store information characterizing the employee, such as the employee's name, address, phone number, job title, employment history, and other such information.

In the example shown in FIG. 30, the web servers 3004 provides a RESTful API based on the HTTP protocol 3006 and a hierarchically organized set of resources 3008 that allow clients of the service to access information about the customers and orders placed by customers of the Acme Company. This service may be provided by the Acme Company itself or by a third-party information provider. All of the customer and order information is collectively represented by a customer information resource 3010 associated with the URI "http://www.acme.com/customerInfo" 3012. As discussed further, below, this single URI and the HTTP protocol together provide sufficient information for a remote client computer to access any of the particular types of customer and order information stored and distributed by the service 3004. A customer information resource 3010 represents a large number of subordinate resources. These subordinate resources include, for each of the customers of the Acme Company, a customer resource, such as customer resource 3014. All of the customer resources 3014-3018 are collectively named or specified by the single URI "http://www.acme.com/customerInfo/customers" 3020. Individual customer resources, such as customer resource 3014, are associated with customer-identifier numbers and are each separately addressable by customer-resource-specific URIs, such as URI "http://www.acme.com/customerInfo/customers/361" 3022 which includes the customer identifier "361" for the customer represented by customer resource 3014. Each customer may be logically associated with one or more orders. For example, the customer represented by customer resource 3014 is associated with three different orders 3024-3026, each represented by an order resource. All of the orders are collectively specified or named by a single URI "http://www.acme.com/customerInfo/orders" 3036. All of the orders associated with the customer represented by resource 3014, orders represented by order resources 3024-3026, can be collectively specified by the URI "http://www.acme.com/customerInfo/customers/361/orders" 3038. A particular order, such as the order represented by order resource 3024, may be specified by a unique URI associated with that order, such as URI "http://www.acme.com/customerInfo/customers/361/orders/1" 3040, where the final "1" is an order number that specifies a particular order within the set of orders corresponding to the particular customer identified by the customer identifier "361."

In one sense, the URIs bear similarity to path names to files in file directories provided by computer operating systems. However, it should be appreciated that resources, unlike files, are logical entities rather than physical entities, such as the set of stored bytes that together compose a file within a computer system. When a file is accessed through a path name, a copy of a sequence of bytes that are stored in a memory or mass-storage device as a portion of that file are transferred to an accessing entity. By contrast, when a resource is accessed through a URI, a server computer returns a digitally encoded representation of the resource, rather than a copy of the resource. For example, when the resource is a human being, the service accessed via a URI specifying the human being may return alphanumeric encodings of various characteristics of the human being, a digitally encoded photograph or photographs, and other such information. Unlike the case of a file accessed through a path name, the representation of a resource is not a copy of the resource, but is instead some type of digitally encoded information with respect to the resource.

In the example RESTful API illustrated in FIG. 30, a client computer can use the verbs, or operations, of the HTTP protocol and the top-level URI 3012 to navigate the entire hierarchy of resources 3008 in order to obtain information about particular customers and about the orders that have been placed by particular customers.

FIGS. 31A-D illustrate four basic verbs, or operations, provided by the HTTP application-layer protocol used in RESTful applications. RESTful applications are client/server protocols in which a client issues an HTTP request message to a service or server and the service or server responds by returning a corresponding HTTP response message. FIGS. 31A-D use the illustration conventions discussed above with reference to FIG. 30 with regard to the client, service, and HTTP protocol. For simplicity and clarity of illustration, in each of these figures, a top portion illustrates the request and a lower portion illustrates the response. The remote client 3102 and service 3104 are shown as labeled rectangles, as in FIG. 30. A right-pointing solid arrow 3106 represents sending of an HTTP request message from a remote client to the service and a left-pointing solid arrow 3108 represents sending of a response message corresponding to the request message by the service to the remote client. For clarity and simplicity of illustration, the service 3104 is shown associated with a few resources 3110-3112.

Figure 31A:
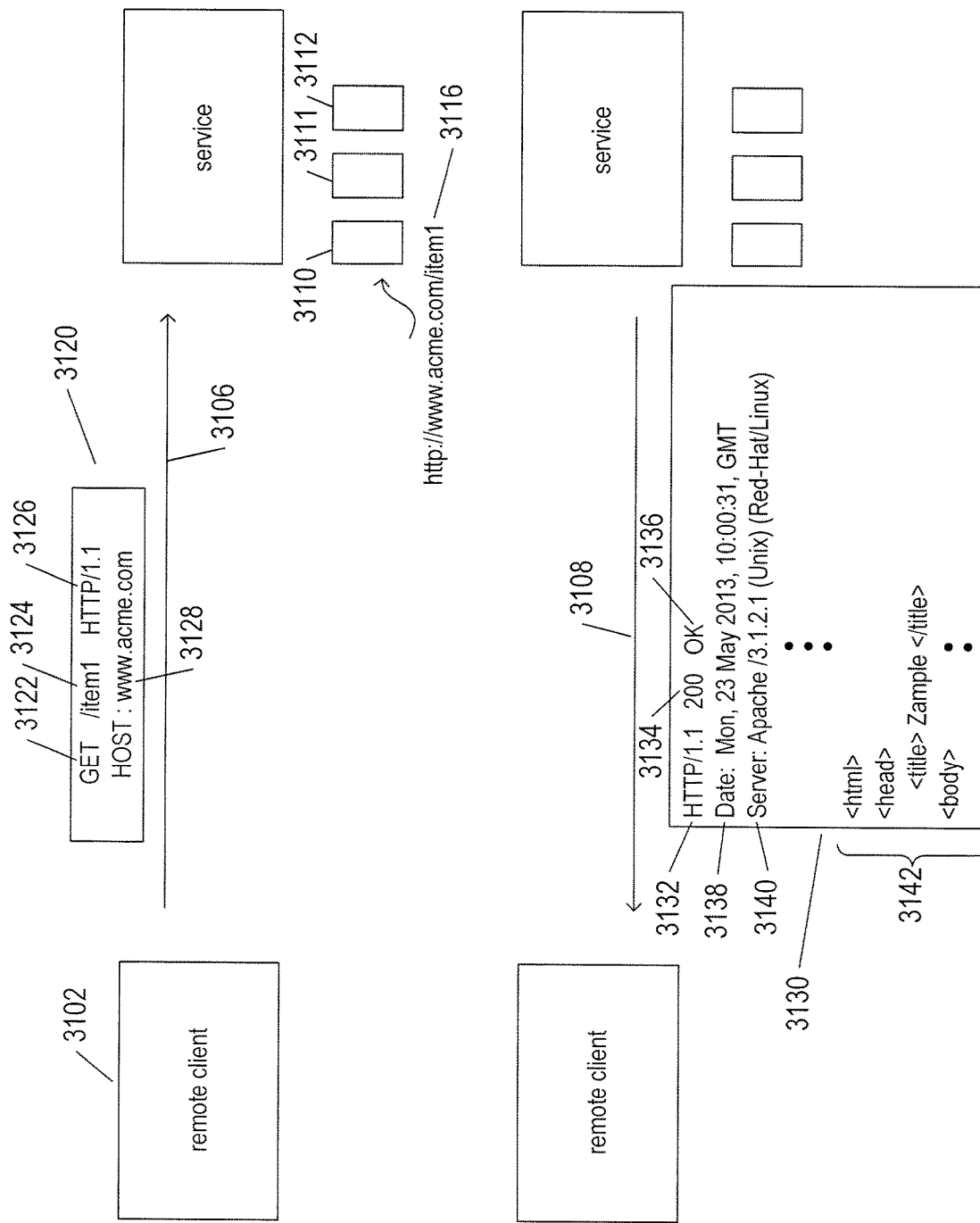
FIGS. 31A-D illustrate four basic verbs, or operations, provided by the HTTP application-layer protocol used in RESTful applications.

FIG. 31A illustrates the GET request and a typical response. The GET request requests the representation of a resource identified by a URI from a service. In the example shown in FIG. 31A, the resource 3110 is uniquely identified by the URI "http://www.acme.com/item1" 3116. The initial substring "http://www.acme.com" is a domain name that identifies the service. Thus, URI 3116 can be thought of as specifying the resource "item1" that is located within and managed by the domain "www.acme.com." The GET request 3120 includes the command "GET" 3122, a relative resource identifier 3124 that, when appended to the domain name, generates the URI that uniquely identifies the resource, and in an indication of the particular underlying application-layer protocol 3126. A request message may include one or more headers, or key/value pairs, such as the host header 3128 "Host:www.acme.com" that indicates the domain to which the request is directed. There are many different headers that may be included. In addition, a request message may also include a request-message body. The body may be encoded in any of various different self-describing encoding languages, often JSON, XML, or HTML. In the current example, there is no request-message body. The service receives the request message containing the GET command, processes the message, and returns a corresponding response message 3130. The response message includes an indication of the application-layer protocol 3132, a numeric status 3134, a textural status 3136, various headers 3138 and 3140, and, in the current example, a body 3142 that includes the HTML encoding of a web page. Again, however, the body may contain any of many different types of information, such as a JSON object that encodes a personnel file, customer description, or order description. GET is the most fundamental and generally most often used verb, or function, of the HTTP protocol.

Figure 31B:
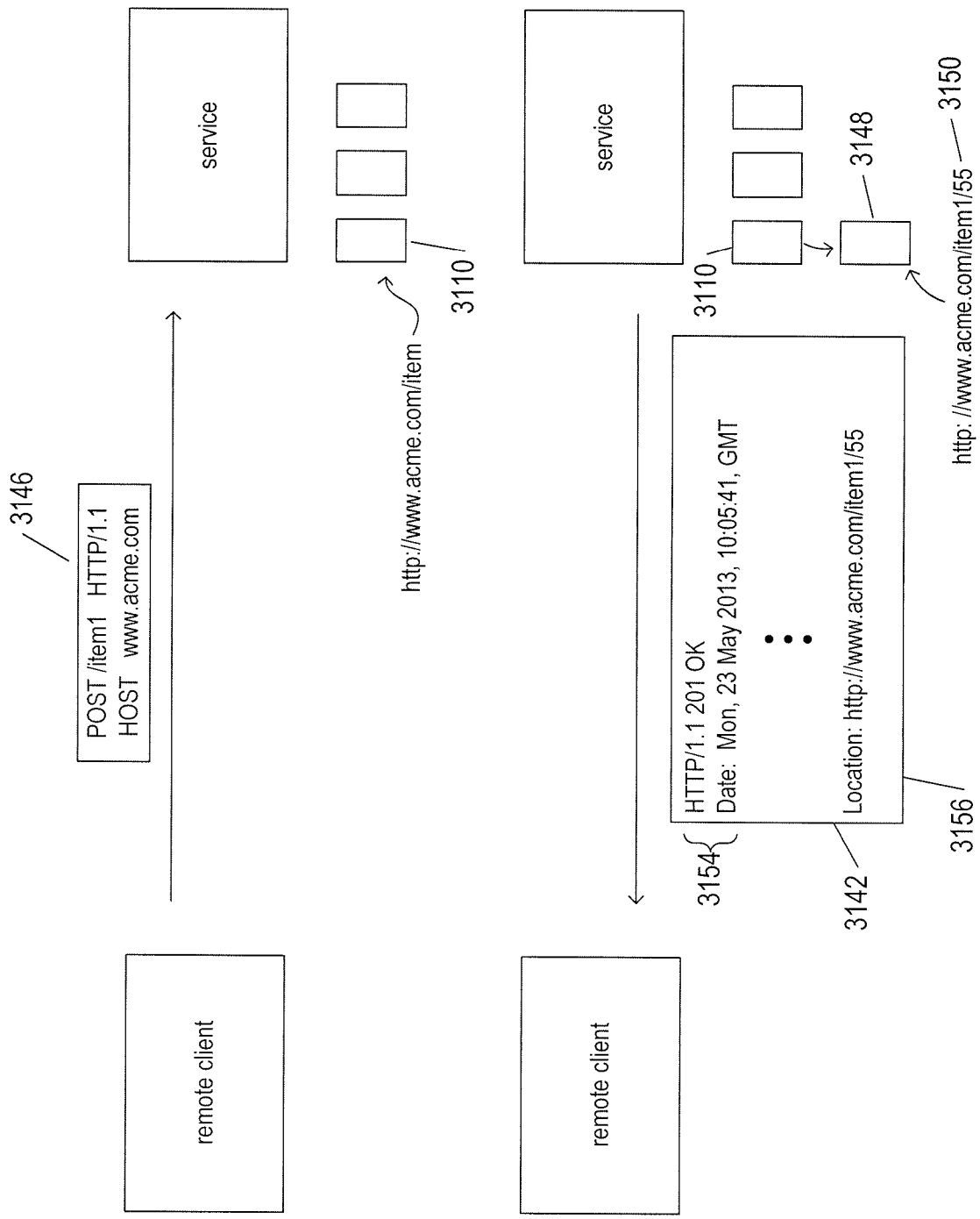

FIG. 31B illustrates the POST HTTP verb. In FIG. 31B, the client sends a POST request 3146 to the service that is associated with the URI "http://www.acme.com/item1." In many RESTful APIs, a POST request message requests that the service create a new resource subordinate to the URI associated with the POST request and provide a name and corresponding URI for the newly created resource. Thus, as shown in FIG. 31B, the service creates a new resource 3148 subordinate to resource 3110 specified by URI "http://www.acme.com/item1," and assigns an identifier "36" to this new resource, creating for the new resource the unique URI "http://www.acme.com/item1/36" 3150. The service then transmits a response message 3152 corresponding to the POST request back to the remote client. In addition to the application-layer protocol, status, and headers 3154, the response message includes a location header 3156 with the URI of the newly created resource. According to the HTTP protocol, the POST verb may also be used to update existing resources by including a body with update information. However, RESTful APIs generally use POST for creation of new resources when the names for the new resources are determined by the service. The POST request 3146 may include a body containing a representation or partial representation of the resource that may be incorporated into stored information for the resource by the service.

Figure 31C:
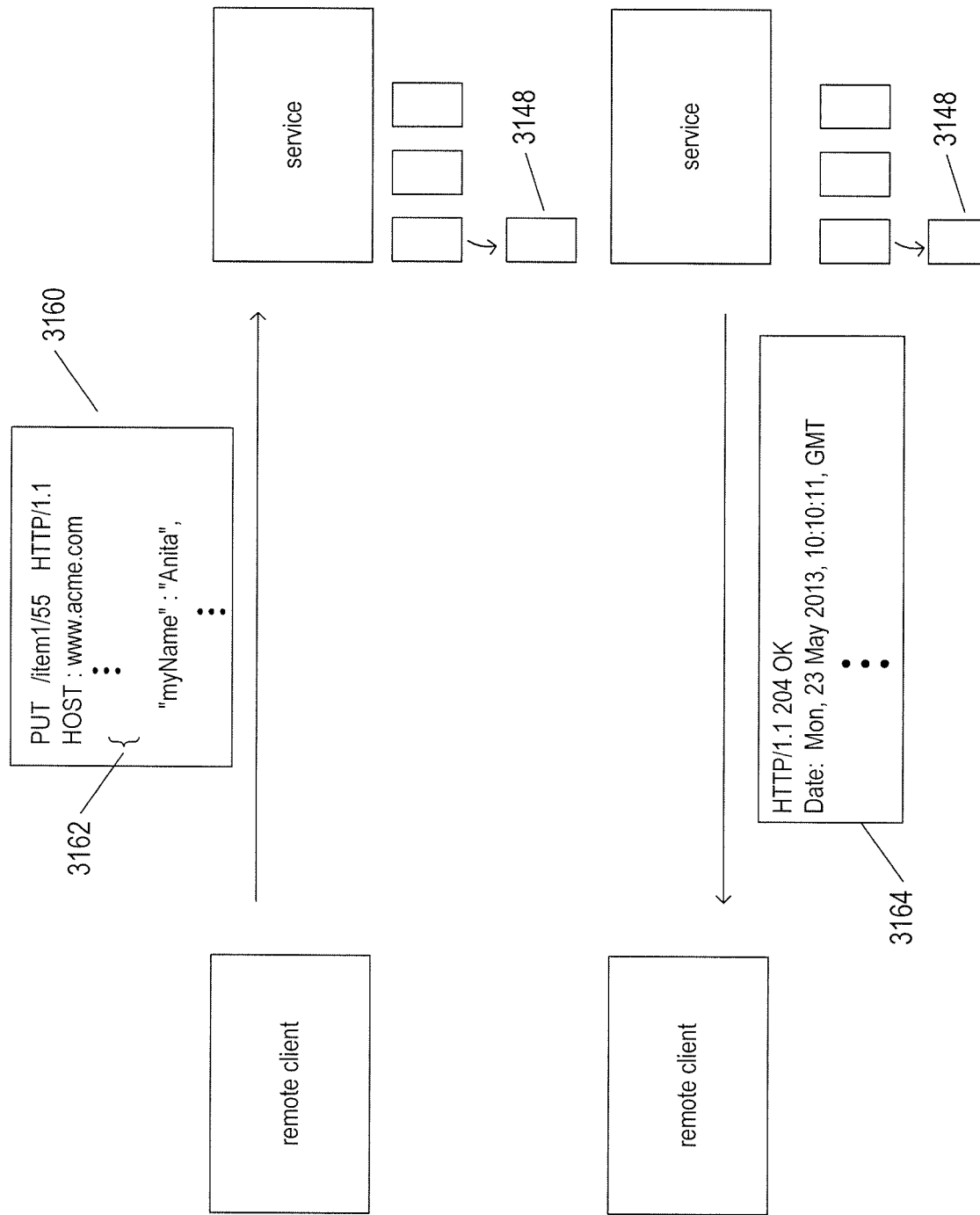

FIG. 31C illustrates the PUT HTTP verb. In RESTful APIs, the PUT HTTP verb is generally used for updating existing resources or for creating new resources when the name for the new resources is determined by the client, rather than the service. In the example shown in FIG. 31C, the remote client issues a PUT HTTP request 3160 with respect to the URI "http://www.acme.com/item1/36" that names the newly created resource 3148. The PUT request message includes a body with a JSON encoding of a representation or partial representation of the resource 3162. In response to receiving this request, the service updates resource 3148 to include the information 3162 transmitted in the PUT request and then returns a response corresponding to the PUT request 3164 to the remote client.

Figure 31D:
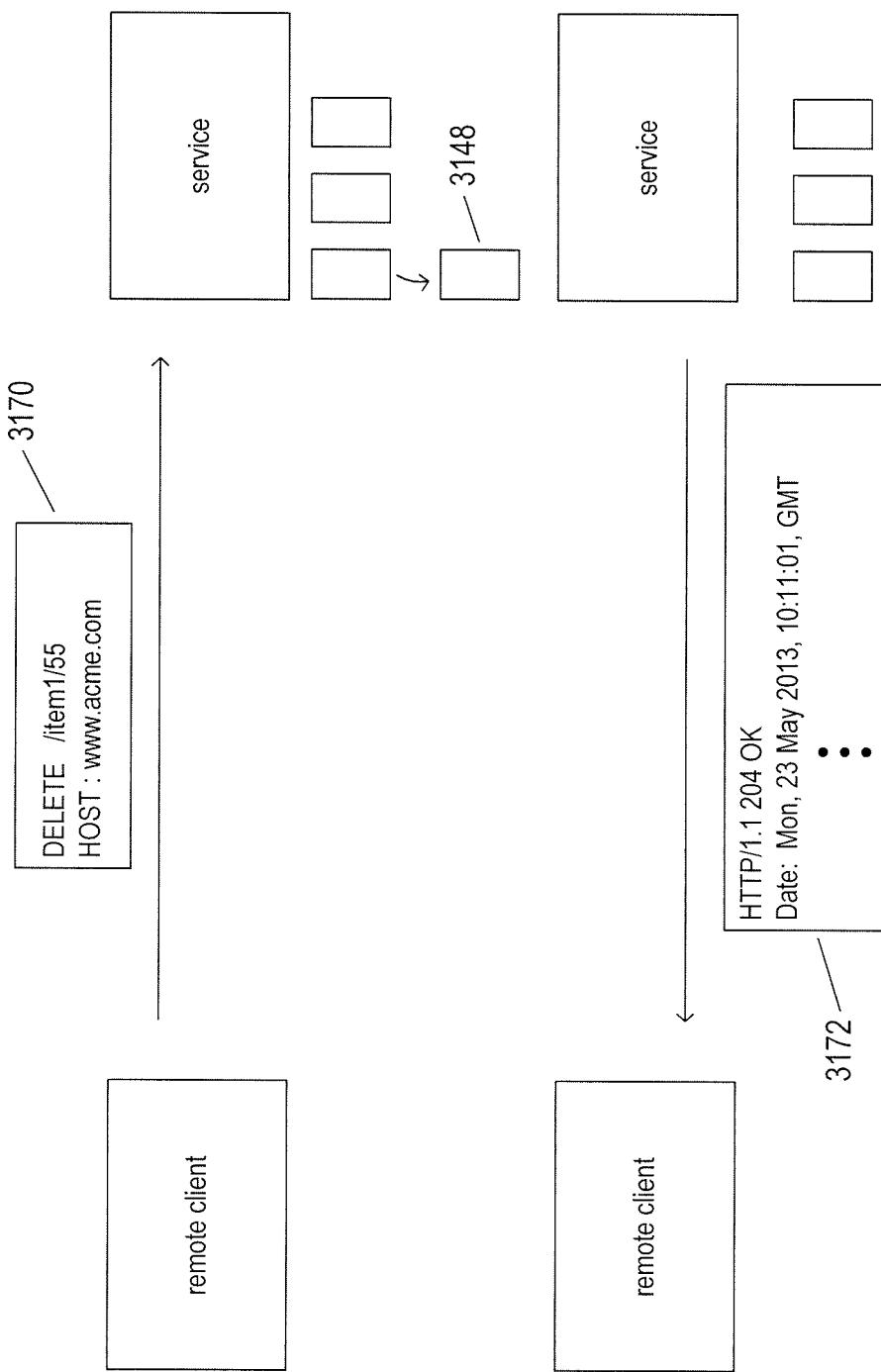

FIG. 31D illustrates the DELETE HTTP verb. In the example shown in FIG. 31D, the remote client transmits a DELETE HTTP request 3170 with respect to URI "http://www.acme.com/item1/36" that uniquely specifies newly created resource 3148 to the service. In response, the service deletes the resource associated with the URL and returns a response message 3172.

As further discussed below, and as mentioned above, a service may return, in response messages, various different links, or URIs, in addition to a resource representation. These links may indicate, to the client, additional resources related in various different ways to the resource specified by the URI associated with the corresponding request message. As one example, when the information returned to a client in response to a request is too large for a single HTTP response message, it may be divided into pages, with the first page returned along with additional links, or URIs, that allow the client to retrieve the remaining pages using additional GET requests. As another example, in response to an initial GET request for the customer info resource (3010 in FIG. 30), the service may provide URIs 3020 and 3036 in addition to a requested representation to the client, using which the client may begin to traverse the hierarchical resource organization in subsequent GET requests.

Expansion of the Set of Entrypoints Available to Release Pipelines

Figure 32:
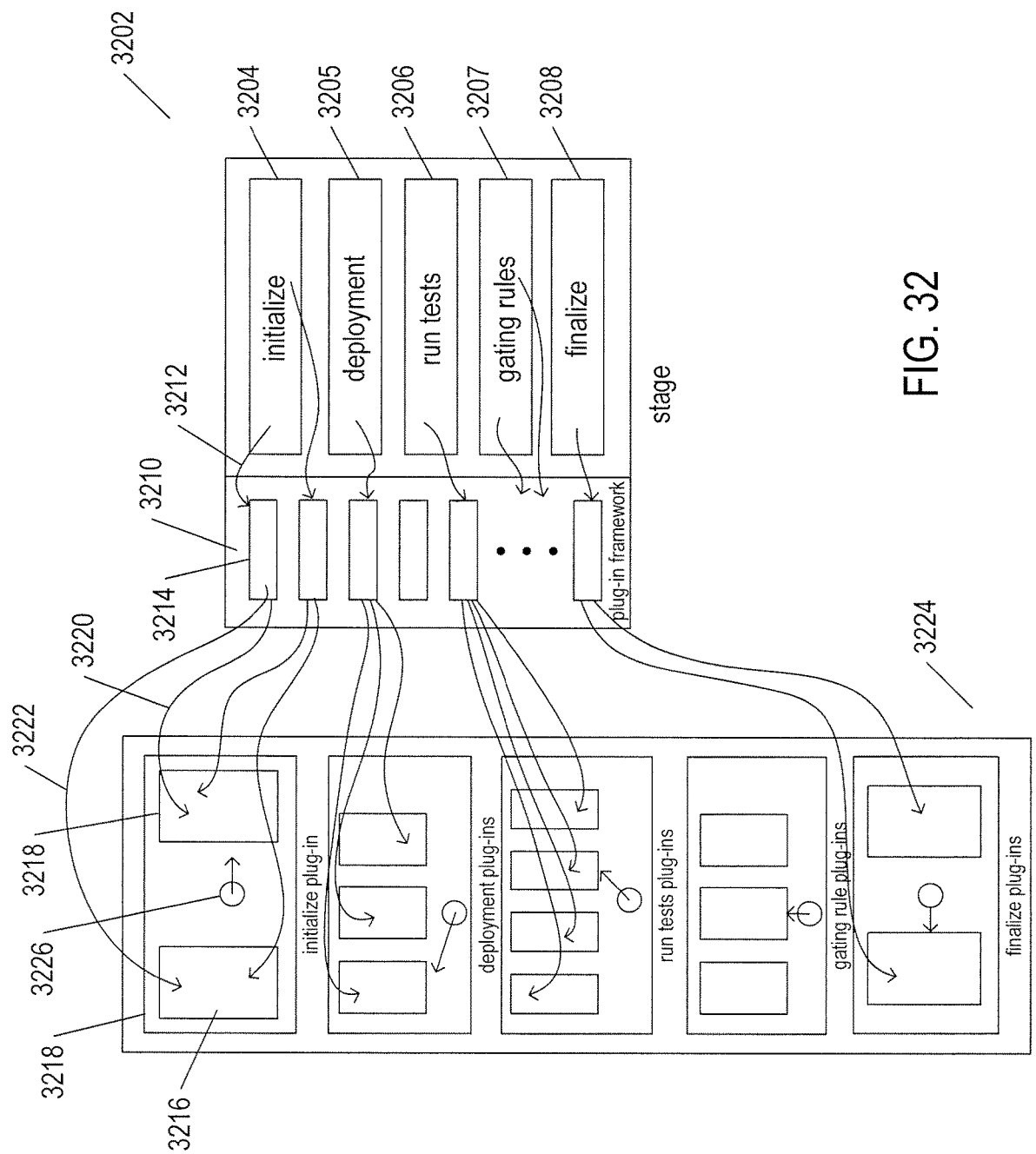
FIG. 32 illustrates additional details with respect to particular type of application-release-management-pipeline stage that is used in pipelines executed by a particular class of implementations of the automated application-release-management subsystem.

FIG. 32 illustrates additional details with respect to particular type of application-release-management-pipeline stage that is used in pipelines executed by a particular class of implementations of the automated application-release-management subsystem. The application-release-management-pipeline stage 3202 shown in FIG. 32 includes the initialize 3204, deployment 3205, run tests 3206, gating rules 3207, and finalize 3208 tasks discussed above with respect to the application-release-management-pipeline stage shown in inset 1916 of FIG. 19. In addition, the application-release-management-pipeline stage 3202 includes a plug-in framework 3210 that represents one component of a highly modularized implementation of an automated application-release-management subsystem.

The various tasks 3207-3208 in the pipeline stage 3202 are specified as workflows that are executed by a work-flow execution engine, as discussed above with reference to FIGS. 18-20B. These tasks include REST entrypoints which represent positions within the workflows at each of which the workflow execution engine makes a callback to the automated application-release-management subsystem. The callbacks are mapped to function and routine calls represented by entries in the plug-in framework 3210. For example, the initialized task 3204 includes a REST endpoint that is mapped, as indicated by curved arrow 3212, to entry 3214 in the plug-in framework, which represents a particular function or routine that is implemented by one or more external modules or subsystems interconnected with the automated application-release-management subsystem via plug-in technology. These plug-in-framework entries, such as entry 3214, are mapped to corresponding routine and function calls supported by each of one or more plugged-in modules or subsystems. In the example shown in FIG. 32, entry 3214 within the plug-in framework that represents a particular function or routine called within the initialized task is mapped to a corresponding routine or function in each of two plugged-in modules or subsystems 3216 and 3218 within a set of plugged-in modules or subsystems 3218 that support REST entrypoints in the initialized task, as represented in FIG. 32 by curved arrows 3220 and 3222. During pipeline execution, callbacks to REST entrypoints in tasks within application-release-management pipelines are processed by calling the external routines and functions to which the REST entrypoints are mapped.

Each stage in an application-release-management pipeline includes a stage-specific plug-in framework, such as the plug-in framework 3210 for stage 3202. The automated application-release-management subsystem within which the stages and pipelines are created and executed is associated with a set of sets of plugged-in modules and subsystems, such as the set of sets of plugged-in modules and subsystems 3224 shown in FIG. 32. A cloud-computing facility administrator or manager, when installing a workflow-based cloud-management system that incorporates the automated application-release-management subsystem or reconfiguring the workflow-based cloud-management system may, during the installation or reconfiguration process, choose which of the various plugged-in modules and subsystems should be used for executing application-release-management pipelines. Thus, the small selection features, such as selection feature 3226 shown within the set of sets of plugged-in modules and subsystems 3224, indicates that, in many cases, one of the multiple different plugged-in modules or subsystems may be selected for executing application-release-management-pipeline tasks. This architecture enables a cloud-computing-facility administrator or manager to select particular external modules to carry out tasks within pipeline stages and to easily change out, and substitute for, particular plugged-in modules and subsystems without reinstalling the workflow-based cloud-management system or the automated application-release-management subsystem. Furthermore, the automated application-release-management subsystem is implemented to interface to both any currently available external modules and subsystems as well as to external modules and subsystems that may become available at future points in time.

Figure 33A:
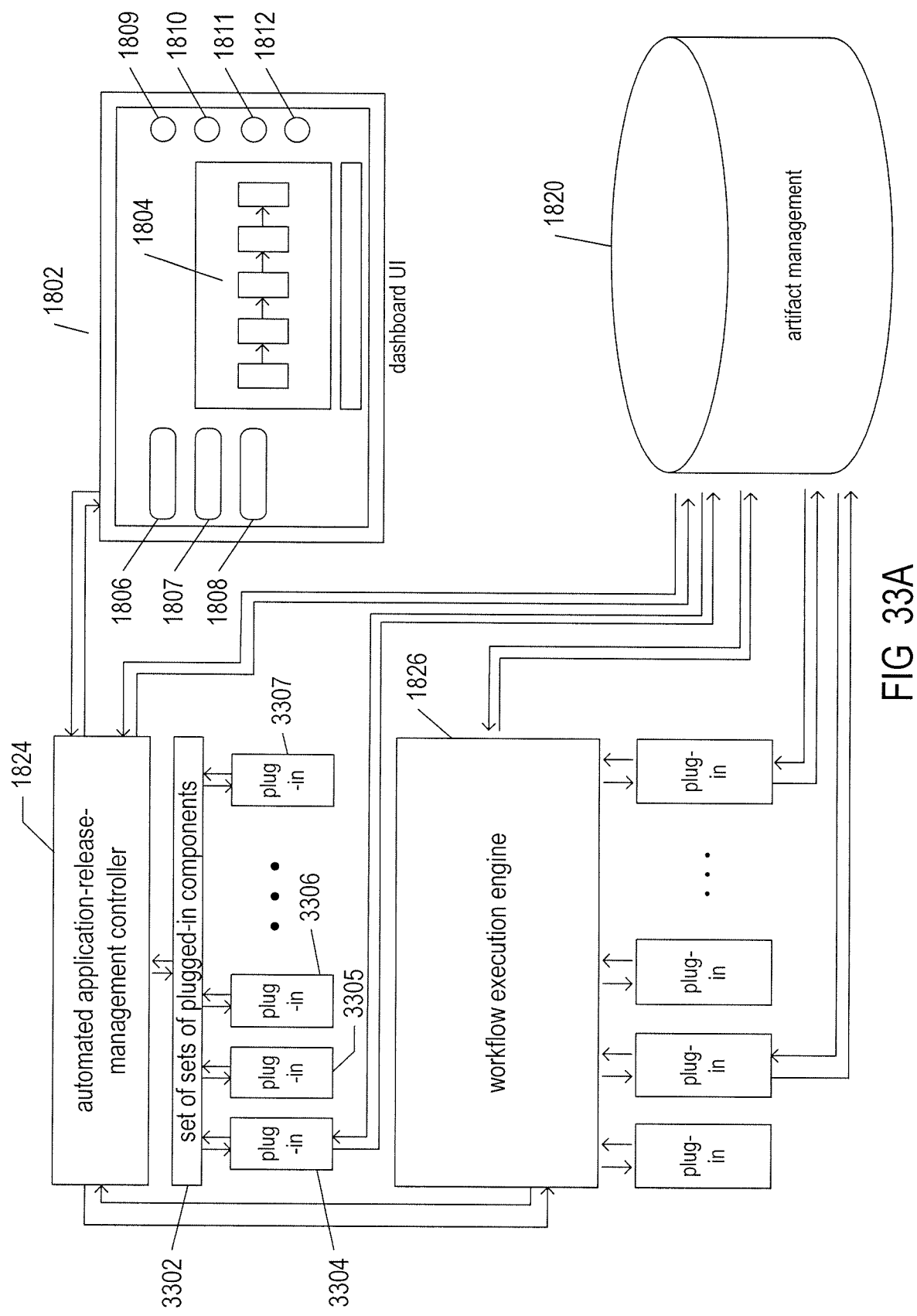
FIGS. 33A-B illustrate the highly modularized automated application-release-management subsystem to which the current document is directed using illustration conventions similar to those used in FIG. 18.
Figure 33B:
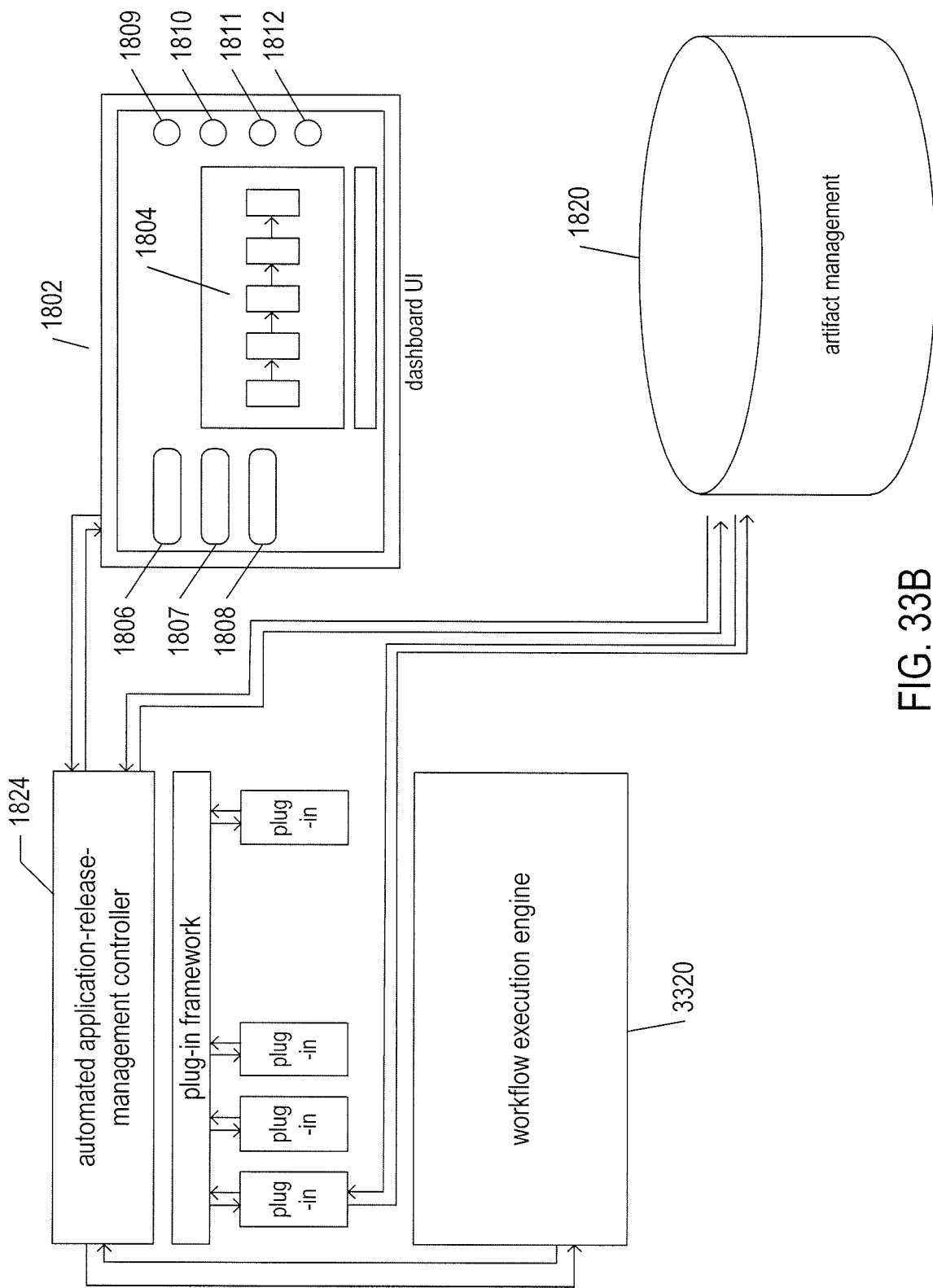

FIGS. 33A-B illustrate the highly modularized automated application-release-management subsystem to which the current document is directed using illustration conventions similar to those used in FIG. 18. The components previously shown in FIG. 18 are labeled with the same numeric labels in FIG. 33A as in FIG. 18. As shown in FIG. 33A, the automated application-release-management controller 1824 includes or interfaces to the set of sets of plugged-in modules and subsystems 3302, discussed above as set of sets 3224 in FIG. 32. This set of sets of plugged-in modules and subsystems provides a flexible interface between the automated application-release-management controller 1824 and the various plugged-in modules and subsystems 3304-3307 that provide implementations of a variety of the REST entrypoints included in task workflows within pipeline stages. The highly modularized automated application-re-lease-management subsystem thus provides significantly greater flexibility with respect to external modules and subsystems that can be plugged in to the automated application-release-management subsystem in order to implement automated application-release-management-subsystem functionality.

As shown in FIG. 33B, the highly modularized automated-application-release-management subsystem additionally allows for the replacement of the workflow execution engine (1826 in FIG. 33A) initially bundled within the workflow-based cloud-management system, discussed above with reference to FIG. 11, by any of alternative, currently available workflow execution engines or by a workflow execution engine specifically implemented to execute workflows that implement application-release-management-pipeline tasks and stages. Thus, as shown in FIG. 33B, a different workflow execution engine 3320 has been substituted for the original workflow execution engine 1826 in FIG. 33A used by the automated application-release-management subsystem to execute pipeline workflows. In essence, the workflow execution engine becomes another modular component that may be easily interchanged with other, similar components for particular automated-application-release-management-subsystem installations.

Figure 34:
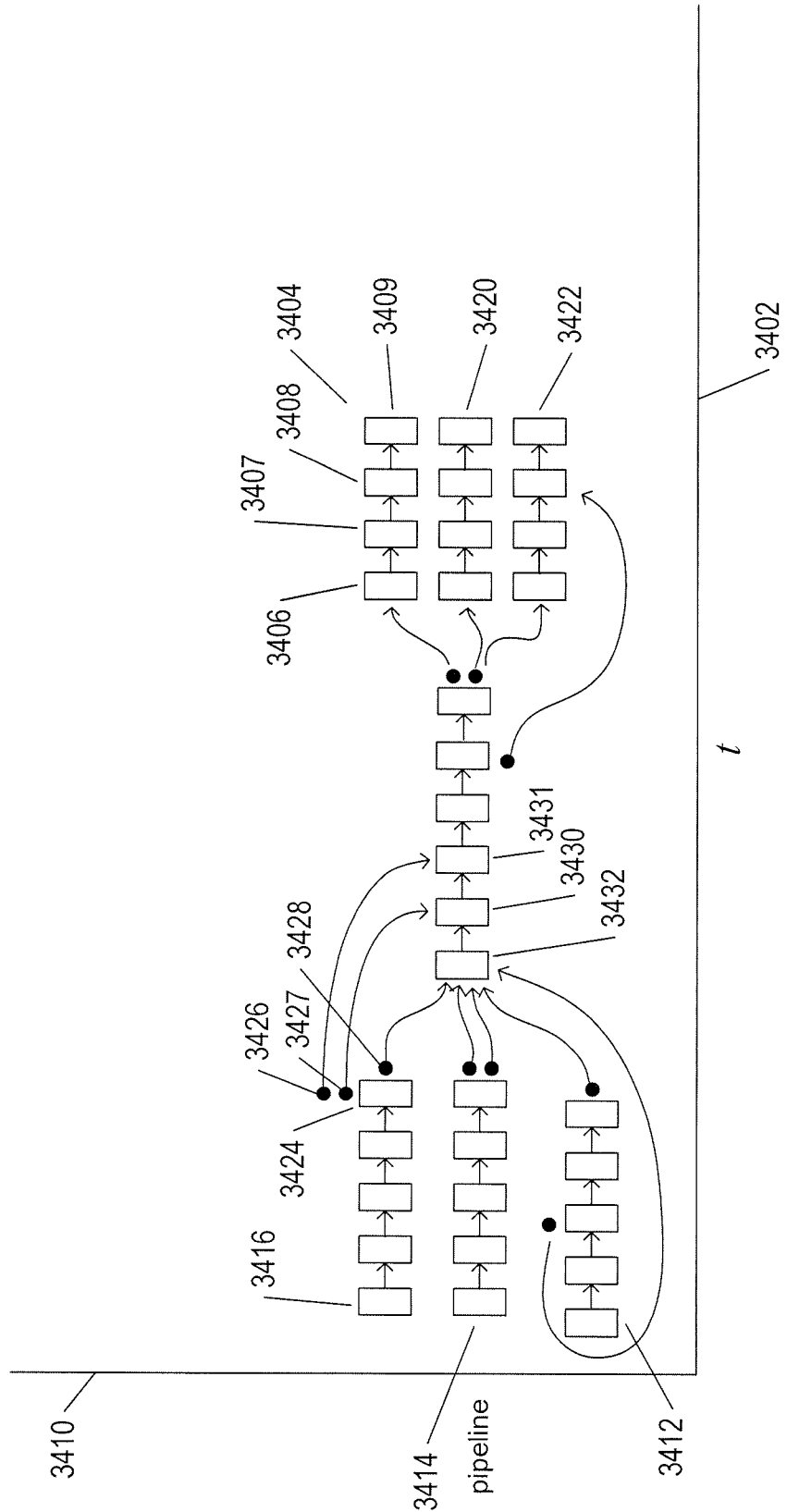
FIG. 34 illustrates serial and parallel execution of multiple, interdependent pipelines.

Currently Disclosed Methods and Systems that Facilitate Resource Sharing and Control of Access to Shared Resources The currently disclosed methods and systems provide for resource sharing among multiple, interdependent pipelines as well as for control of access to shared resources. FIG. 34 illustrates serial and parallel execution of multiple, interdependent pipelines. In FIG. 34, time is represented by a horizontal axis 3402 and different pipelines are represented by linked lists of stages, such as pipeline 3404 represented by a linked list of stages 3406-3409. When multiple pipelines are executing at a given point in time, they are organized at different positions with respect to a vertical pipeline axis 3410. As shown in FIG. 34, execution of a first pipeline 3412 begins earliest in time, followed by launching of pipelines 3414 and 3416, which execute concurrently with execution of pipeline 3412. When execution of these first three pipelines 3412, 3414, and 3416 terminates, execution of a fourth pipeline 3418 is then launched. Following completion of execution of the fourth pipeline 3418, three additional pipelines execute concurrently, including pipeline 3409 and pipelines 3420 and 3422.

The pipelines illustrated in FIG. 34 are interdependent because certain resources generated in earlier executed pipelines are used, or consumed, by later executing pipelines. As discussed below, resources may be output-parameter values, entrypoints in plug-ins and other executables, and various machine resources, including machine resources that are allocated and/or launched and initiated, such as virtual machines and vApps. Machine resources may additionally include virtual networks, virtual data-storage appliances, and other such machine resources. For example, as shown in FIG. 34, stage 3424 of pipeline 3416 launches and initiates two virtual machines, represented by filled disks 3426-3427, and outputs a parameter value, represented by filled disks 3428. The virtual machines output by stage 3424 of pipeline 3416 are accessed by tasks in stages 3430 and 3431 of pipeline 3418. Output value 3428 is input to the first stage 3432 of pipeline 3418. Thus, as shown in FIG. 34, multiple independently executed pipelines are linked together by dependencies of later executing pipelines on resources that are used or generated by earlier executing pipelines.

As discussed in the preceding subsections, current pipeline methodologies and implementations provide various functionalities to enhance flexibility in pipeline design and execution. For example, the gating-rule technology discussed above with reference to FIGS. 21-24, allows for branching pipeline execution based on gating rules and artifactory deposits. However, the types of interdependencies needed for multiple, interdependent pipeline execution exceed those that can be handled by gating rules and the artifactory. Furthermore, for many types of resources, it is not desirable for resources to be considered global resources available to every pipeline and application-release-management-subsystem user. Instead, it is desirable, in many cases, for the resources used by multiple pipelines in one set of multiple interdependent pipelines launched by a user to be unavailable and inaccessible to certain other pipelines, sets of interdependent pipelines, and users.

The mechanisms for passing parameter values between pipeline stages, discussed above with reference to FIGS. 25A-28D provides for sharing of parameter resources among stages within a given pipeline, but do not extend to sharing resources across multiple, interdependent pipelines. The techniques for adding modular functionality, discussed above with reference to FIGS. 32-33B, allow for greatly extending available entrypoint resources, in general, for pipeline execution, but do not offer the ability to partition the resources into groups accessible only to particular one or more users, user groups, or pipelines. By contrast, the currently disclosed methods and systems that support execution of the multiple, and interdependent pipelines provides for both persistent storage of resources spanning execution of individual pipelines as well as for access control that allows resources to be made accessible only to subsets of users, user-groups, and pipelines.

Figure 35:
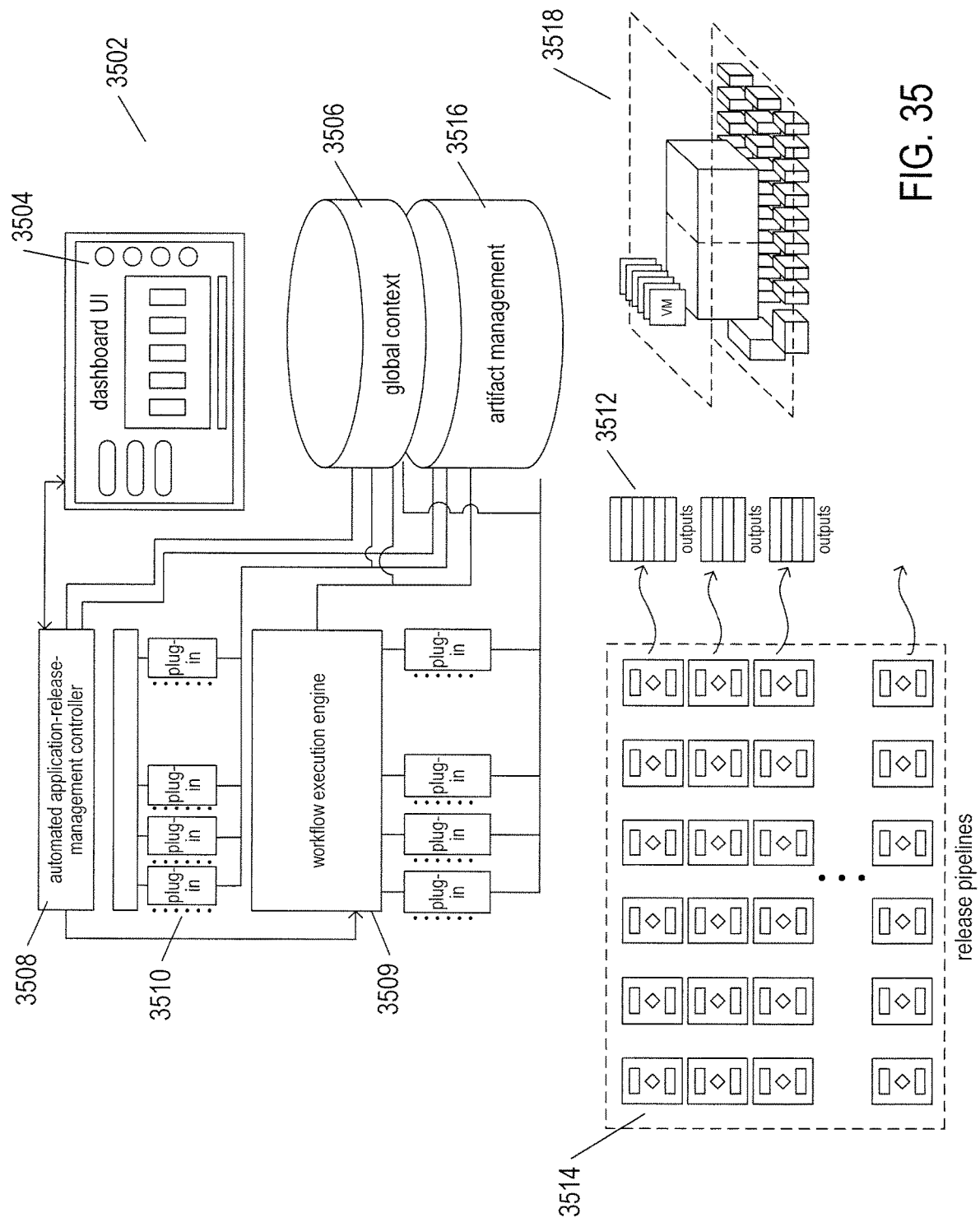
FIG. 35 illustrates an automated application-release-management subsystem, using illustration conventions previously used in FIGS. 17, 18, and 33A-33B.

FIG. 35 illustrates an automated application-release-management subsystem, using illustration conventions previously used in FIGS. 17, 18, and 33A-33B. In order to provide for sharing of resources among multiple, interdependent pipelines and control of access to those resources, the currently disclosed automated application-release-management subsystem 3502 includes an enhanced user interface 3504, discussed below, a global-context database 3506, discussed below, and an enhanced automated application-release-management controller 3508 and workflow-execution engine 3509. These enhancements provide for sharing of, and control of access to, many different types of resources, including entrypoints in plug-ins, such as entrypoint 3510 represented by a small filled disk, values of output parameters from pipelines, such as output parameters 3512 produced by pipeline 3514, artifacts within the artifact-management subsystem 3516, and a wide variety of hardware and virtual-hardware resources 3518. In fact, the methods and subsystems currently disclosed for resource sharing and control of access to shared resources can be generally applied to any resource that is used, generated, updated, or consumed during execution of multiple, and/or interdependent pipelines.

Figure 36:
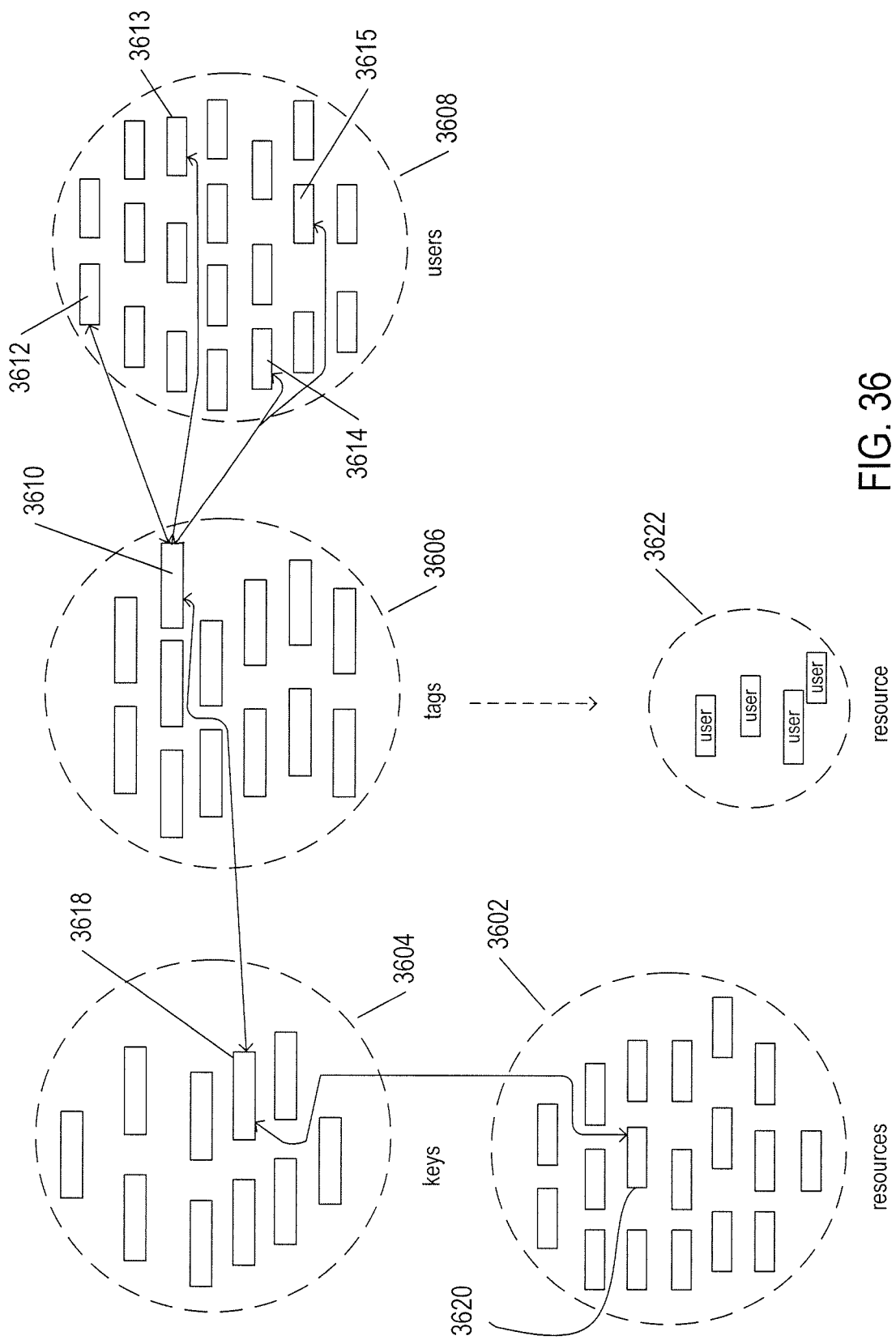
FIG. 36 illustrates certain of the logical entities used by the currently disclosed methods and subsystems to facilitate sharing of resources and control of access to resources used by multiple interdependent pipelines.

FIG. 36 illustrates certain of the logical entities used by the currently disclosed methods and subsystems to facilitate sharing of resources and control of access to resources used by multiple interdependent pipelines. The logical entities include resources 3602, keys 3604, tags 3606, and users 3608. Users 3608 represent the various developers, administrators, and other users of the automated release-pipeline-management subsystem. Resources 3602, as discussed above, may include artifacts managed by the artifact management subsystem, any of many different types of physical and virtual hardware resources, entrypoints and executables, output parameters from release pipelines, and, essentially, any type of physically manifested entity that is produced, generated, consumed, used, or otherwise accessed by pipelines during pipeline execution. Keys 3604 are logical entities that represent resources shared by multiple, interdependent pipelines. Tags are logical entities that represent a subset of the users 3608. A tag can be associated with a key in order to permit access to the shared resource represented by a key only to the subset of the users represented by the tag. Thus, as shown in FIG. 36 with double headed arrows, the tag 3610 represents four users 3612-3615 and is associated with key 3618 that is, in turn, associated with resource 3620. Tag 3610 thus represents a subset of the users 3622 and have access to resource 3620.

Figure 37:
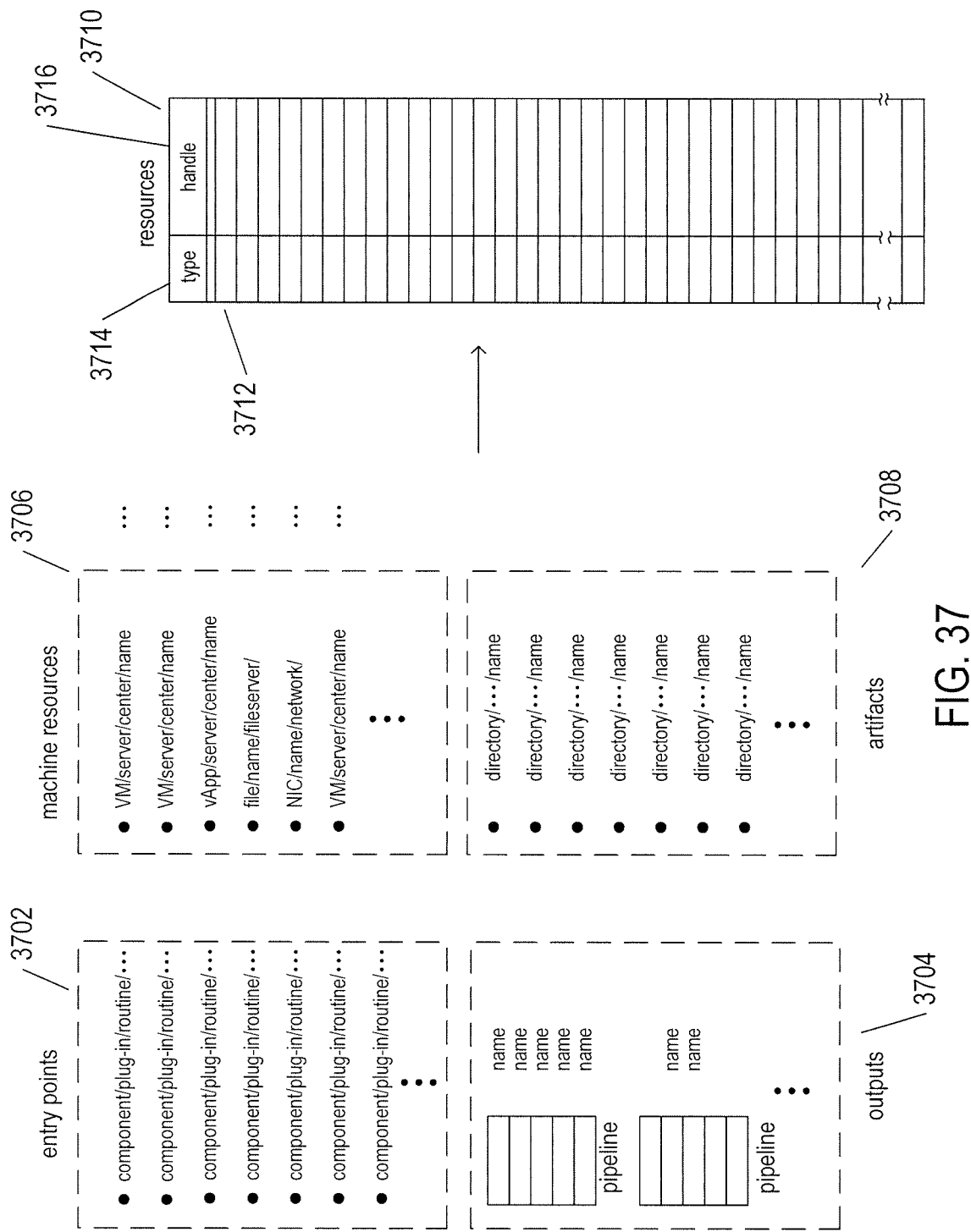
FIG. 37 illustrates various types of resources that may be shared among multiple, interdependent pipelines.

FIG. 37 illustrates various types of resources that may be shared among multiple, interdependent pipelines. As discussed above, resources may include entrypoints 3702, output parameters from pipelines 3704, machine resources 3706, and artifacts 3708, among the larger set of resources that may be used, consumed by, generated by, or otherwise accessed by executing pipelines. These resources may be commonly represented by entries in a set of resource descriptors. The set of resource descriptors 3710 is shown in FIG. 37 as a table, each row or entry of which, such as the first row 3712, represents a particular resource. Each entry includes an indication of the type of resource, represented by the column type 3714, and a handle for the resource, represented by the column handle 3716. A handle is an alphanumeric representation or encoded representation of information that can be used by the workflow-execution engine (3509 in FIG. 35), the automated application-release-management controller (3508 in FIG. 35), and the dashboard-dUI (3504 in FIG. 35) to access the particular resource. For example, for a resource of the type "entrypoint," a handle may be a full system path name for that entrypoint that allows the entrypoint to be invoked by the work-flow execution engine. As another example, for a resource of type "output parameter," the handle may be an alphanumeric representation of the output-parameter value.

Figure 38A:
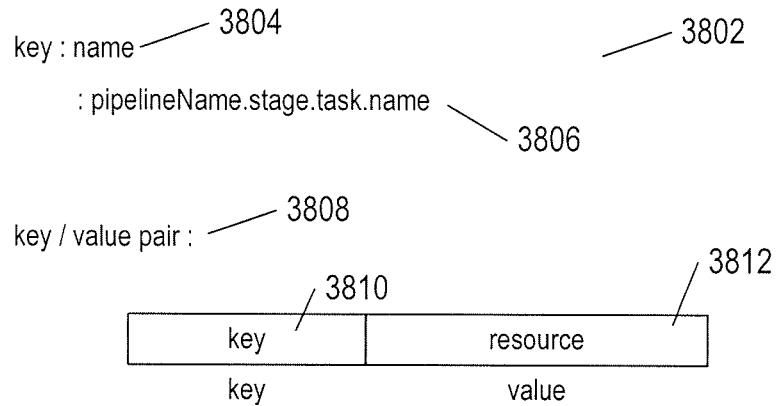

FIGS. 38A-B illustrate additional logical entities used by the currently disclosed methods and subsystems. A key 3802 is a name 3804 or, when key names are not unique in the system, a fully qualified key name 3806 then includes the name of the pipeline that generates or first declares and uses the resource represented by the key, the stage of the pipeline, and the task within the stage of the pipeline. A key/value pair 3808 includes a key 3810 and a value for the resource associated with the key 3812. The value may be a path name to an entrypoint, a numeric or character-string value for a pipeline-output-parameter value, a unique address for an artifact, or a unique identifier for a machine resource. Key/value pairs are maintained within the global-context database (3506 in FIG. 35) to represent the shared resources declared for release pipelines. During pipeline development, the value of a key-value pair is generally NULL, as indicated in key-value pairs 3814 stored within the global-context database during pipeline development. When a pipeline is executed, the values of the keys declared by the pipeline become instantiated and stored within the global-context database, as indicated by key/value pairs 3816 in FIG. 38A. A list is a set of one or more entities 3820 in FIG. 38B. An entity is either a user ID 3822 or a user-group ID 3824. A group is one or more users 3826. A tag is a name/list pair 3828 or a name/tag-description/list triple 3830. Thus, key/value pairs represent current values for shared resource and tags represent groups of one or more users.

Figure 39A:
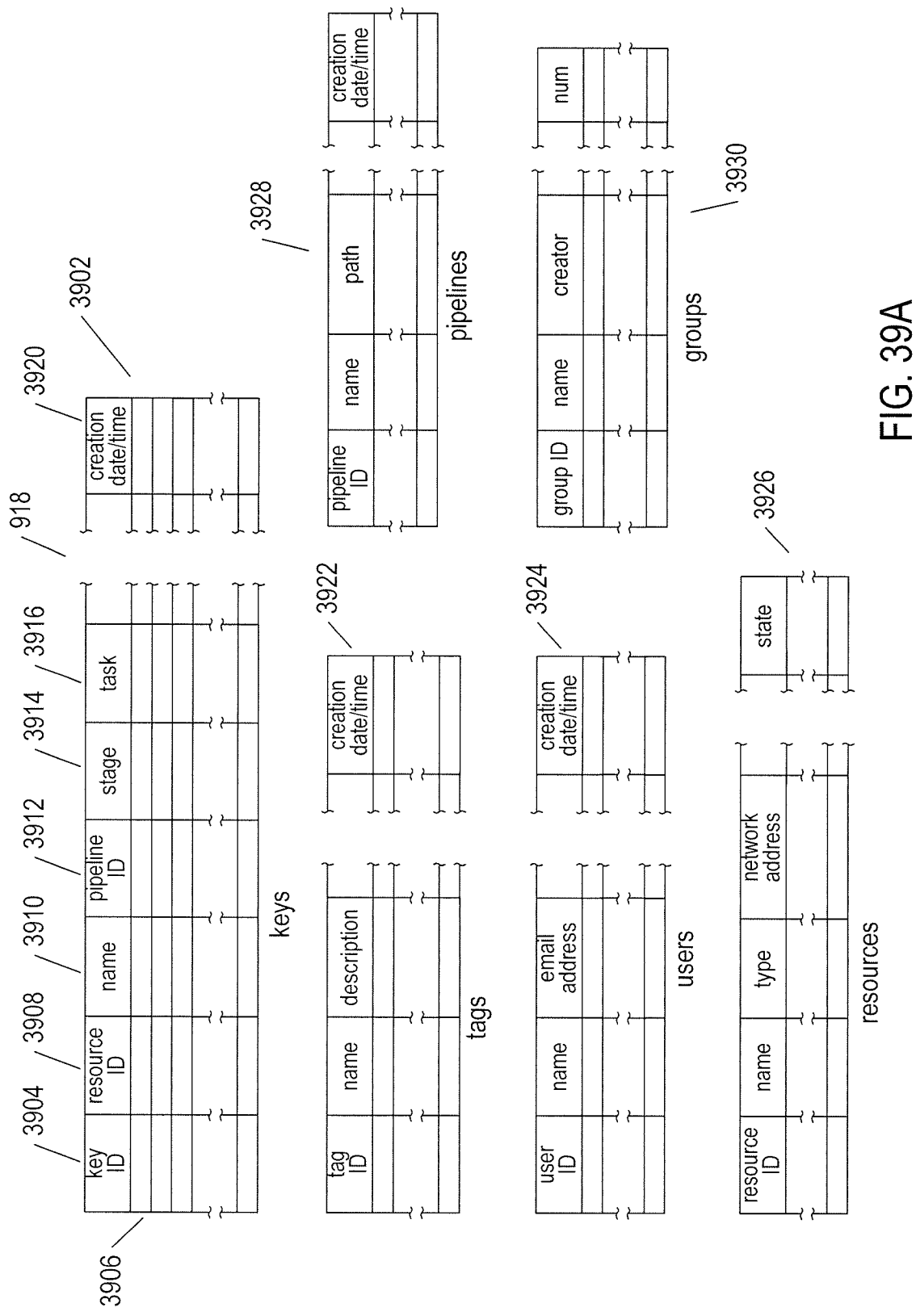
Figure 39B:
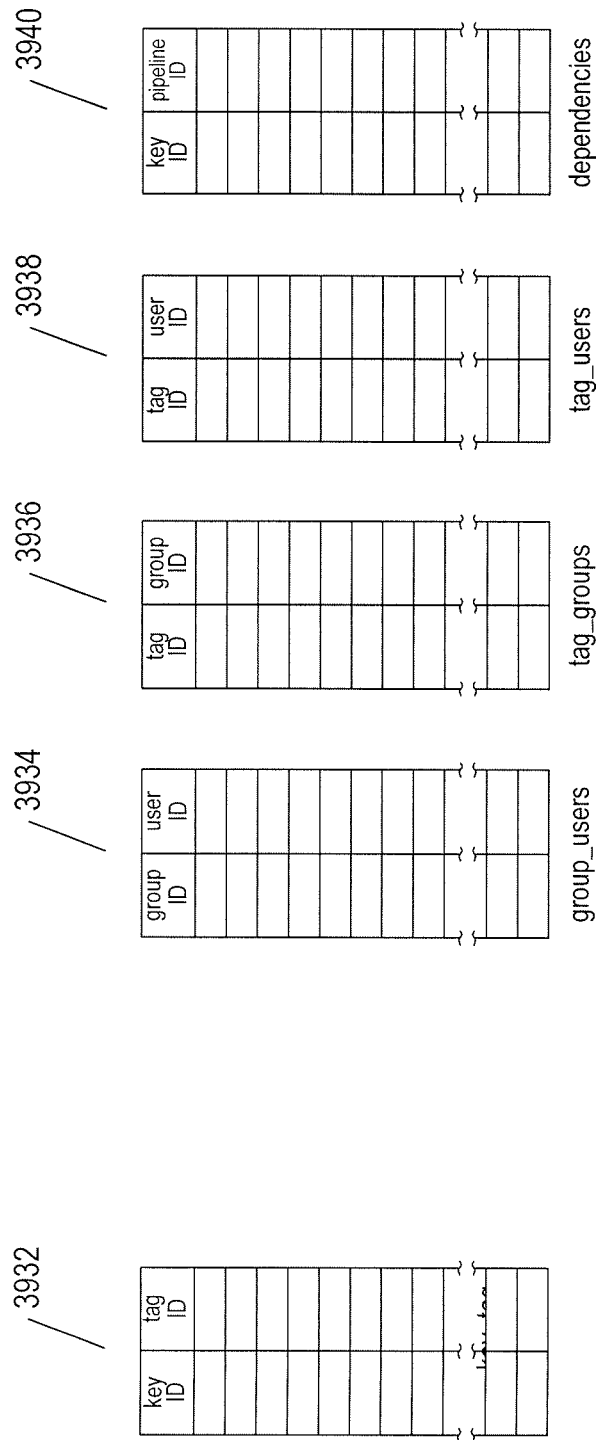

FIGS. 39A-C illustrate an example relational-database implementation for the global-context database that includes stored data that represents keys, tags, users, user groups, resources, and pipelines. This representation differs from the logical representation discussed above with reference to FIGS. 36-38B. In the relational database implementation, the keys, tags, users, user groups, resources, and pipelines are represented by entries, or rows, in multiple relational-database tables. For example, entries in the relational-database table keys 3902 represents resources shared by multiple, interdependent pipelines. The columns in the tablekeys, such as the first column 3904, represent fields within entries of the table. Each row of the table keys, such as the first row 3906, represents a different entry or record corresponding to a particular key. Each entry includes an unique numeric identifier for the key, key_ID 3904, a unique numeric identifier for the resource represented by the key, resource_ID 3908, an alphanumeric name for the key name 3910, a unique identifier for the pipeline in which the key is defined, pipeline_ID 3912, the stage and task of the pipeline in which the key is declared 3914 and 3916, many additional fields represented by broken column 3918, and a final column 3920 that provides an indication of the date and time of creation of the key. The additional columns include the date and time of a last update of the value corresponding to the key and a column that includes the value, the encoding and type of value depending on the type of shared resource represented by the key. The table tags 3922 stores entries that represent tags, the table users 3924 stores entries that represent users, the table resources 3926 stores entries that represent resources within the system, the table pipeline 3928 stores entries that represent pipelines, and the table groups 3930 stores entries that each represents a group of users. As shown in FIG. 39B, additional relational tables in the global-context database represent the association of various types of entities, indicated in the example shown in FIG. 36 by double-headed arrows. For example, the table key_tag 3932 represents the association of tags and keys. As discussed above, associating a tag with a key essentially permits access to the resource represented by the key only for those users represented by the tag. The table group_users 3934 represents the association of users with groups. The tablestag_groups 3936 and tag_users 3938 represent the association with user groups and users with tags. Finally, the table dependencies 3940 represents keys that are consumed by pipelines.

Relational-database tables are created, populated, updated, and accessed using the structured query language ("SQL"). FIG. 39C shows several examples of SQL statements. The create-table statement 3950 is used to create the table keys (3902 in FIG. 39A), each entry of which represents a resource shared among multiple, interdependent pipelines. The create-procedure SQL statement 3952 defines a procedure that returns a Boolean value indicating whether a particular user, having a user identifier input as a parameter, is authorized to access a particular key, the name, pipeline, stage, and task of which are input as parameters. This procedure uses nested SELECT statements, including an inner SELECT statement that represents a join of the keys, pipeline, key_tag, group_users, tag_groups, and tag_users tables.

Figure 40A:
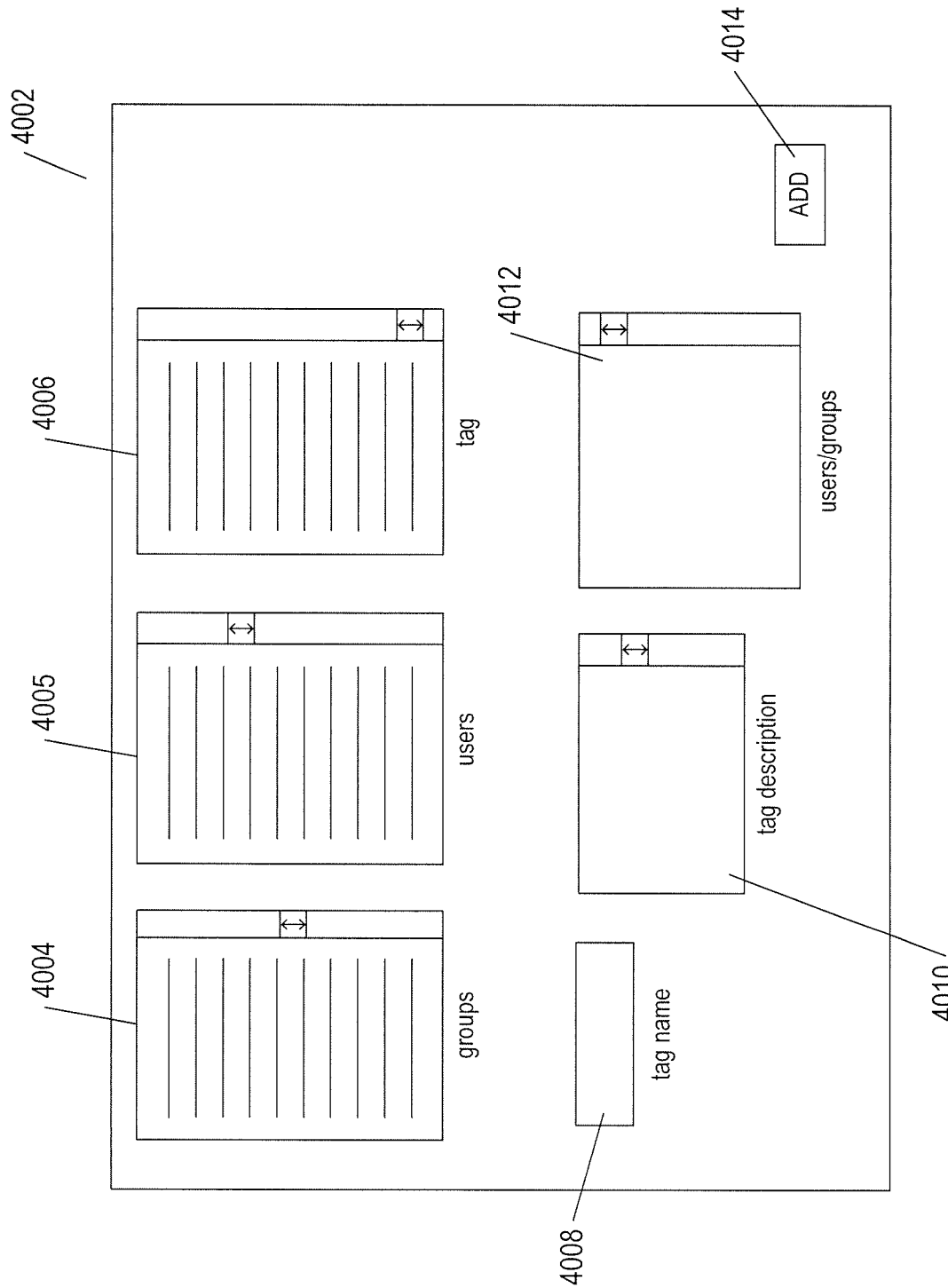
Figure 40B:
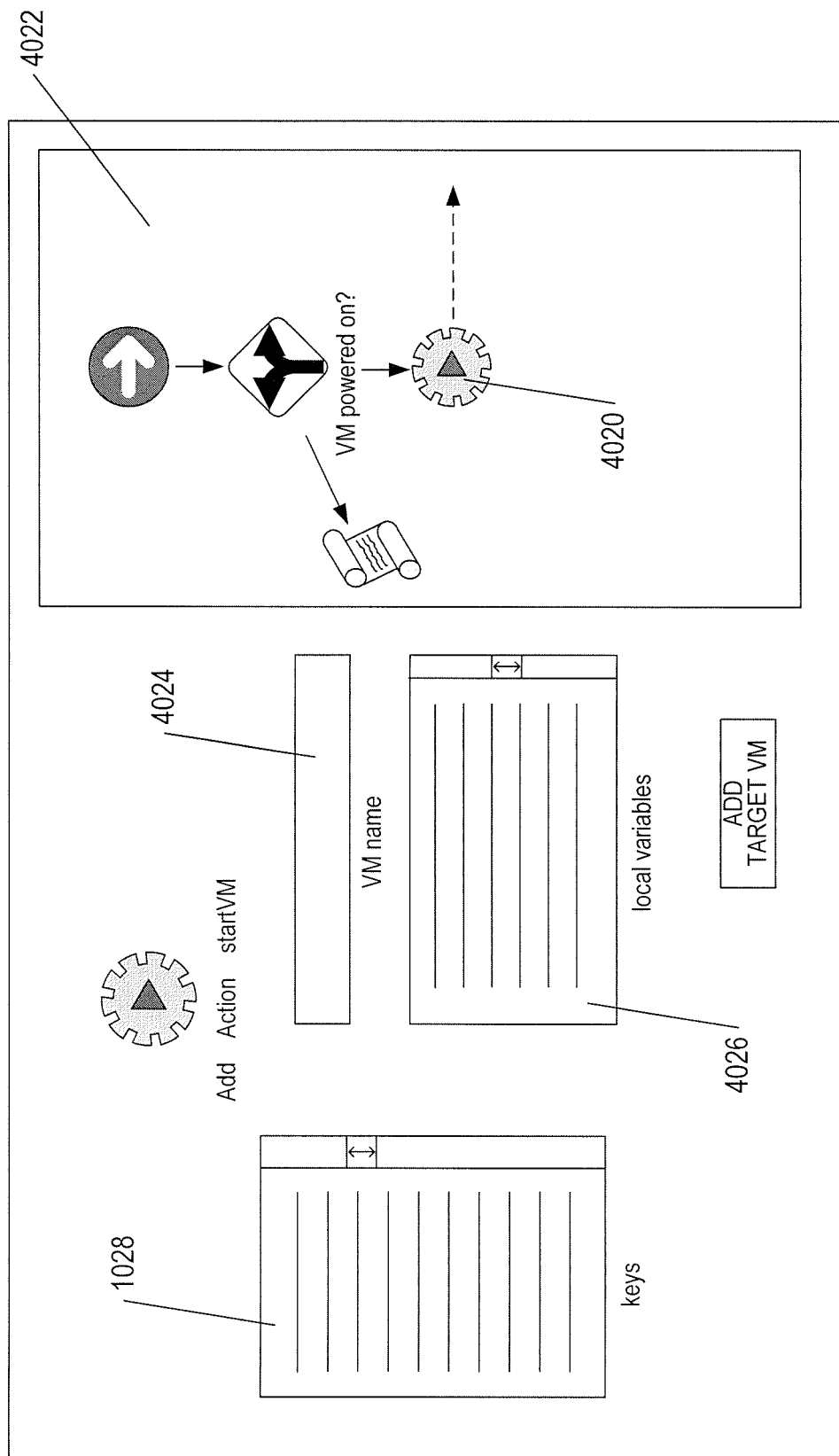

FIGS. 40A-C illustrate certain of the enhancement made to the user interface (3504 in FIG. 35) for the automated application-release-management subsystem to provide for resource sharing and control of access to shared resources. FIG. 40A shows one implementation of a tag-definition user-interface window 4002. This user-interface window allows users to create new tags that can be later associated with resources. Scrollable and selectable windows 4004-4006 display currently defined user groups, users, and tags, respectively. Mousing over entries in these windows displays overlaying window with details about a particular group, user, or tag. To add a new tag, a user enters a name for the tag into the tag-name text-entry window 4008, enters an alphanumeric description of the tag in text-entry window 4010, and selects users and groups from the groups and users windows 4004 and 4005 for pasting into the user/groups window 4012 to associate those users and groups with the new tag. Input of a mouse click to the ADD button 4014 creates a new tag by adding a new entry to the tags relational database. The user-interface control logic accesses the tags table to determine whether or not the new tag is unique before inserting the new tag into the table. When there are constraints on the tag names and tag descriptions, those constraints are enforced prior to an attempt to enter a new tag into the database.

FIG. 40B illustrates using a key to describe a virtual machine during workflow development for a pipeline. A user has added a new action 4020 to a workflow 4022 under development. At this point, the user needs to specify the target virtual machine for the start-VM action. The target VM can be specified by a name entered in the text-entry window 4024, by a local variable 4026 already defined during workflow development, or by a key selected from a scrollable keys window 1028. Input to the button 1030 adds the target selection highlighted in one of windows 4024, 4026, or 4028 to the start-VM action 4020.

FIG. 40C shows a task-configuration user-interface window in which existing tags can be assigned to output values from a task. Windows for entering the tags, such as window 4040, are paired with output-parameter names 4042. In a given implementation, there are many user-interface windows and dialogs that support creation of tags, keys, user groups, users, and other entities that support sharing of resources and control of access to shared resources.

Figure 41A:
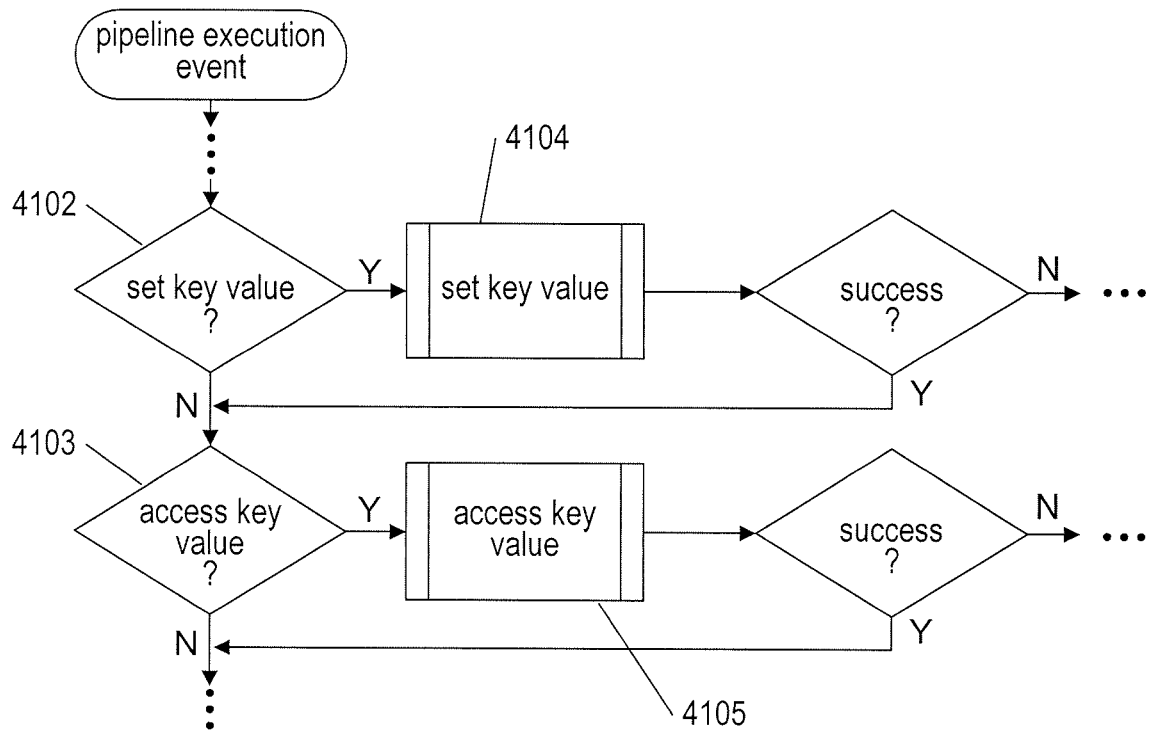
FIGS. 41A-E provide short control-flow-diagram extracts and control-flow-diagrams that illustrate one approach to implementing resource sharing and control of access to shared resources in an automated-release-pipeline-management subsystem.
Figure 41B:
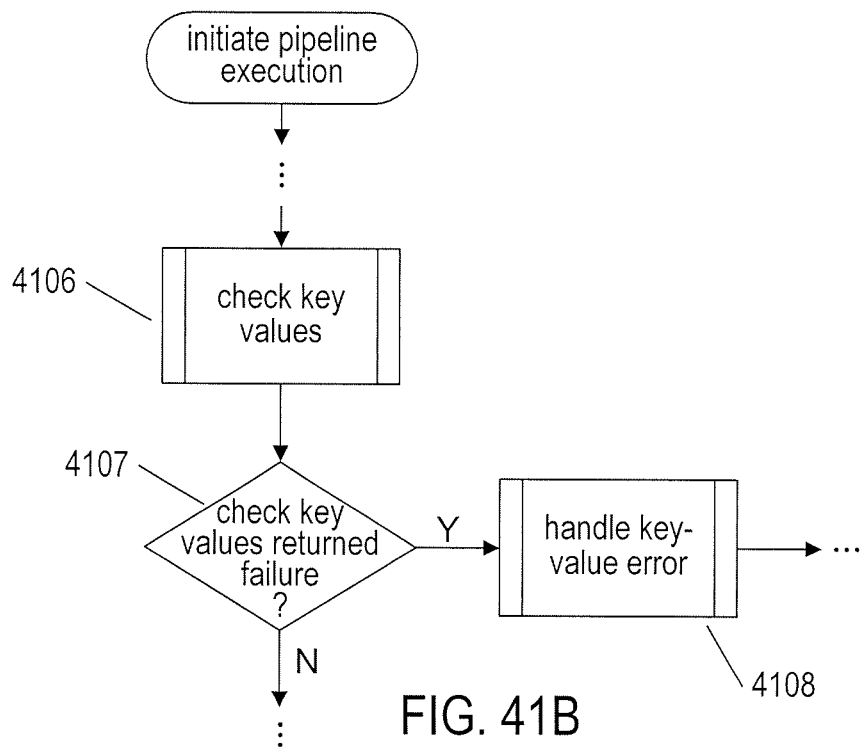

FIGS. 41A-E provide short control-flow-diagram extracts and control-flow-diagrams that illustrate one approach to implementing resource sharing and control of access to shared resources in an automated-release-pipeline-management subsystem. As shown in FIG. 41A, a pipeline-execution-event handler, illustrated above in FIG. 28A, is enhanced to include handling of a set-key-value event, in step 4102, and handling of an access-key-value event, in step 4103. When a set-key-value event occurs, a handler "set key value" is called in step 4104. When an access-key-value event occurs, a handler "access key value" is called in step 4105. A set-key-value event occurs when, during execution of a workflow, the value of a resource represented by a key is set or updated, such as generation of a value for an output parameter. An access-key-value event occurs when, during execution of a pipeline, the value associated with a key is needed to carry out execution of a statement, such as the handle to a VM needed for a statement that powers off the VM. As shown in FIG. 41B, three additional steps 4106-4108 are added to the initiate-pipeline-execution routine, discussed above with reference to FIG. 28C, to ensure that key-value dependencies for a pipeline are satisfied prior to launching pipeline execution.

Figure 41C:
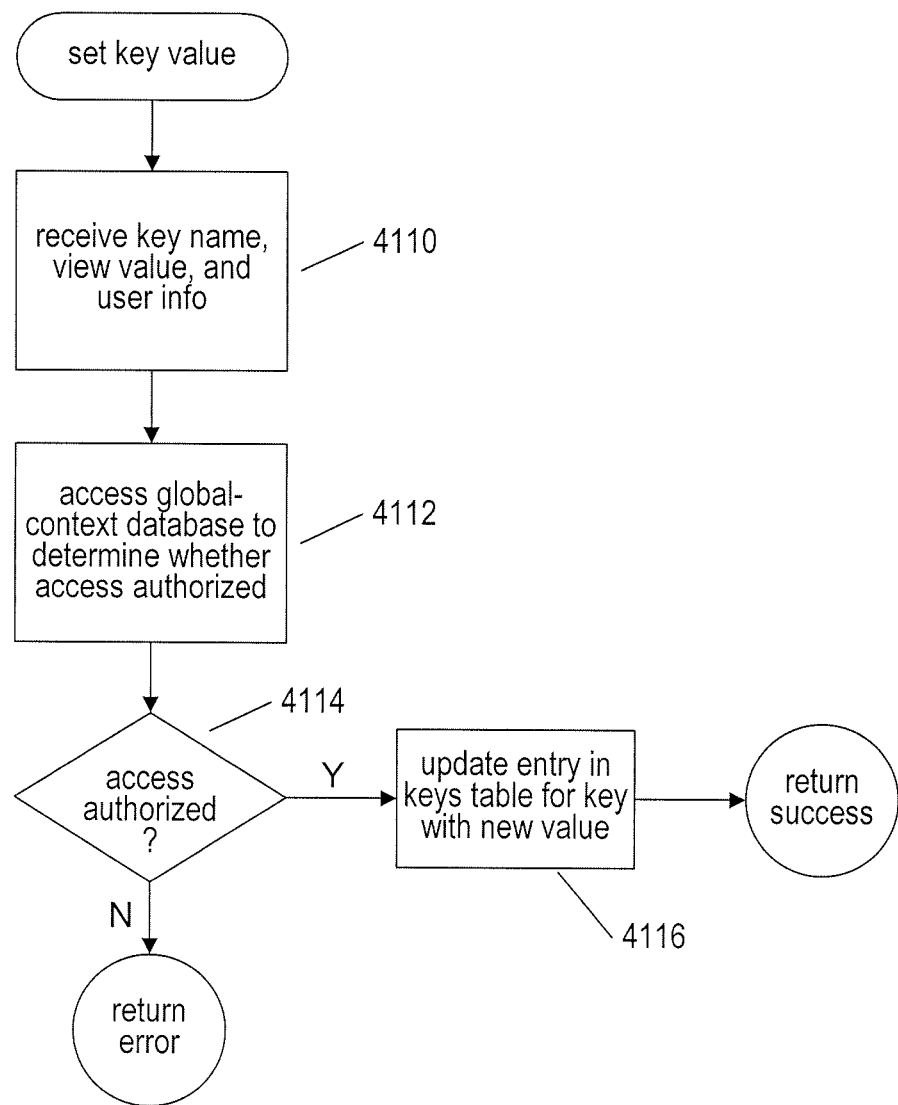

FIG. 41C provides a control-flow diagram for the handler "set key value," called in step 4104 in FIG. 41A. In step 4110, the handler receives a key name and a new value for the key as well as user information or other information needed to authorize access to the key. In step 4112, the handler accesses the global-context database to determine whether the current user and currently executed pipeline is authorized to access the value associated with the key. When access is authorized, as determined in step 4114, the entry in the keystable corresponding to the key is updated with a new value, in step 4116. Authorization can be checked by various methods, including a call to the example authorization procedure discussed above with reference to FIG. 39C. Update of an entry in the keys table can be accomplished using an SQL UPDATE command.

Figure 41D:
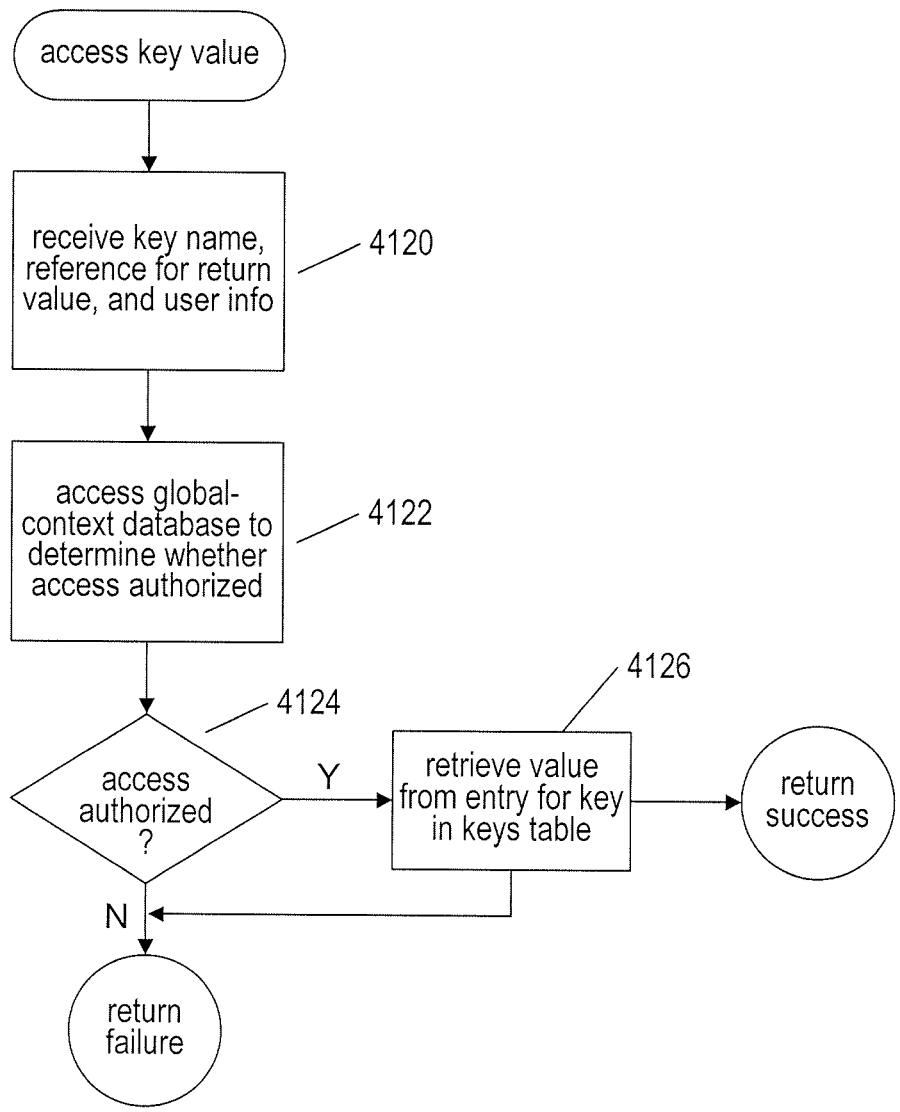

FIG. 41D provides a control-flow diagram for the handler "access key value," called in step 4105 in FIG. 41A. This handler receives a key name, a reference to a memory location to store the key value, and user information, or other information used to authorize access to the key in step 4120. In step 4122, the handler accesses the global-context database to determine whether or not access to the key is authorized for the user and pipeline. When access is authorized, as determined in step 4124, the value associated with the key is retrieved from the table keys in step 4126. This can be accomplished using a simple SQL SELECT statement. In certain cases, the routine may verify that the value associated with the key has been created within some time window stretching back from the current system time, so that stale key values are not used for subsequent interdependent pipeline execution. Alternatively, key values may be continuously monitored and deleted from the global-context database following passage of a threshold time, to purge stale values.

Figure 41E:
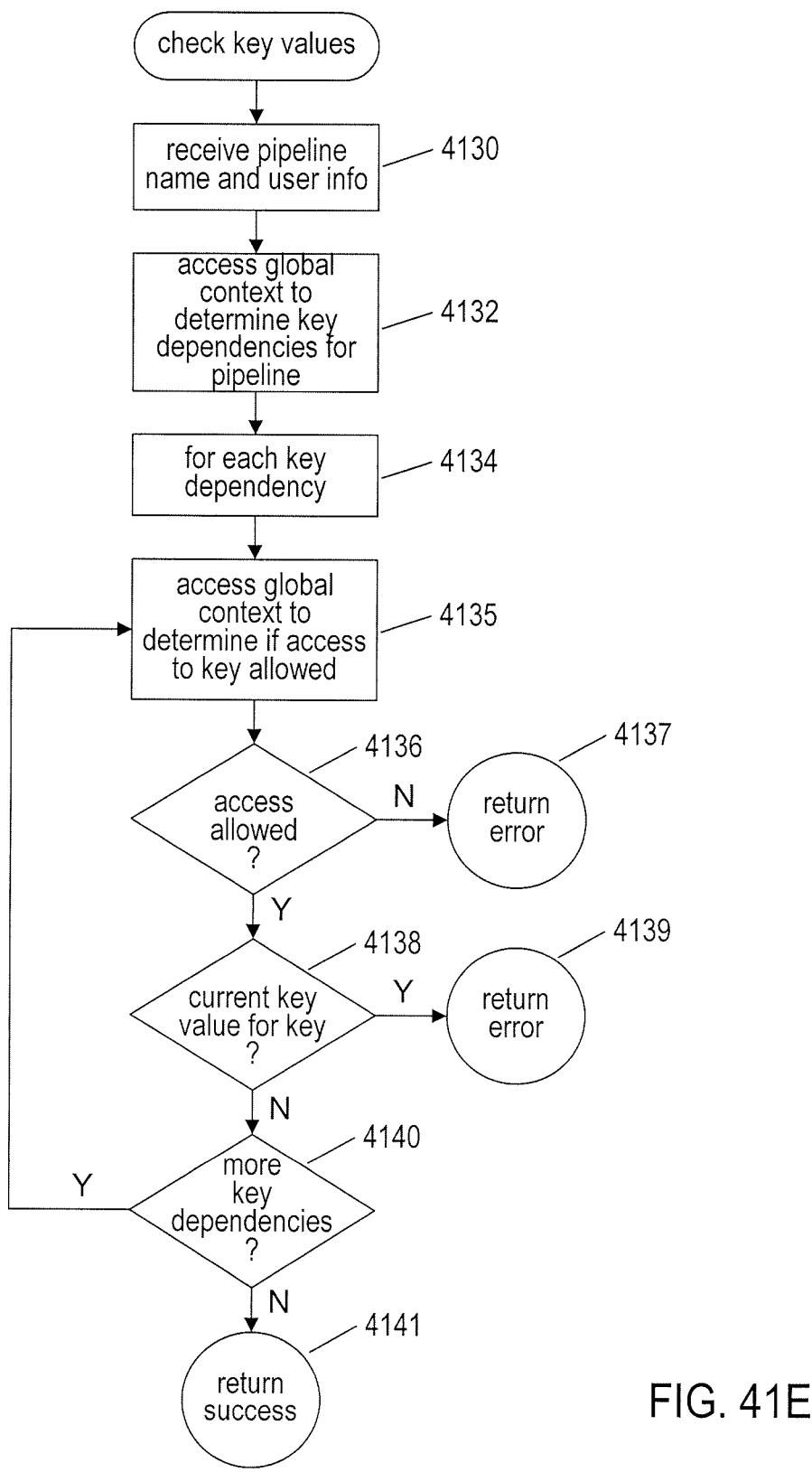

FIG. 41E provides a control-flow diagram for the routine "check key values," called in step 4106 of FIG. 41B. In step 4130, the routine receives a name of the pipeline and user information. In step 4132, the routine accesses the global-context database to determine the key dependencies for the pipeline. As discussed above, the table dependencies (3940 in FIG. 39B) includes listings of the key dependencies for pipelines. The dependencies can be obtained by SQL SELECT commands on joined tables. Then, in the for-loop of steps 4134-4139, each key dependencies considered. For each key dependency, the routine accesses the global-context database to determine whether access is allowed, in step 4135. If access is not allowed, an error is returned in step 4137. Otherwise, the routine checks to determine whether a current value is available for the key in the keys table. When no current value is available, an error is returned in step 4139. When the for-loop successfully terminates, a success value is returned in step 4141.

Although the present invention has been described in terms of particular embodiments, it is not intended that the invention be limited to these embodiments. Modifications within the spirit of the invention will be apparent to those skilled in the art. For example, any of many different implementation and design parameters, including choice of operating system, virtualization layer, hardware platform, programming language, modular organization, control structures, data structures, and other such design and implementation parameters can be varied to generate a variety of alternative implementations of the current disclosed automated-application-release-management subsystem and management controller. Any of many different types of storage methods can be used in place of, or along with, a relational database system to implement a global-context database. Additional indexing methods can be used to provide efficient data retrieval. Various different UI windows and displays can be implemented to provide for creation, update, and deletion of tags, keys, users, and user groups as well as association of tags with keys and resources.

The invention claimed is:

1. An automated-application-release-management subsystem within workflow-based cloud-management system installed within a cloud-computing facility having multiple servers, data-storage devices, and one or more internal networks, the automated-application-release-management subsystem comprising:
   a dashboard user interface;
   an automated-application-release-management-controller component of the automated-application-release-management subsystem that controls execution of application-release pipelines having multiple stages, each stage having tasks; and
   an automated-application-release-management-interface component of the automated-application-release-management subsystem through which a cloud-computing facility administrator or manager selects a set of plugged-in modules and subsystems for each of one or more stages of an application-release pipeline.

2. The system of claim 1, further comprising a management controller that controls execution of application-release pipelines.

3. The system of claim 1, wherein the application-release pipelines are interdependent.

4. The system of claim 1, wherein execution of the tasks generate a releasable version of an application.

5. The system of claim 4, wherein the tasks comprise one or more of the following: initialization tasks, deployment tasks, run-tests tasks, gating-rule tasks, and finalize tasks.

6. The system of claim 3, further comprising multiple resources, including: entry points for executables, including applications and routines; machine resources, including virtual machines and vApps; and parameters output by release pipelines.

7. The system of claim 1 wherein the management controller provides parameter values as inputs for task execution and receives output parameters from tasks following completion of their execution, and wherein the tasks cannot exchange parameter values among themselves during execution of an application-release pipeline, and wherein the tasks and the plurality of stages have predefined input and output parameters.

8. A method carried out in an automated-application-release-management subsystem within a cloud-computing facility having multiple servers, data-storage devices, and one or more internal networks, the method comprising:
   providing a user interface that enables a user to build and launch an application-release pipeline, the application-release pipeline comprising a plurality of stages, each of the plurality of stages having tasks;
   receiving, by the user interface, defined tasks within each of the plurality of stages of the application-release pipeline; and
   launching the built application-release pipeline.

9. The method of claim 8, further comprising enabling the user to select a set of plugged-in modules and subsystems for each of the plurality of stages of the application-release pipeline.

10. The method of claim 8, wherein application-release pipelines are interdependent.

11. The method of claim 8, wherein execution of the tasks generate a releasable version of an application.

12. The method of claim 11 wherein the tasks comprise one or more of the following: initialization tasks, deployment tasks, run-tests tasks, gating-rule tasks, and finalize tasks.

13. The method of claim 3, further comprising, receiving, from the user, a selection of multiple resources for the application-release pipeline, the multiple resources comprising: entrypoints for executables, including applications and routines; machine resources, including virtual machines and vApps; and parameters output by release pipelines.

14. The method of claim 1, wherein the tasks cannot exchange parameter values among themselves during execution of an application-release pipeline, and wherein the tasks and the plurality of stages have predefined input and output parameters.

15. One or more non-transitory computer-readable media having computer-executable instructions that, when executed by one or more processors, cause the one or more processors to perform operations comprising:

provding a user interface that enables a user to build and launch an application-release pipeline, the application-release pipeline comprising a plurality of stages, each of the plurality of stages having tasks;

receiving, by the user interface, defined tasks within each of the plurality of stages of the application-release pipeline;

enabling the user to select a set of plugged-in modules and subsystems for each of the plurality of stages of the application-release pipeline launching the built application-release pipeline.

16. The one or more non-transitory computer-readable media of claim 15, wherein the computer-executable instructions further cause the one or more processors to perform operations comprising receiving, from the user, specifications for each of the plurality of stages for the application-release pipeline.

17. The one or more non-transitory computer-readable media of claim 15, wherein application-release pipelines are interdependent.

18. The one or more non-transitory computer-readable media of claim 15, wherein execution of the tasks generate a releasable version of an application.

19. The one or more non-transitory computer-readable media of claim 18, wherein the tasks comprise one or more of the following: initialization tasks, deployment tasks, run-tests tasks, gating-rule tasks, and finalize tasks.

20. The one or more non-transitory computer-readable media of claim 15, wherein the computer-executable instructions further cause the one or more processors to perform operations comprising receiving, from the user, a selection of multiple resources for the application-release pipeline.

\* \* \* \* \*